US012766685B2

(12) United States Patent
Nagata et al.

(10) Patent No.: US 12,766,685 B2
(45) Date of Patent: Oct. 20, 2026

(54) STAPLE REMOVING DEVICE

(71) Applicant: Max Co., Ltd., Tokyo (JP)

(72) Inventors: Tomokazu Nagata, Tokyo (JP); Katsuya Hakozaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 154 days.

(21) Appl. No.: 18/820,848

(22) Filed: Aug. 30, 2024

(65) Prior Publication Data

US 2025/0073880 A1 Mar. 6, 2025

(30) Foreign Application Priority Data

Aug. 31, 2023 (JP) ................................ 2023-141605
Aug. 31, 2023 (JP) ................................ 2023-141606

(51) Int. Cl.
*B25C 11/00* (2006.01)

(52) U.S. Cl.
CPC .................................. *B25C 11/00* (2013.01)

(58) Field of Classification Search
CPC ......... B25C 11/00; B25C 11/02; B25C 13/00; B25C 9/00; B25C 5/02
See application file for complete search history.

(56) References Cited

U.S. PATENT DOCUMENTS 3,588,043 A * 6/1971 Griswold ............... B25C 11/00 254/18
4,473,220 A 9/1984 Hovens et al.
11,279,015 B2 * 3/2022 Hakozaki ............... B25C 11/00
12,138,765 B2 * 11/2024 Yagi ........................ B25C 11/00
12,179,328 B2 * 12/2024 Yagi ........................ B25C 11/00
12,544,896 B2 * 2/2026 Chigira ................... B25C 11/00
2017/0275129 A1 * 9/2017 Takahashi ................. B25C 5/04
2019/0061129 A1 * 2/2019 Takahashi ................. B25C 5/02
2019/0184537 A1 * 6/2019 Hakozaki ............... B25C 11/00
2021/0101270 A1 * 4/2021 Yagi ........................ B25C 11/00
2021/0402582 A1 * 12/2021 Yagi ........................ B25C 11/00
2022/0176533 A1 * 6/2022 Yagi ........................ B25C 11/00
(Continued)

FOREIGN PATENT DOCUMENTS

JP H08-090452 A 4/1996
JP 3573505 B2 10/2004
(Continued)

OTHER PUBLICATIONS

Oct. 23, 2024—(EP) Extended Search Report—App 24197006.0.

*Primary Examiner* — Lee D Wilson
(74) *Attorney, Agent, or Firm* — Banner & Witcoff, Ltd.

(57) ABSTRACT

A staple removing device includes a placement portion having a placement surface on which a paper bundle bound by a staple is to be placed, a rotating shaft, and a removal unit attached to the rotating shaft and rotating along a surface intersecting an axial direction of the rotating shaft. The removal unit includes a tip portion to be inserted between a lower surface of the paper bundle placed on the placement surface and a crown portion of the staple, a middle portion connected to the tip portion and having an action surface to be in contact with the crown portion, and a base portion connected to the middle portion and the rotating shaft. An upper surface of the base portion is located on the same plane as the placement surface or below the placement surface.

15 Claims, 54 Drawing Sheets

(56) References Cited

U.S. PATENT DOCUMENTS

| | | | | |
|---|---|---|---|---|
| 2022/0274237 | A1* | 9/2022 | Yagi | B25C 11/00 |
| 2025/0073880 | A1* | 3/2025 | Nagata | B25C 11/00 |

FOREIGN PATENT DOCUMENTS

| | | | |
|---|---|---|---|
| JP | 7058441 | B2 | 4/2022 |
| JP | 7207220 | B2 | 1/2023 |
| WO | 2018230060 | A1 | 12/2018 |

* cited by examiner

STAPLE REMOVING DEVICE

CROSS-REFERENCE TO RELATED APPLICATIONS

This application is based upon and claims the benefit of priories from prior Japanese patent application No. 2023-141605, filed on Aug. 31, 2023, and Japanese patent application No. 2023-141606, filed on Aug. 31, 2023, the entire contents of which are incorporated herein by reference.

TECHNICAL FIELD

The present invention relates to a staple removing device for removing a staple from a paper bundle.

BACKGROUND ART

In the related art, a staple removing device that removes a staple from a paper bundle has been proposed (for example, refer to Japanese Patent No. 7207220).

The staple removing device described in Japanese Patent No. 7207220 includes: a placement table on which a paper bundle bound by a staple is placed; a removal unit located below the placement table and configured to remove the staple from the paper bundle placed on the placement table, the removal unit including a tip portion that can be inserted between the paper bundle and the staple, the tip portion being movable along the placement table between a first position and a second position; removal unit in which the tip portion is inserted between the paper bundle and the staple when the tip portion moves to the second position; and a motor configured to move the removal unit.

In the staple removing device described in Japanese Patent No. 7207220, since the removal unit is configured to reciprocate linearly, the tip portion can move between the first position and the second position along the placement table.

As in the staple removing device described in Japanese Patent No. 7207220, when the removal unit is configured to reciprocate linearly, it is necessary to secure, along a direction of the reciprocating movement of the removal unit, a space required for the movement of the removal unit, and the device is increased in size.

On the other hand, a staple removing device has been proposed that removes a staple from a vertically lower position by rotating a removal claw holder having a claw by driving a motor (for example, refer to Japanese Patent No. 7058441).

In the staple removing device described in Japanese Patent No. 7058441, the removal claw holder rotates around a support shaft as a fulcrum, and thus a trajectory along which the claw moves is an arc. Accordingly, the space required for the movement of the removal claw can be reduced as compared with a configuration in which the removal unit reciprocates linearly as in Japanese Patent No. 7207220.

On the other hand, in the staple removing device described in Japanese Patent No. 7058441, the support shaft is parallel to the placement table. Accordingly, when the removal claw holder rotates around the support shaft as a fulcrum, the claw moves in a direction toward or away from the placement table.

For this reason, the staple removing device described in Japanese Patent No. 7058441 is configured such that an apex of the arc-shaped trajectory of the claw matches an opening portion of the placement table. However, when the paper bundle is set on the placement table, if a position of the staple binding the paper bundle deviates from a position of the apex of the arc-shaped trajectory of the claw, the claw cannot be inserted between the paper bundle and the staple, and a removal range of the staple is narrowed.

Further, a staple remover provided on an upper wall of an image forming apparatus has been proposed as a staple remover that removes a staple stopped on a sheet by rotation of a remover body (for example, refer to Japanese Patent No. 3573505).

The staple remover described in Japanese Patent No. 3573505 includes: a remover body including a strip portion and disposed above the upper wall of the image forming apparatus; a rotating plate fixed to an upper portion of the remover body; an operation plate disposed above the rotating plate to be rotatable relative to the rotating plate; a rotating shaft extending from the rotating plate and supported to be movable in a vertical direction with respect to the upper wall; a motor configured to rotate the rotating shaft; and a paper pressing portion fixed to a lower portion of the rotating plate.

In the staple remover described in Japanese Patent No. 3573505, when the operation plate is pressed downward, the operation plate, the rotating plate, and the remover body move in a direction toward the upper wall, and a paper is sandwiched between the upper wall and the paper pressing portion.

In the staple remover described in Japanese Patent No. 3573505, when the rotating shaft is rotated by the motor, the strip portion enters between the staple and the paper, and the staple is removed from the paper.

In the staple remover described in Japanese Patent No. 3573505, the rotating shaft is orthogonal to the upper wall. Accordingly, when the rotating shaft is rotated by the motor, the remover body rotates along the upper wall. As a result, a removal range of the staple becomes wider as compared with Japanese Patent No. 7058441.

Further, in the staple removing device, a mechanism for pressing a paper bundle so that the paper bundle placed on the placement table does not move in an inactive manner during the removal of the staple is mounted.

For example, the staple removing device described in Japanese Patent No. 7058441 includes a pressing plate which is raised and lowered by driving of the motor, and when the sheet bundle is set at a predetermined position, the motor is driven, whereby the pressing plate is moved downward and the sheet bundle is pressed to a removal setting position.

Japanese Patent No. 7058441 also describes a configuration in which, when a drive lever is manually pressed, a pressing plate presses the sheet bundle to the removal setting position via a pressing plate spring.

In the staple remover described in Japanese Patent No. 3573505, since the rotating shaft is orthogonal to a wall, the upper wall on which the paper is disposed is provided with a raised portion that is raised to avoid a rotation trajectory of the strip portion. Therefore, in Japanese Patent No. 3573505, undulations occur over the entire placement surface. In the staple remover described in Japanese Patent No. 3573505, a tip of the paper is directed upward by the raised portion, so that a tip of the strip portion easily enters between the staple and the paper.

However, in a case where the paper is curved as in Japanese Patent No. 3573505, depending on the paper quality of the paper, for example, in a case of hard paper, there may be a problem that the tip of the paper is not directed upward and the paper is bent. In this way, when a gap is provided between the paper and the staple using the raised portion, depending on the paper quality, and the staple cannot be stably removed.

In the staple remover described in Japanese Patent No. 3573505, when one end of the paper stopped by the staple is disposed between the rotating plate and the upper wall, the staple is disposed on the trajectory of the strip portion such that a direction of a crown portion is oriented along a radial direction intersecting a moving direction of the strip portion.

In such a configuration, when the remover body rotates around the rotating shaft, the strip portion enters between the staple and the paper from an outer peripheral side in a radial direction along an extending direction of the crown portion, and moves to an inner peripheral side of the crown portion as the remover body rotates. For this reason, a force of removing the staple from the paper bundle is not uniformly applied along the extending direction of the crown portion, and a removal failure in which the staple cannot be removed may occur.

In the staple removing device described in Japanese Patent No. 7058441, since the pressing plate is raised or lowered using a driving force of the motor that drives the removal claw holder having a claw for removing the staple from the sheet bundle, the motor is driven while the sheet bundle is pressurized to the removal setting position.

In the case of a configuration in which the drive lever is manually pressed, it is necessary to continuously press the drive lever during the operation of removing the staple from the sheet bundle.

The present disclosure relates to a staple removing device capable of stably removing a staple.

Further, the present disclosure relates to a staple removing device capable of pressing a paper bundle without using a manual operation or a driving force of a motor during an operation of removing a staple from the paper bundle.

SUMMARY OF INVENTION

According to an aspect of the disclosure, a staple removing device includes a placement portion having a placement surface on which a paper bundle bound by a staple including a crown portion and a leg portion is to be placed, a rotating shaft extending from below the placement surface toward the placement surface, and a removal unit attached to the rotating shaft and rotating along a surface intersecting an axial direction of the rotating shaft. The removal unit includes a tip portion to be inserted between a lower surface of the paper bundle placed on the placement surface and the crown portion, a middle portion connected to the tip portion and having an action surface to be in contact with the crown portion, and a base portion connected to the middle portion and supported by the rotating shaft. An upper surface of the base portion is located on the same plane as the placement surface or below the placement surface, the tip portion is located above the upper surface of the base portion, and an outer peripheral side edge of the middle portion extending along a rotation trajectory of the removal unit in a circumferential direction of the axial direction is formed by a convex arc shape when seen from the axial direction, and an inner peripheral side edge of the middle portion extending along the rotation trajectory of the removal unit is formed by a concave arc shape when seen from the axial direction.

According to another aspect of the disclosure, a staple removing device includes a placement portion having a placement surface on which a paper bundle bound by a staple including a crown portion and a leg portion is to be placed, a rotating shaft extending from below the placement surface toward the placement surface, and a removal unit attached to the rotating shaft and rotating along a surface intersecting with an axial direction of the rotating shaft. The axial direction is inclined with respect to a direction orthogonal to the placement surface, and the removal unit includes a base portion attached to the rotating shaft such that an upper surface of the base portion is located on the same plane as the placement surface or below the placement surface in the inclined axial direction, a middle portion connected to the base portion, and a tip portion connected to the middle portion, located above the upper surface of the base portion in the axial direction, and configured to be inserted between a lower surface of the paper bundle placed on the placement surface and the crown portion.

In the above configuration, the tip portion of the removal unit protrudes above the placement surface, so that the tip portion is inserted between the crown portion of the staple binding the paper bundle and the lower surface of the paper bundle placed on the placement surface by the rotation operation of the removal unit with the rotating shaft as a fulcrum.

According to another aspect of the disclosure, a staple removing device includes a placement portion having a placement surface on which a paper bundle can be placed, a removal unit inserted between a lower surface of the paper bundle placed on the placement surface and a crown portion of a staple binding the paper bundle and configured to remove the staple from the paper bundle, a paper pressing member configured to press the paper bundle placed on the placement surface, a paper thickness adjusting member configured to operate the paper pressing member in a direction toward the placement surface and being displaceable in a direction opposite to the placement surface with respect to the paper pressing member after the paper pressing member comes into contact with the paper bundle, a biasing member disposed between the paper pressing member and the paper thickness adjusting member and configured to bias the paper pressing member in a direction toward the placement surface when the paper thickness adjusting member is displaced with respect to the paper pressing member, and a regulating member configured to regulate a position of the paper thickness adjusting member displaced with respect to the paper pressing member.

In the above configuration, the paper thickness adjusting member operates the paper pressing member in the direction toward the placement surface, and the paper bundle placed on the placement surface is pressed by the paper pressing member. When the paper thickness adjusting member that operates the paper pressing member in the direction toward the placement surface is displaced with respect to the paper pressing member, the paper pressing member is biased by the biasing member in the direction toward the placement surface. The position of the paper thickness adjusting member displaced with respect to the paper pressing member is regulated by the regulating member.

In the present invention, the tip portion of the removal unit can be reliably inserted between the crown portion of the staple binding the paper bundle and the lower surface of the paper bundle placed on the placement surface, and the staple can be stably removed.

Further, in the present invention, the force of removing the staple from the paper bundle is uniformly applied along the extending direction of the crown portion, and the staple can be reliably removed.

Furthermore, in the present invention, the opening portion that exposes the removal unit on the placement surface can be realized by a part of an arc along the rotation trajectory of the removal unit, and a portion where the removal unit is exposed on the placement surface can be reduced.

Further, in the present invention, the paper bundle placed on the placement surface can be pressed by the paper pressing member by the biasing of the biasing member without continuously applying a force for moving the paper pressing member in the direction toward the placement surface.

DESCRIPTION OF EMBODIMENTS

Hereinafter, an embodiment of a staple removing device according to the present invention will be described with reference to the drawings.

<Configuration Example of Staple Removing Device According to Present Embodiment>

Figure 1A:
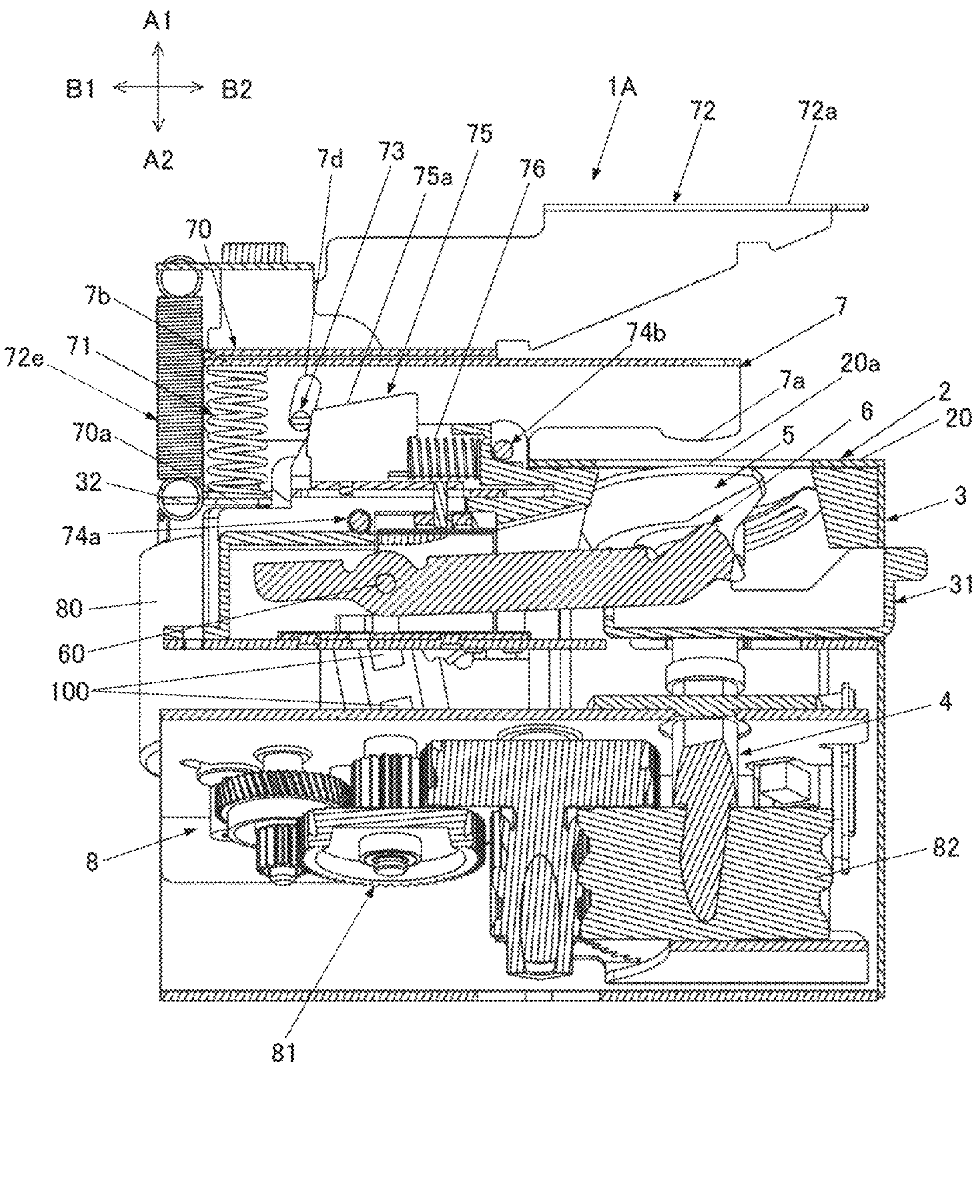
FIG. 1A is a side sectional view illustrating an example of a staple removing device according to the present embodiment.
Figure 1B:
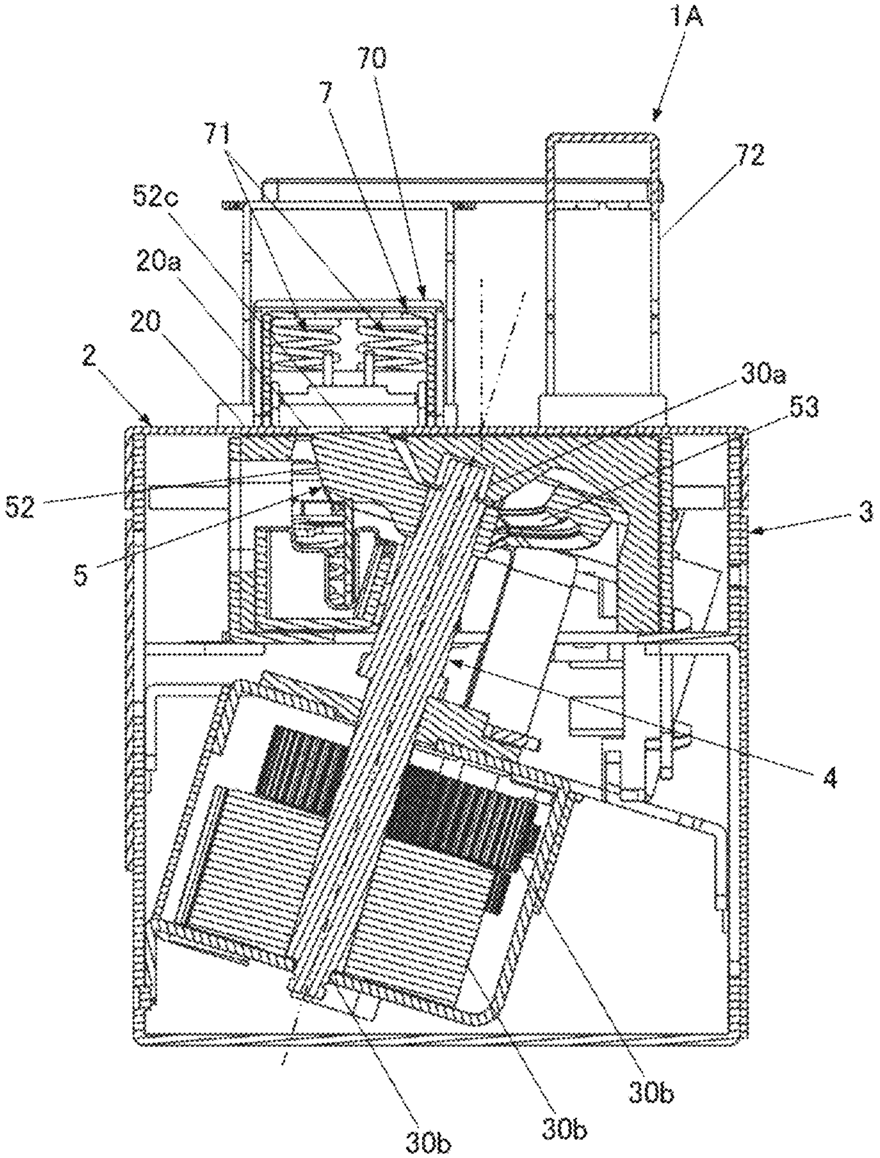
FIG. 1B is a front sectional view illustrating an example of the staple removing device according to the present embodiment.
Figure 1C:
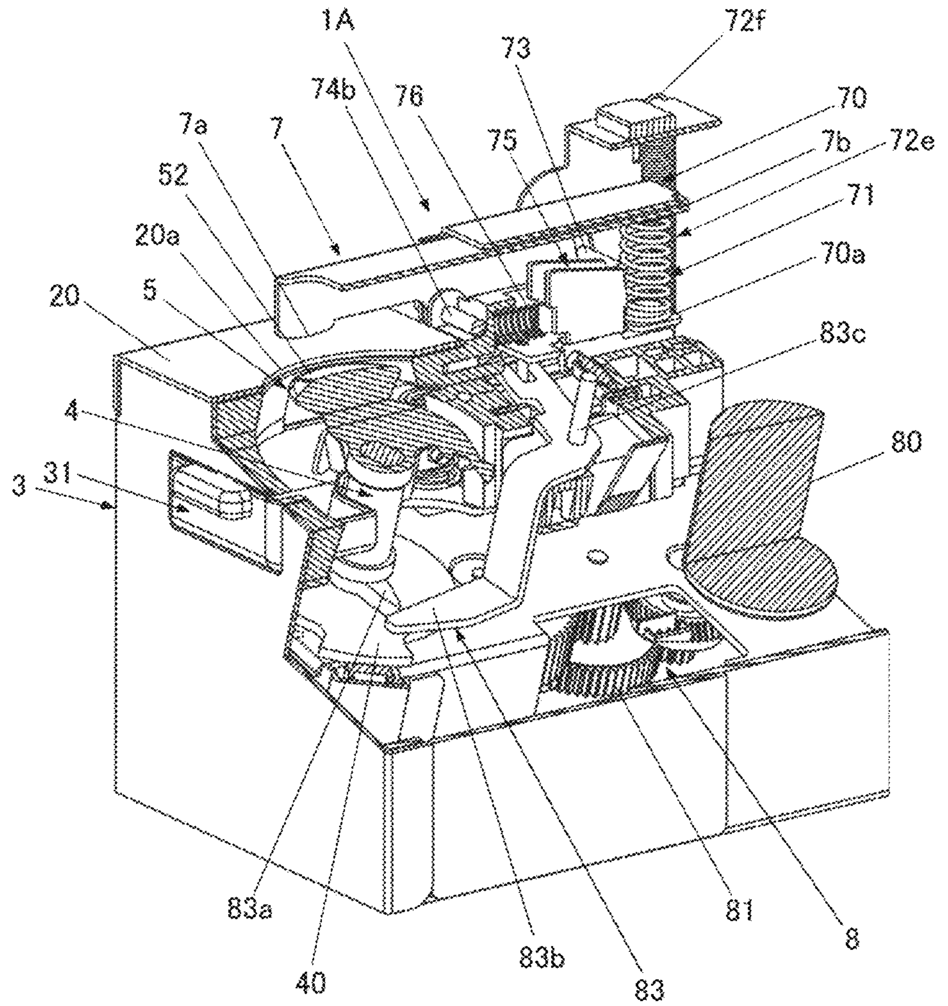
FIG. 1C is a broken perspective view illustrating an example of the staple removing device according to the present embodiment.
Figure 1D:
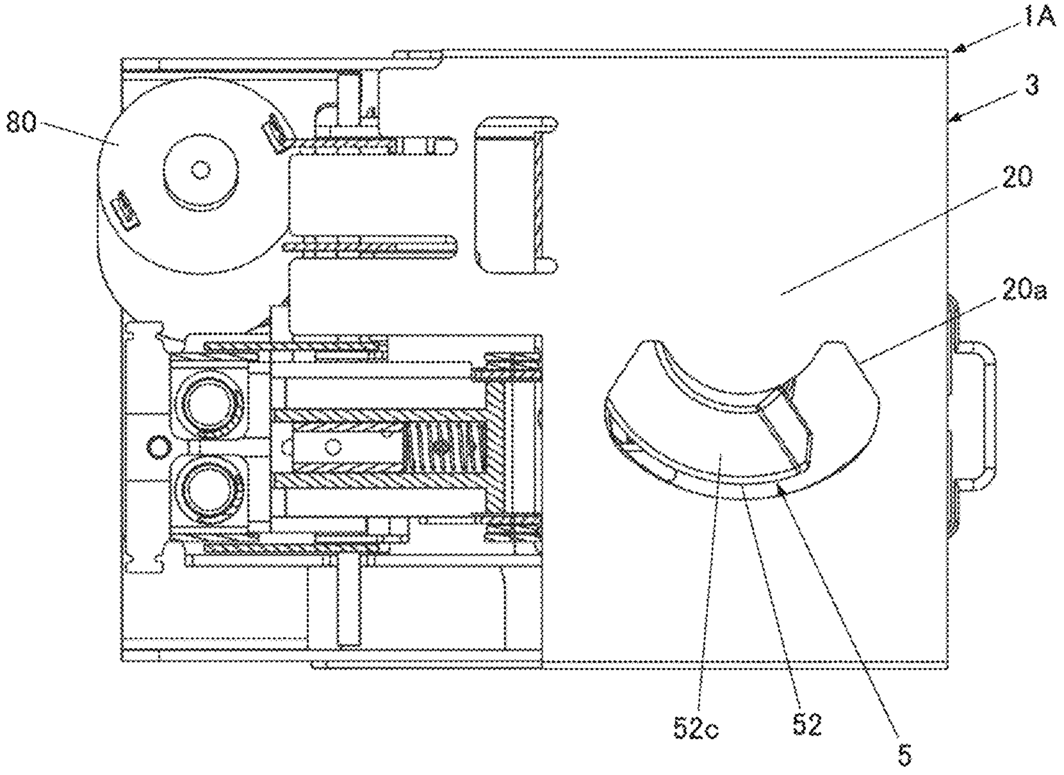
FIG. 1D is a top view illustrating an example of the staple removing device according to the present embodiment.
Figure 1E:
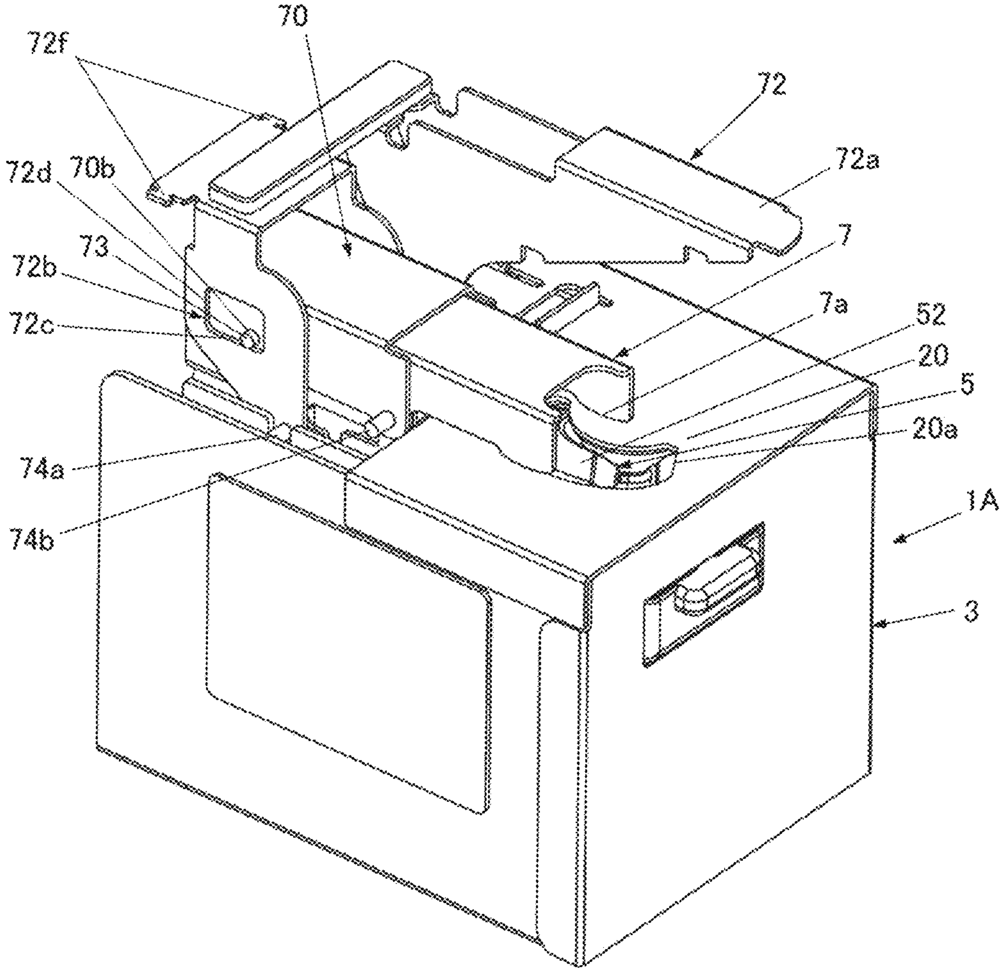
FIG. 1E is a perspective view illustrating an example of the staple removing device according to the present embodiment.
Figure 2A:
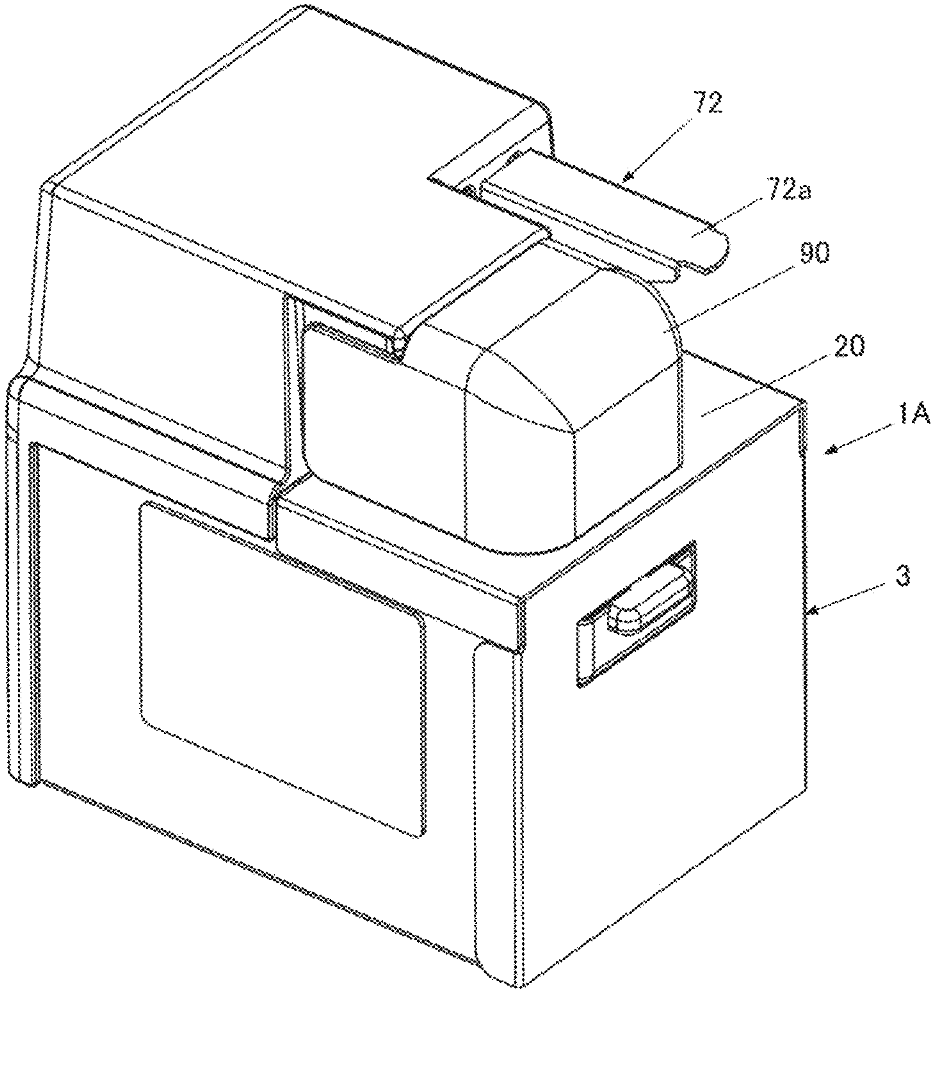
FIG. 2A is an external perspective view illustrating an example of the staple removing device according to the present embodiment with a cover attached thereto.
Figure 2B:
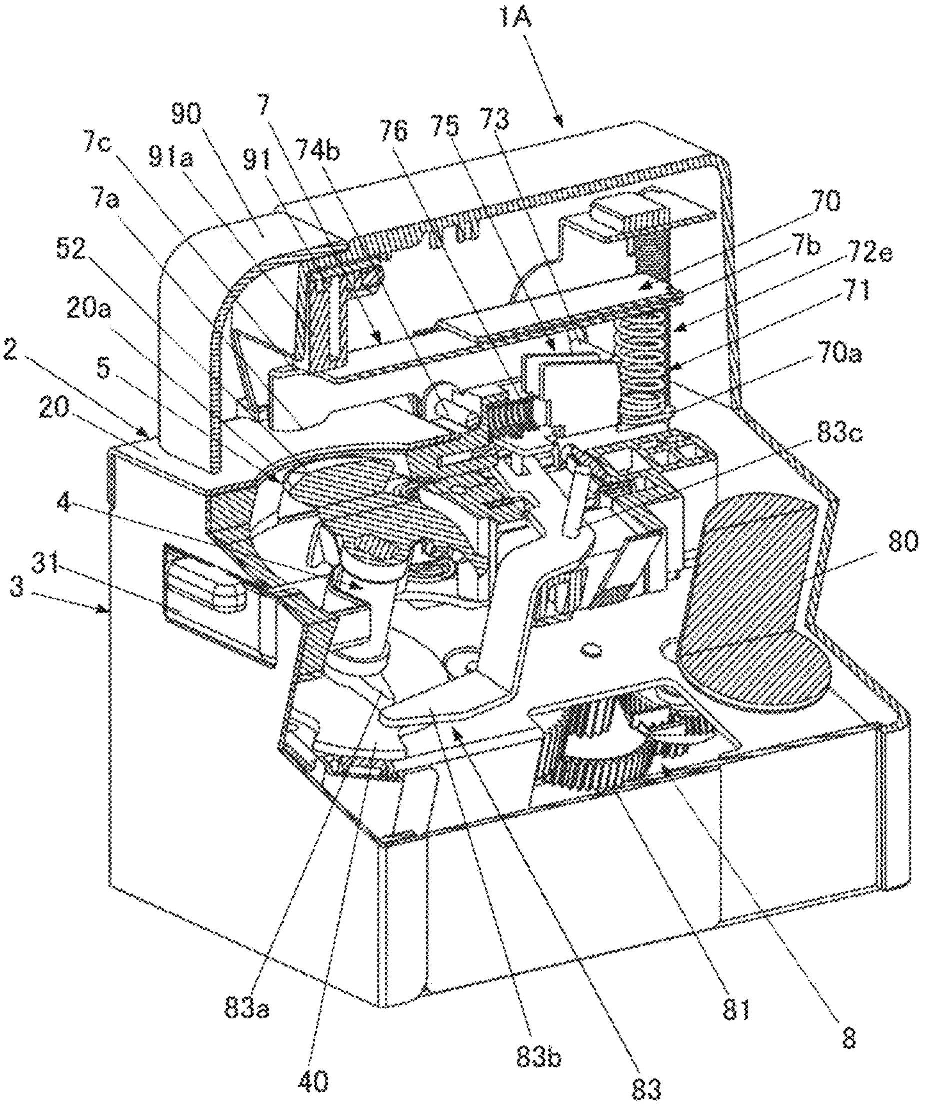
FIG. 2B is a cutaway perspective view illustrating an example of the staple removing device according to the present embodiment with the cover attached thereto.
Figure 2C:
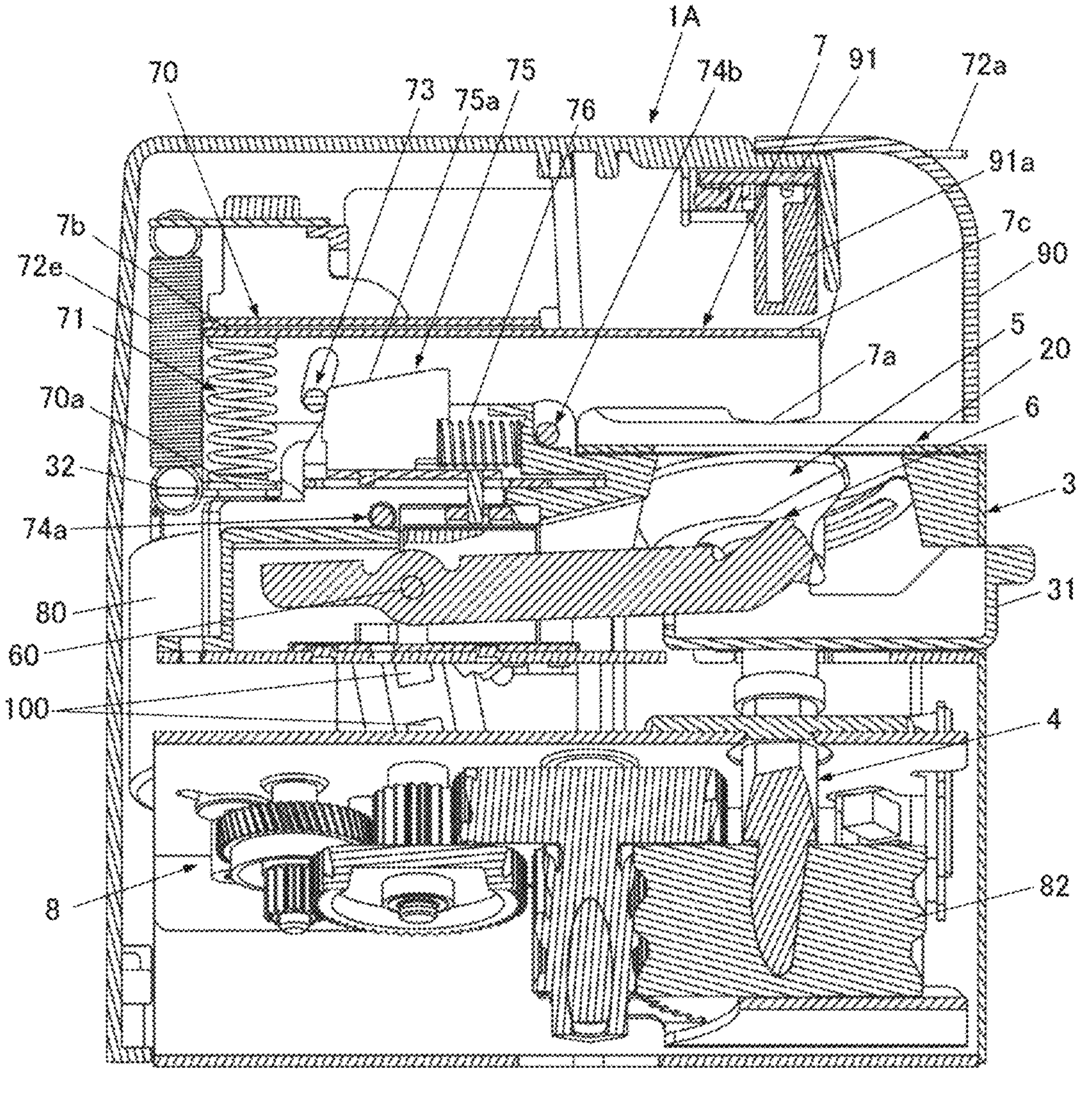
FIG. 2C is a side sectional view illustrating an example of the staple removing device according to the present embodiment with the cover attached thereto.
Figure 2D:
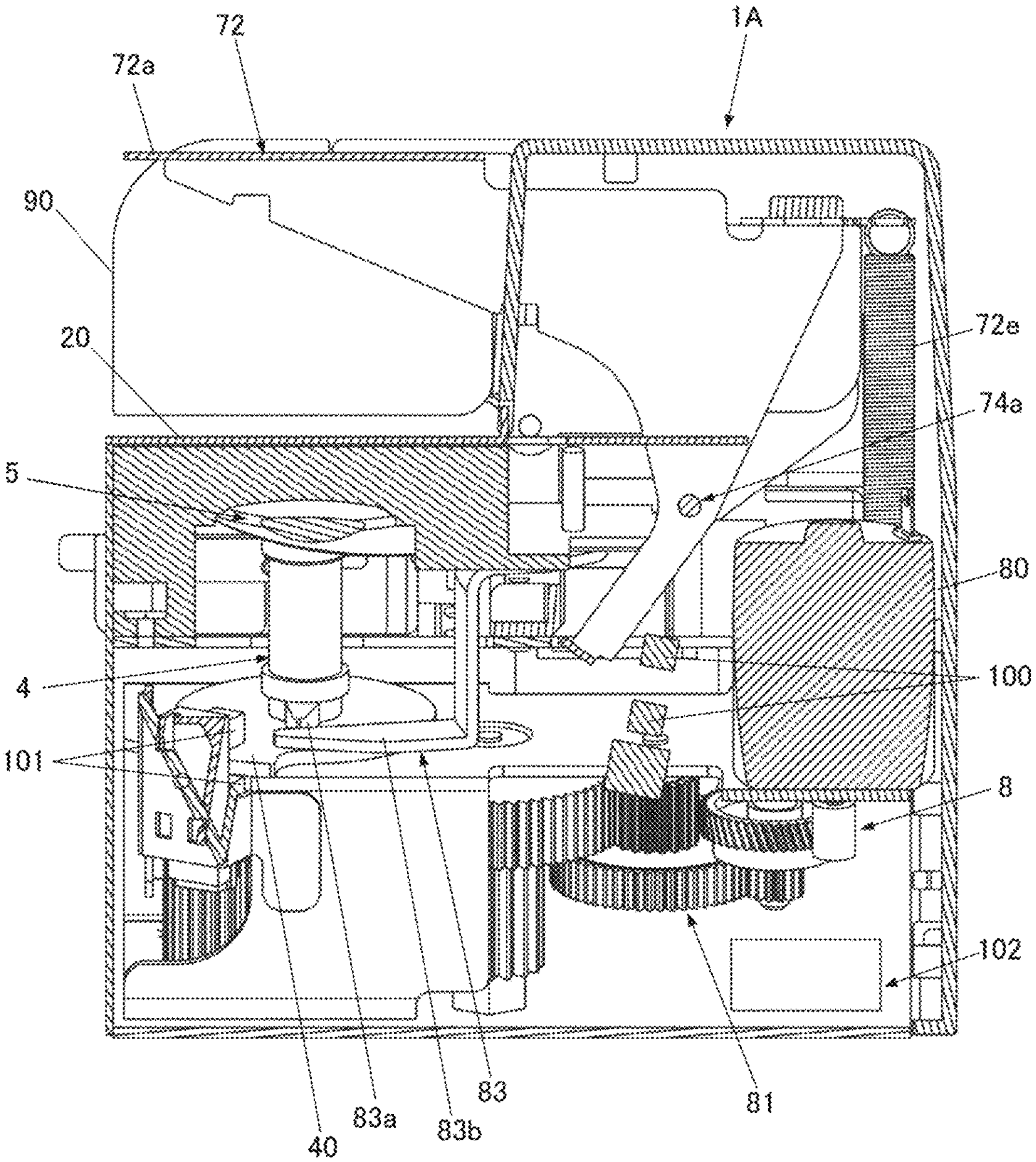
FIG. 2D is a side sectional view illustrating an example of the staple removing device according to the present embodiment with the cover attached thereto.

FIG. 1A is a side sectional view illustrating an example of a staple removing device according to the present embodiment, FIG. 1B is a front sectional view illustrating an example of the staple removing device according to the present embodiment, FIG. 1C is a broken perspective view illustrating an example of the staple removing device according to the present embodiment, FIG. 1D is a top view illustrating an example of the staple removing device according to the present embodiment, and FIG. 1E is a perspective view illustrating an example of the staple removing device according to the present embodiment. FIG. 2A is an external perspective view illustrating an example of the staple removing device according to the present embodiment with a cover attached thereto, FIG. 2B is a broken perspective view illustrating an example of the staple removing device according to the present embodiment with the cover attached thereto, and FIGS. 2C and 2D are side sectional views illustrating an example of the staple removing device according to the present embodiment with the cover attached thereto.

A staple removing device 1A includes a placement portion 2 on which a paper bundle is placed. The placement portion 2 has a placement surface 20 on which a paper bundle can be placed. The placement surface 20 is provided on an upper surface of a housing 3, in which a portion on which the paper bundle is placed is formed by a flat surface.

The staple removing device 1A includes a rotating shaft 4 extending from below the placement surface 20 toward the placement surface 20. The rotating shaft 4 is more rotatably supported by shaft support portions 30*a* and 30*b* provided in the housing 3. An axial direction of the rotating shaft 4 indicated by a two-dot chain line is inclined in a predetermined direction and at a predetermined angle with respect to a direction indicated by a one-dot chain line orthogonal to the placement surface 20 when the staple removing device 1A is viewed from the front.

The staple removing device 1A includes a removal unit 5 that removes a staple binding a paper bundle by a rotation operation. The removal unit 5 is attached to the rotating shaft 4 and rotates along a surface intersecting the axial direction of the rotating shaft 4.

Figure 3A:
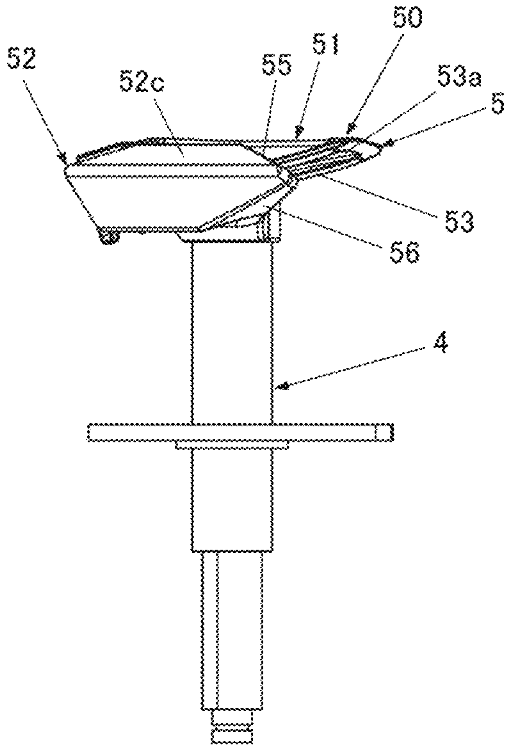
FIG. 3A is a side view illustrating an example of a removal unit when viewed from four directions.
Figure 3B:
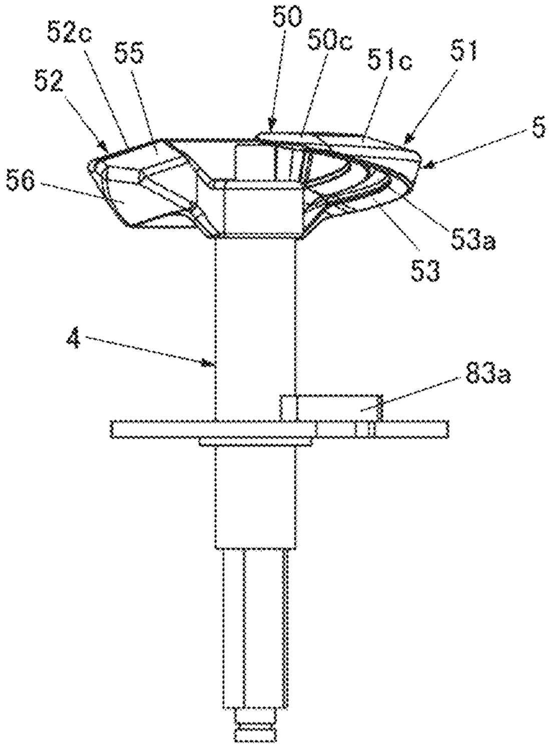
FIG. 3B is a side views illustrating an example of the removal unit when viewed from four directions.
Figure 3C:
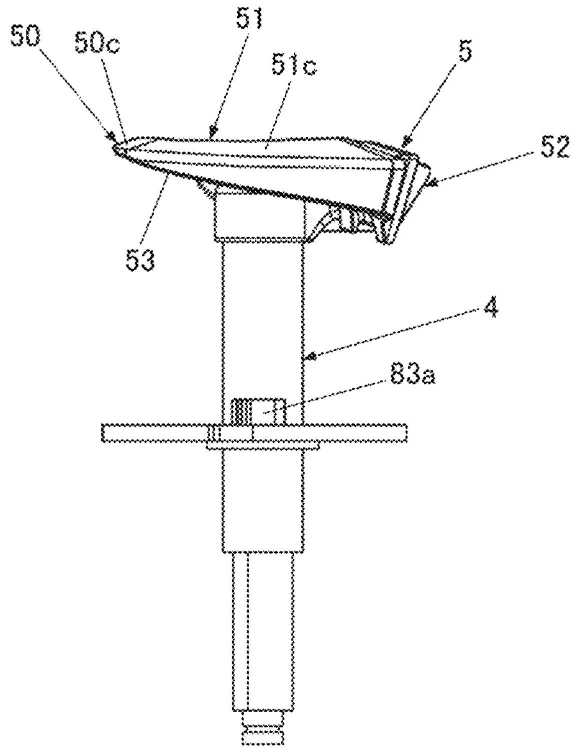
FIG. 3C is a side views illustrating an example of the removal unit when viewed from four directions.
Figure 3D:
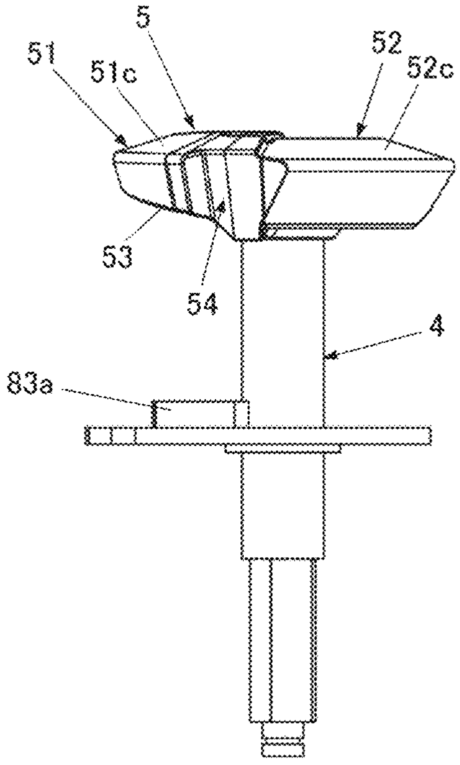
FIG. 3D is a side views illustrating an example of the removal unit when viewed from four directions.
Figure 3E:
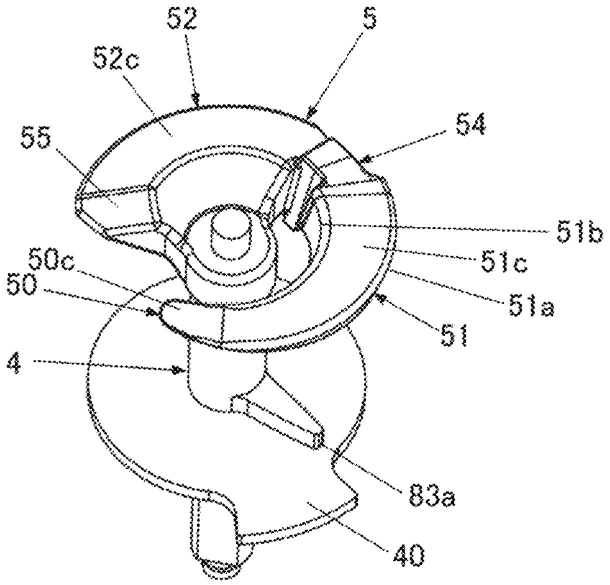
FIG. 3E is a perspective view illustrating an example of the removal unit.
Figure 3F:
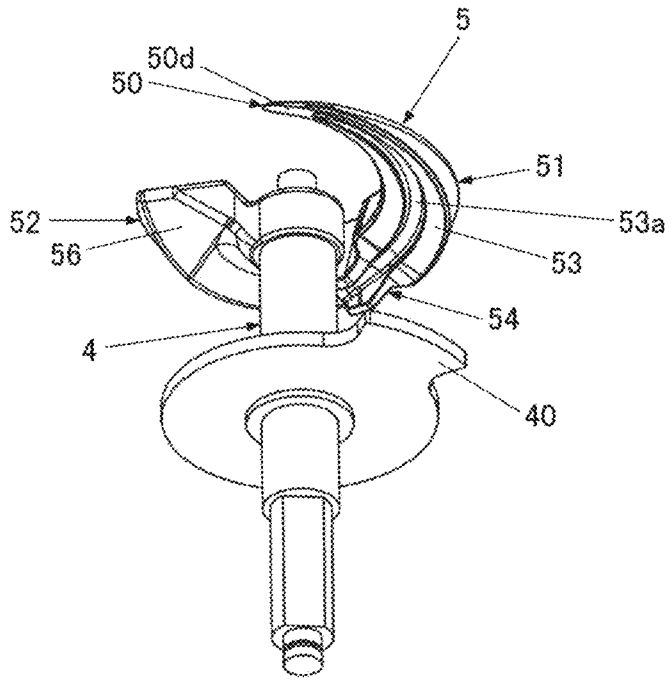
FIG. 3F is a perspective view illustrating an example of the removal unit.
Figure 3G:
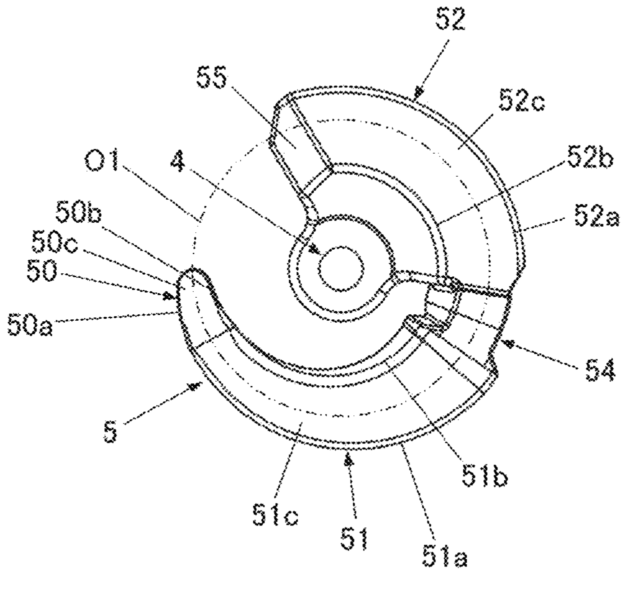
FIG. 3G is a top view illustrating an example of the removal unit.
Figure 3H:
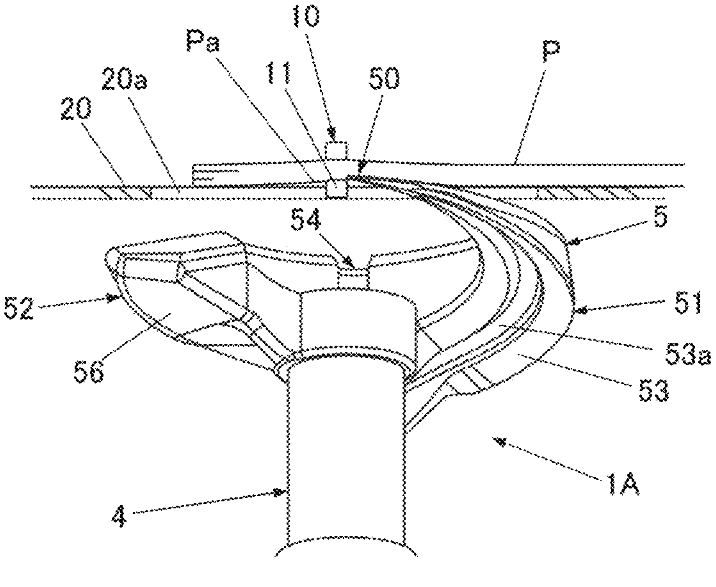
FIG. 3H is a side view illustrating an operation example of the removal unit.

FIGS. 3A to 3D are side views illustrating an example of the removal unit when viewed from four directions, FIGS. 3E to 3F are perspective views illustrating an example of the removal unit, FIG. 3G is a top view illustrating an example of the removal unit, and FIG. 3H is a side view illustrating an operation example of the removal unit.

The removal unit 5 includes a tip portion 50, a middle portion 51 connected to the tip portion 50, and a base portion 52 connected to the middle portion 51, and the tip portion 50, the middle portion 51, and the base portion 52 rotate along a plane intersecting the axial direction of the rotating shaft 4.

The tip portion 50 is formed in a tapered shape in which a thickness along the axial direction of the rotating shaft 4 increases from a tip toward the middle portion 51. Further, the tip portion 50 is configured such that a width along a radial direction of the rotation trajectory of the removal unit 5 rotating around the rotating shaft 4 is shorter than a length along an extending direction of a crown portion 11 of a staple 10. Accordingly, the tip portion 50 has a shape capable of being inserted between a lower surface Pa of a paper bundle P placed on the placement surface 20 and the crown portion 11 of the staple 10 binding the paper bundle P.

The middle portion 51 has an action surface 53 in contact with the crown portion 11 of the staple 10 binding the paper bundle P. The action surface 53 is formed by a lower surface of the middle portion 51. The middle portion 51 is formed in a tapered shape in which the thickness along the axial direction of the rotating shaft 4 increases from the tip portion 50 toward the base portion 52. The middle portion 51 is configured such that the width along the radial direction of the rotation trajectory of the removal unit 5 is shorter than the length along the extending direction of the crown portion 11. Accordingly, the middle portion 51 has a shape in which the action surface 53 is inclined in a direction in which a length between the action surface 53 and the placement surface 20 increases from the tip portion 50 toward the base portion 52.

In the tip portion 50, an outer peripheral side edge 50*a* along a circumferential direction of the rotation trajectory of the removal unit 5 rotating around the rotating shaft 4 as a fulcrum is formed by a convex arc, and an inner peripheral side edge 50*b* is formed by a concave arc.

In the middle portion 51, an outer peripheral side edge 51*a* along the circumferential direction of the rotation trajectory of the removal unit 5 is formed by a convex arc connected to the outer peripheral side edge 50*a* of the tip portion 50, and an inner peripheral side edge 51*b* is formed by a concave arc connected to the inner peripheral side edge 50*b* of the tip portion 50. In the middle portion 51, a distance from a center line O1 of the removal unit 5 passing through a center along the radial direction of the rotation trajectory of the removal unit 5 to the outer peripheral side edge 51*a* is equal to a distance from a center line O1 to the inner peripheral side edge 51*b*.

In the base portion 52, an outer peripheral side edge 52*a* along the circumferential direction of the rotation trajectory of the removal unit 5 is formed by a convex arc, and an inner peripheral side edge 52*b* is formed by a concave arc. A portion of the base portion 52 protruding inward from the inner peripheral side edge 52*b* is supported by the rotating shaft 4.

When the removal unit 5 rotates around the rotating shaft 4, the tip portion 50, the middle portion 51, and the base portion 52 pass through a concentric circle about the rotating shaft 4. Accordingly, the rotation trajectory of the removal unit 5 is a circle around the rotating shaft 4. Further, since the rotating shaft 4 is inclined with respect to a direction orthogonal to the placement surface 20, the rotation trajectory of the removal unit 5 is inclined with respect to the placement surface 20. Accordingly, the rotation trajectory of the removal unit 5 has an apex on a side closer to the placement surface 20.

The placement portion 2 includes an opening portion 20*a* that exposes the removal unit 5. The opening portion 20*a* is an arc-shaped opening opened in the placement surface 20 along the rotation trajectory of the removal unit 5. The opening portion 20*a* includes an apex of the rotation trajectory of the removal unit 5, and a predetermined range from an upstream side to a downstream side of the apex opens in an arc shape.

Accordingly, in the removal unit 5, the tip portion 50, the middle portion 51, and the base portion 52 are exposed on the placement surface 20 from the opening portion 20*a* in this order by rotation around the rotating shaft 4. In the staple removing device 1A, a state where the removal unit 5 is moved to a position where the base portion 52 is exposed to the opening portion 20*a* is set as a standby position of the removal unit 5.

The middle portion 51 has a spiral shape extending upward along the axial direction of the rotating shaft 4 from the base portion 52 toward the tip portion 50. Accordingly, the tip portion 50 protrudes upward along the axial direction of the rotating shaft 4 with respect to an upper surface 52*c* of the base portion 52.

The removal unit 5 is configured such that the upper surface 52*c* of the base portion 52 is located on the same plane as the placement surface 20 or below the same plane at a position where the base portion 52 is exposed to the opening portion 20*a* by rotation around the rotating shaft 4.

The removal unit 5 protrudes upward from the opening portion 20*a* beyond the placement surface 20 at a position where the tip portion 50 is exposed to the opening portion 20*a* by rotation around the rotating shaft 4.

In an upper surface 50*c* and a lower surface 50*d* of the tip portion 50, the action surface 53 and an upper surface 51*c* of the middle portion 51, and the upper surface 52*c* of the base portion 52, a direction along the radial direction of the rotation trajectory of the removal unit 5 is inclined with respect to a surface orthogonal to the rotating shaft 4 at a predetermined angle corresponding to an angle at which the rotating shaft 4 is inclined with respect to the direction orthogonal to the placement surface 20.

Accordingly, in the removal unit 5, the upper surface 50*c* and the lower surface 50*d* of the tip portion 50 are parallel to the placement surface 20 at the position where the tip portion 50 is exposed to the opening portion 20*a* by rotation around the rotating shaft 4. In the removal unit 5, the action surface 53 and the upper surface 51*c* of the middle portion 51 are parallel to the placement surface 20 in a cross section in the extending direction of the crown portion 11 of the staple 10 during the removal at a position where the middle portion 51 is exposed to the opening portion 20*a* by rotation around the rotating shaft 4. Further, in the removal unit 5, the upper surface 52*c* of the base portion 52 is parallel to the placement surface 20 at the position where the base portion 52 is exposed to the opening portion 20*a* by rotation around the rotating shaft 4.

The removal unit 5 includes a narrow portion 54 between the middle portion 51 and the base portion 52. The narrow portion 54 is configured such that the width along the radial direction of the rotation trajectory of the removal unit 5 is equal to or less than the length along the extending direction of the crown portion 11 of the staple 10.

The narrow portion 54 faces a pair of leg portions of the staple 10 raised by an operation of removing the staple 10 from the paper bundle P by the rotation of the removal unit 5 around the rotating shaft 4. When the pair of leg portions of the staple 10 faces the narrow portion 54, the staple 10 is prevented from being held on both sides of the removal unit 5 in a width direction, and the staple 10 is promoted to fall from the removal unit 5.

The removal unit 5 includes a tilting inclined surface 55 on the base portion 52. The tilting inclined surface 55 is formed by providing an inclined surface inclined in a downward direction from the upper surface 52*c* of the base portion 52 toward a rear end.

The staple removing device 1A includes a staple pressing member 6 that regulates a position of the crown portion 11. The staple pressing member 6 is located on the rotation trajectory of the removal unit 5 and is exposed to the opening portion 20*a*. As the removal unit 5 rotates around the rotating shaft 4, the staple pressing member 6 comes into contact with the crown portion 11 pressed by the tip portion 50 by an operation of inserting the tip portion 50 of the removal unit 5 into the lower surface of the paper bundle P and the crown portion 11, and regulates the position of the crown portion 11 from being pressed by the tip portion 50 and moving.

The staple pressing member 6 is supported to be displaceable in a direction toward or away from the placement surface 20 by rotating around the shaft 60.

The action surface 53 of the removal unit 5 includes a guide unit 53*a* that guides raising or lowering of the staple pressing member 6. The guide unit 53*a* is a groove into which the staple pressing member 6 enters, and extends along the rotation trajectory of the removal unit 5. The removal unit 5 includes a push-down inclined surface 56 on the base portion 52. The push-down inclined surface 56 is formed by providing, at the rear end of the base portion 52, an inclined surface inclined in a downward direction toward the guide unit 53*a*.

The staple removing device 1A includes a paper pressing member 7 that presses the paper bundle P placed on the placement surface 20, a paper thickness adjusting member

70 that presses the paper pressing member 7 in a direction of pressing the paper bundle P placed on the placement surface 20, a biasing member 71 that biases the paper pressing member 7 toward the paper bundle P, an operation member 72 that moves the paper pressing member 7 in the direction of pressing the paper bundle P placed on the placement surface 20, and a connecting shaft 73 that transmits the movement of the operation member 72 to the paper thickness adjusting member 70.

The operation member 72 is supported by a first rotating shaft 74*a* and rotates around the first rotating shaft 74*a* as a fulcrum by receiving a force of an operator. The operation member 72 is formed with a receiving portion 72*a* that receives the force of the operator on one side of the first rotating shaft 74*a*.

The staple removing device 1A includes a biasing member 72*e* that biases the operation member 72. The biasing member 72*e* is bridged between a locking portion 72*f* formed on the other side of the operation member 72 with respect to the first rotating shaft 74*a* and a locking portion 32 formed in a housing 3, and biases the operation member 72 in a direction in which the receiving portion 72*a* separates from the placement surface 20.

The paper pressing member 7 and the paper thickness adjusting member 70 are supported by a second rotating shaft 74*b* different from the first rotating shaft 74*a* and rotate around the second rotating shaft 74*b* as a fulcrum.

A contact portion 7*a* is formed on one side of the paper pressing member 7 with respect to the second rotating shaft 74*b*. Further, an acted portion 7*b* that receives a force of the biasing member 71 is formed on the other side of the paper pressing member 7 with respect to the second rotating shaft 74*b*. The paper pressing member 7 moves in a direction in which the contact portion 7*a* moves toward or away from the placement surface 20 by rotating around the second rotating shaft 74*b*.

An acting portion 70*a* that applies a force to the biasing member 71 is formed on the other side of the paper thickness adjusting member 70 with respect to the second rotating shaft 74*b*.

The biasing member 71 is formed of, for example, a coil spring, and is inserted between the acting portion 70*a* and the acted portion 7*b* in a compressed state.

The paper thickness adjusting member 70 has a hole 70*b* into which the connecting shaft 73 is inserted. The operation member 72 has a hole 72*b* into which the connecting shaft 73 is inserted. The paper pressing member 7 further has a hole 7*d* into which the connecting shaft 73 is inserted.

The hole 70*b* is formed by providing a round hole having a diameter equivalent to a diameter of the connecting shaft 73 on the other side of the paper thickness adjusting member 70 between the acting portion 70*a* and the second rotating shaft 74*b*. The hole 7*d* is an elongated hole extending along a trajectory of rotation of the paper pressing member 7 around the second rotating shaft 74*b* as a fulcrum.

The hole 72*b* is formed by providing a square hole having a lower surface 72*c* having a diameter longer than the diameter of the connecting shaft 73 and a side surface 72*d* having a diameter longer than the diameter of the connecting shaft 73 on the other side of the operation member 72 opposite to a side on which the receiving portion 72*a* is provided across the first rotating shaft 74*a*.

The connecting shaft 73 is inserted into the hole 70*b* of the paper thickness adjusting member 70 and the hole 72*b* of the operation member 72, and comes into contact with the lower surface 72*c* of the hole 72*b*.

Accordingly, the connecting shaft 73 transmits the movement of the operation member 72 caused by the rotation of the operation member 72 around the first rotating shaft 74*a* as a fulcrum to the paper thickness adjusting member 70 via the hole 72*b* of the operation member 72 and the hole 70*b* of the paper thickness adjusting member 70.

The paper thickness adjusting member 70 is displaced with respect to the paper pressing member 7 according to a distance between the contact portion 7*a* of the paper pressing member 7 and the placement surface 20 while the movement of the operation member 72 is transmitted to displace the paper pressing member 7. After the contact portion 7*a* of the paper pressing member 7 comes into contact with the paper bundle P, the paper pressing member 7 cannot move further toward the paper bundle P. The paper thickness adjusting member 70 is displaceable with respect to the paper pressing member 7 which cannot be moved toward the paper bundle P by moving the connecting shaft 73 along the hole 7*d* by further operating the operation member. Further, when the paper thickness adjusting member 70 is displaced with respect to the paper pressing member 7, the biasing member 71 biases the paper pressing member 7 in a direction in which the contact portion 7*a* moves toward the placement surface 20.

A distance from the connecting shaft 73 inserted into the hole 70*b* of the paper thickness adjusting member 70 to the second rotating shaft 74*b* is longer than a distance from a portion where the lower surface 72*c* of the hole 72*b* and the connecting shaft 73 are in contact with each other to the first rotating shaft 74*a*. Accordingly, a force with which the contact portion 7*a* of the paper pressing member 7 presses the paper bundle P is amplified with respect to a force with which the receiving portion 72*a* of the operation member 72 is pressed.

The staple removing device 1A includes a regulating member 75 that regulates a position of the paper thickness adjusting member 70 displaced with respect to the paper pressing member 7, and a biasing member 76 that biases the regulating member 75.

The connecting shaft 73 moves in a first direction indicated by an arrow A1, which is an upward direction of the staple removing device 1A, and a second direction indicated by an arrow A2 opposite to the first direction, which is a downward direction of the staple removing device 1A, by the rotation of the paper thickness adjusting member 70 with the second rotating shaft 74*b* as a fulcrum.

The regulating member 75 is supported to be movable in a third direction indicated by an arrow B1 and a fourth direction indicated by an arrow B2 opposite to the third direction, which are directions in which a gap for inserting the paper bundle P is located in the staple removing device 1A and intersecting the first direction and the second direction. The biasing member 76 is an example of a second biasing member, is formed of a coil spring or the like, and biases the regulating member 75 in the third direction. The regulating member 75 includes a regulating surface 75*a* with which the connecting shaft 73 comes into contact. The regulating surface 75*a* is inclined toward the first direction along the third direction.

When the connecting shaft 73 moves in the hole 7*d* in the first direction, which is the upward direction, the paper thickness adjusting member 70 moves the paper pressing member 7 in the direction in which the contact portion 7*a* moves toward the placement surface 20, and the connecting shaft 73 retreats from a movement path of the regulating member 75 that moves in the third direction, and the regulating member 75 is movable in the third direction.

When the regulating member 75 is movable in the third direction, the regulating member 75 is biased by the biasing member 76 and moves in the third direction to a position where the regulating surface 75*a* is in contact with the connecting shaft 73. When the connecting shaft 73 comes into contact with the regulating surface 75*a*, the movement of the connecting shaft 73 in the second direction is regulated.

Accordingly, the paper thickness adjusting member 70 is regulated from rotating around the second rotating shaft 74*b* as a fulcrum in a direction in which the connecting shaft 73 moves in the second direction, which is the downward direction.

When the regulating member 75 moves in the fourth direction from a state where the connecting shaft 73 is in contact with the regulating surface 75*a*, the regulating member 75 retreats from a movement path of the connecting shaft 73 that moves in the second direction, and the connecting shaft 73 is movable in the second direction.

When the connecting shaft 73 is movable in the second direction, the paper thickness adjusting member 70 rotates around the second rotating shaft 74*b* as a fulcrum, and the connecting shaft 73 moves in the second direction. When the connecting shaft 73 moves in the second direction, the paper pressing member 7 rotates around the second rotating shaft 74*b* as a fulcrum in a direction in which the contact portion 7*a* moves away from the placement surface 20.

The staple removing device 1A includes a drive unit 8 that drives the removal unit 5 and the regulating member 75. The drive unit 8 includes a motor 80, a gear group 81 that transmits rotation of the motor 80 to the rotating shaft 4, and a gear 82 that is attached to the rotating shaft 4 and meshes with a gear of the last stage of the gear group 81. The drive unit 8 includes a transmission member 83 that transmits rotation of the motor 80 to the regulating member 75. The transmission member 83 includes a cam 83*a* attached to the rotating shaft 4 and a link 83*b* that transmits displacement of the cam 83*a* to the regulating member 75.

The cam 83*a* has a cam surface whose distance from a center of the rotating shaft 4 changes. One side of the link 83*b* is in contact with the cam 83*a*, and the other side is locked to the regulating member 75. The link 83*b* rotates around a shaft 83*c* as a fulcrum by being displaced following the cam 83*a*, and operates the regulating member 75.

In the transmission member 83, when the drive unit 8 stops in a state where the removal unit 5 moves to a standby position where the base portion 52 is exposed to the opening portion 20*a*, the cam 83*a* and the link 83*b* hold the regulating member 75, and the regulating member 75 is regulated from moving in the third direction by the biasing of the biasing member 76.

In addition, in the transmission member 83, the link 83*b* follows the cam 83*a* by the operation of one rotation of the rotating shaft 4, the regulating member 75 biased by the biasing member 76 moves in the third direction, and the regulating member 75 moves in the fourth direction at a predetermined timing during one rotation of the rotating shaft 4.

The staple removing device 1A includes a cover 90 that covers a part of the placement surface 20. The cover 90 covers an upper side of a portion including the opening portion 20*a* of the placement surface 20. The cover 90 is made of a transparent material that allows the opening portion 20*a* to be visually recognized. A gap into which the paper bundle P can be inserted is formed between a lower surface of the cover 90 and the placement surface 20.

The staple removing device 1A includes a light source 91 that emits light to the base portion 52 exposed on the placement surface 20, and a light guide unit 91*a* that guides the light emitted from the light source 91.

The light source 91 is provided at a position facing the opening portion 20*a* of the placement surface 20. The paper pressing member 7 is provided between the light source 91 and the opening portion 20*a*. The paper pressing member 7 includes a window portion 7*c* in an optical path of the light emitted from the light source 91.

The light guide unit 91*a* guides the light emitted from the light source 91 toward the opening portion 20*a* through the window portion 7*c*, and forms a linear image simulating the staple 10 binding the paper bundle P.

When the paper bundle P is placed on the placement surface 20, the staple 10 binding the paper bundle P needs to be aligned with a predetermined position of the opening portion 20*a*.

Here, the light source 91 emits light to the base portion 52 exposed on the placement surface 20 in a state where the removal unit 5 moves to the standby position where the base portion 52 is exposed to the opening portion 20*a* of the placement surface 20.

Accordingly, when the paper bundle P is not placed on the placement surface 20, a linear image that simulates the staple 10 binding the paper bundle P is formed by the light emitted from the light source 91 to the base portion 52 exposed to the opening portion 20*a*, and the image of the light serves as a guide of a position of the staple 10 when the paper bundle P is placed on the placement surface 20.

When the paper bundle P is placed on the placement surface 20, a linear image simulating the staple 10 binding the paper bundle P is formed by the light emitted from the light source 91 to the paper bundle P. By aligning this image of light with the position of the staple 10 binding the paper bundle P placed on the placement surface 20, the staple 10 binding the paper bundle P is aligned with the predetermined position of the opening portion 20*a*.

The staple removing device 1A includes an operation detection unit 100 that detects a position of the operation member 72. The operation detection unit 100 is implemented by an optical sensor or the like including the pair of light emitting and receiving elements, and is provided at a position where the operation member 72 rotated by a predetermined amount around the first rotating shaft 74*a* as a fulcrum in a direction in which the receiving portion 72*a* moves toward the placement surface 20 can be detected.

The staple removing device 1A includes a rotary position detection unit 101 that detects a position of the rotating shaft 4 in a rotational direction. The rotary position detection unit 101 includes an optical sensor including a pair of light emitting and receiving elements. The rotating shaft 4 includes a detected unit 40 detected by the rotary position detection unit 101. The detected unit 40 is formed by a convex portion that protrudes in a radial direction of the rotating shaft 4. The rotary position detection unit 101 is provided at a position where the detected unit 40 can be detected when the removal unit 5 moves to a predetermined standby position.

The staple removing device 1A includes a control unit 102 that controls the motor 80 based on outputs of the operation detection unit 100 and the rotary position detection unit 101. When the operation detection unit 100 detects that the receiving portion 72*a* of the operation member 72 is pressed to a predetermined position, the control unit 102 rotates the motor 80 in a predetermined direction. When the rotary position detection unit 101 detects that the removal unit 5 rotates by a predetermined amount, the control unit 102 stops the rotation of the motor 80.

The staple removing device 1A includes a collection unit 31 that collects the staple 10 removed from the paper bundle P. The collection unit 31 is provided below the opening portion 20*a* along the rotation trajectory of the removal unit 5, and accommodates the staple 10 removed and dropped from the paper bundle P. The collection unit 31 is able to be pulled out with respect to the housing 3, and is able to discharge the accommodated staple 10.

<Operation Example of Staple Removing Device According to Present Embodiment>

Figure 4:
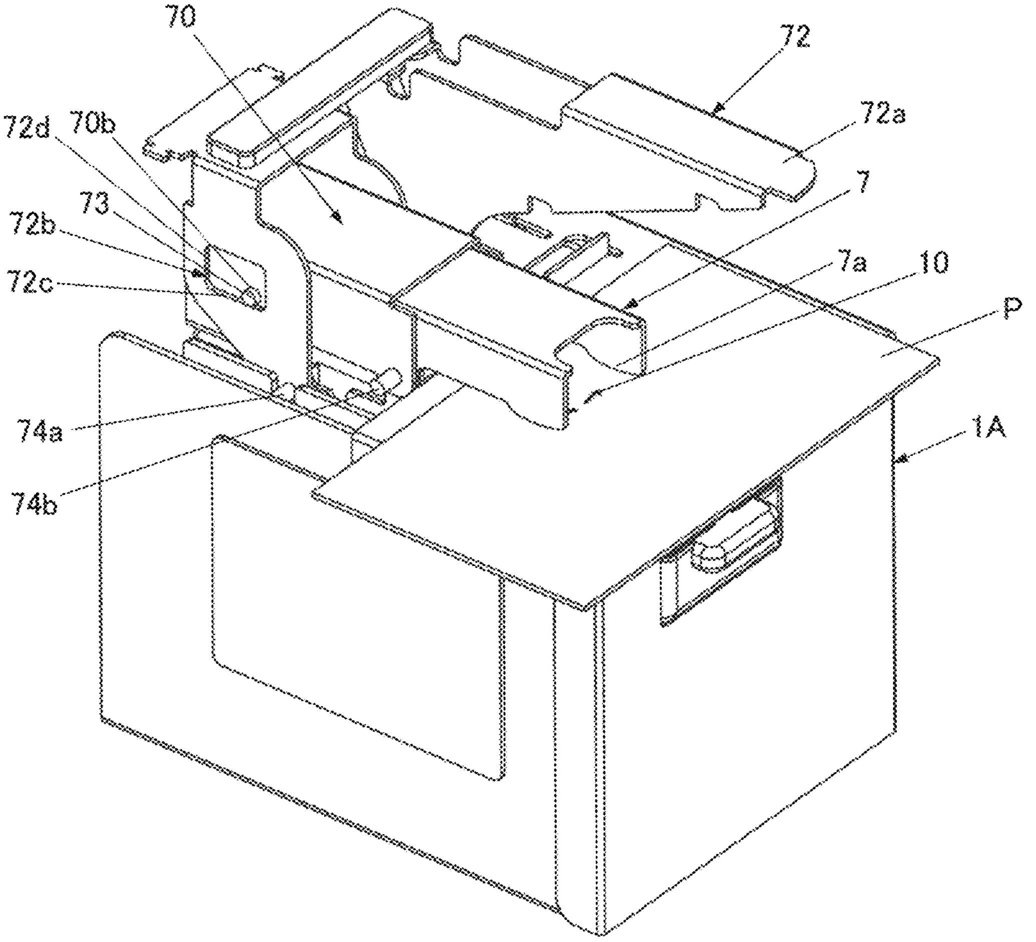
FIG. 4 is a perspective view illustrating an example of an operation of the staple removing device according to the present embodiment.
Figure 5A:
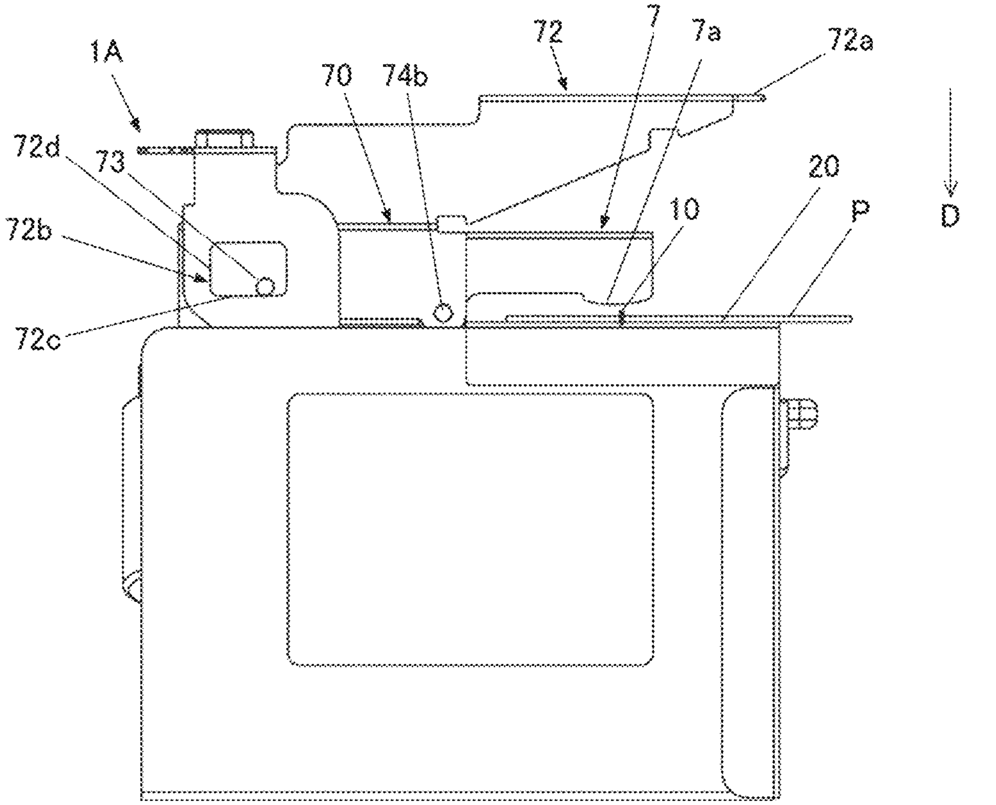
FIG. 5A is a side view illustrating an example of the operation of the staple removing device according to the present embodiment.
Figure 5B:
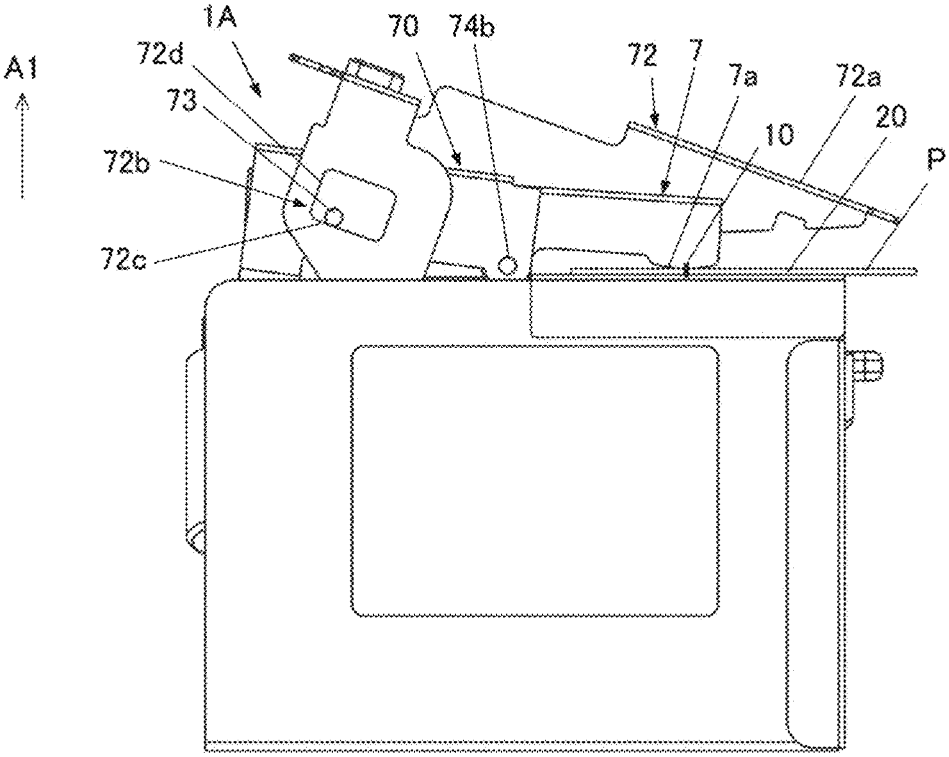
FIG. 5B is a side view illustrating an example of the operation of the staple removing device according to the present embodiment.
Figure 6A:
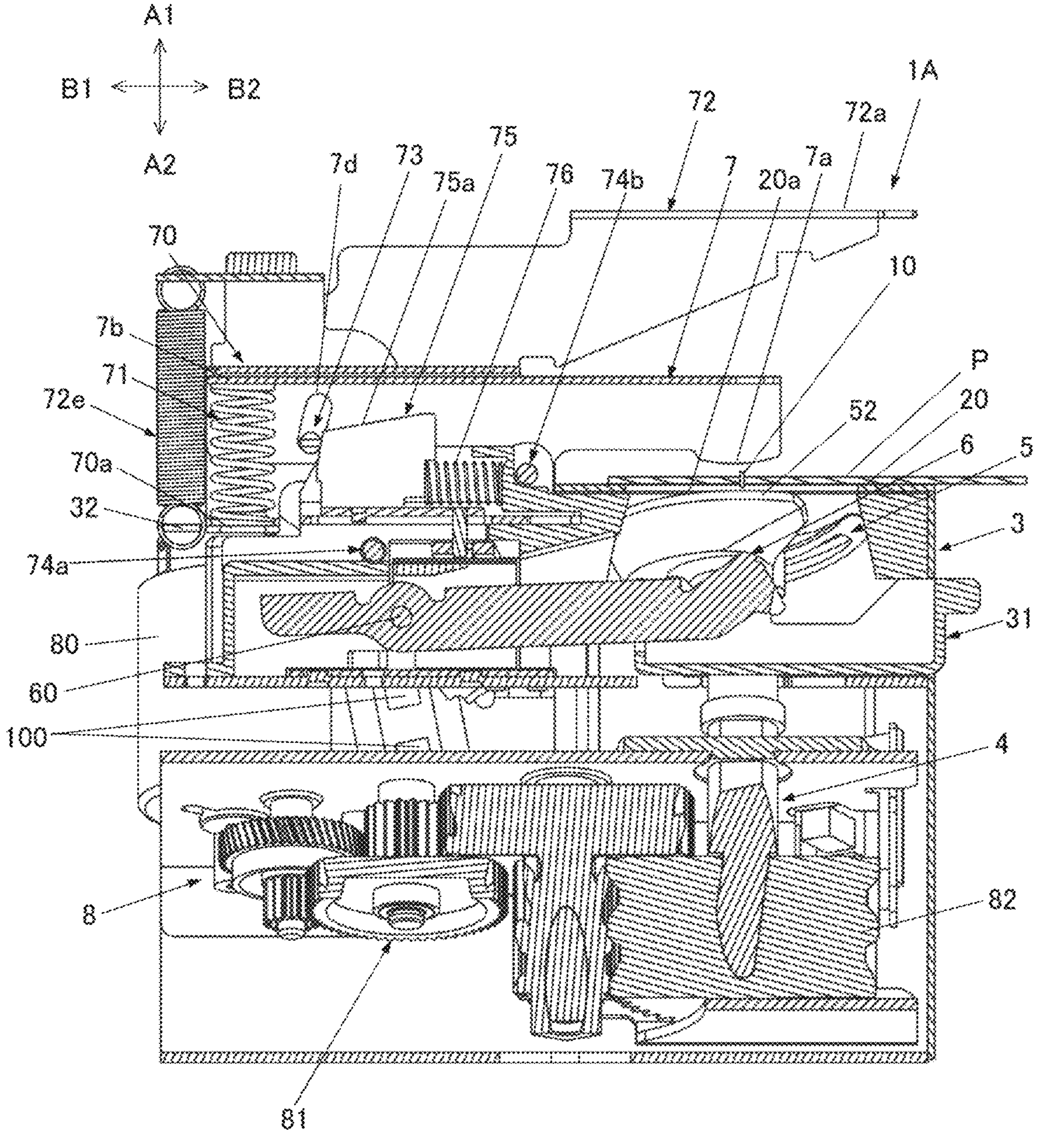
FIG. 6A is a side sectional view illustrating an example of the operation of the staple removing device according to the present embodiment.
Figure 6B:
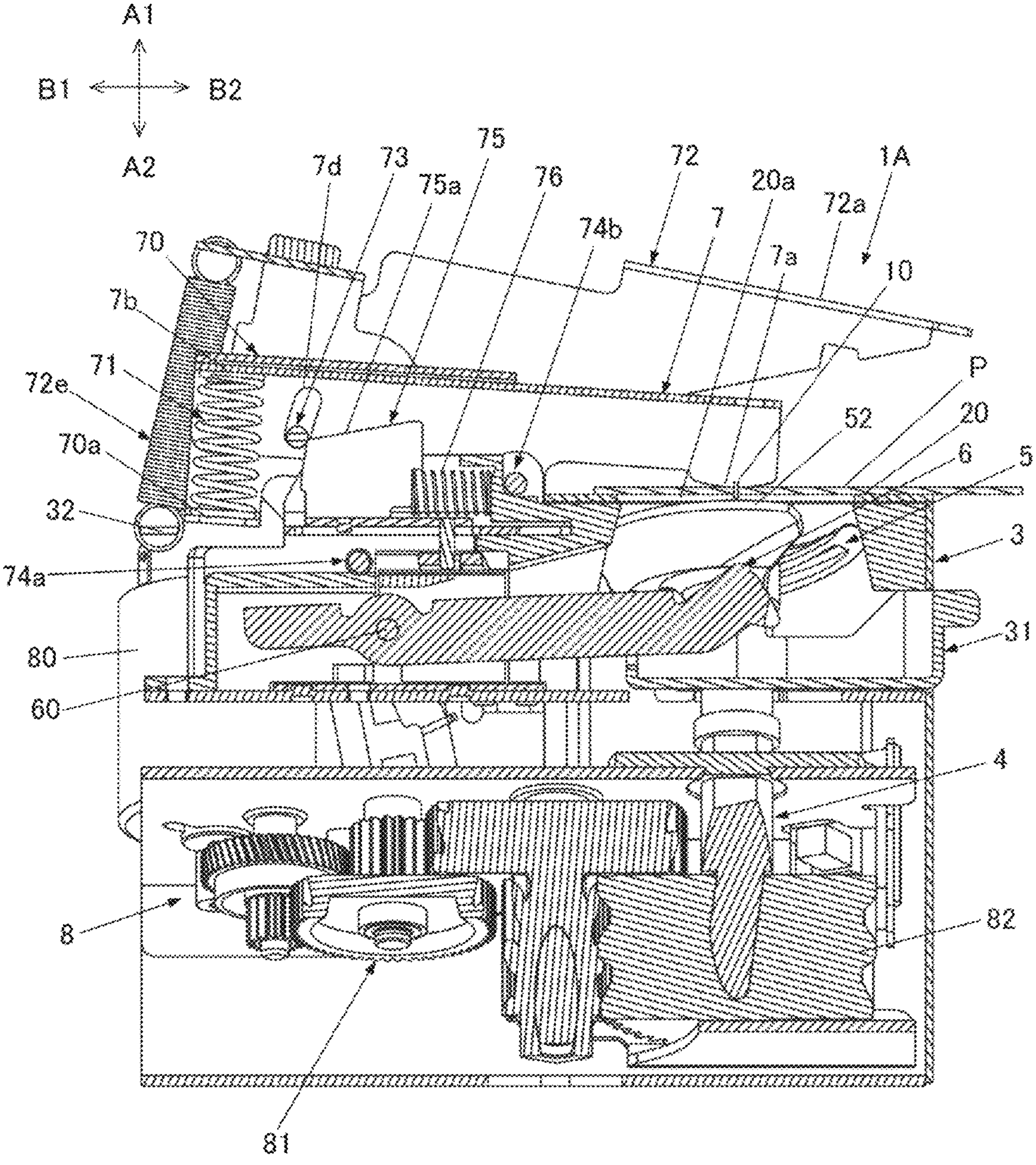
FIG. 6B is a side sectional view illustrating an example of the operation of the staple removing device according to the present embodiment.
Figure 6C:
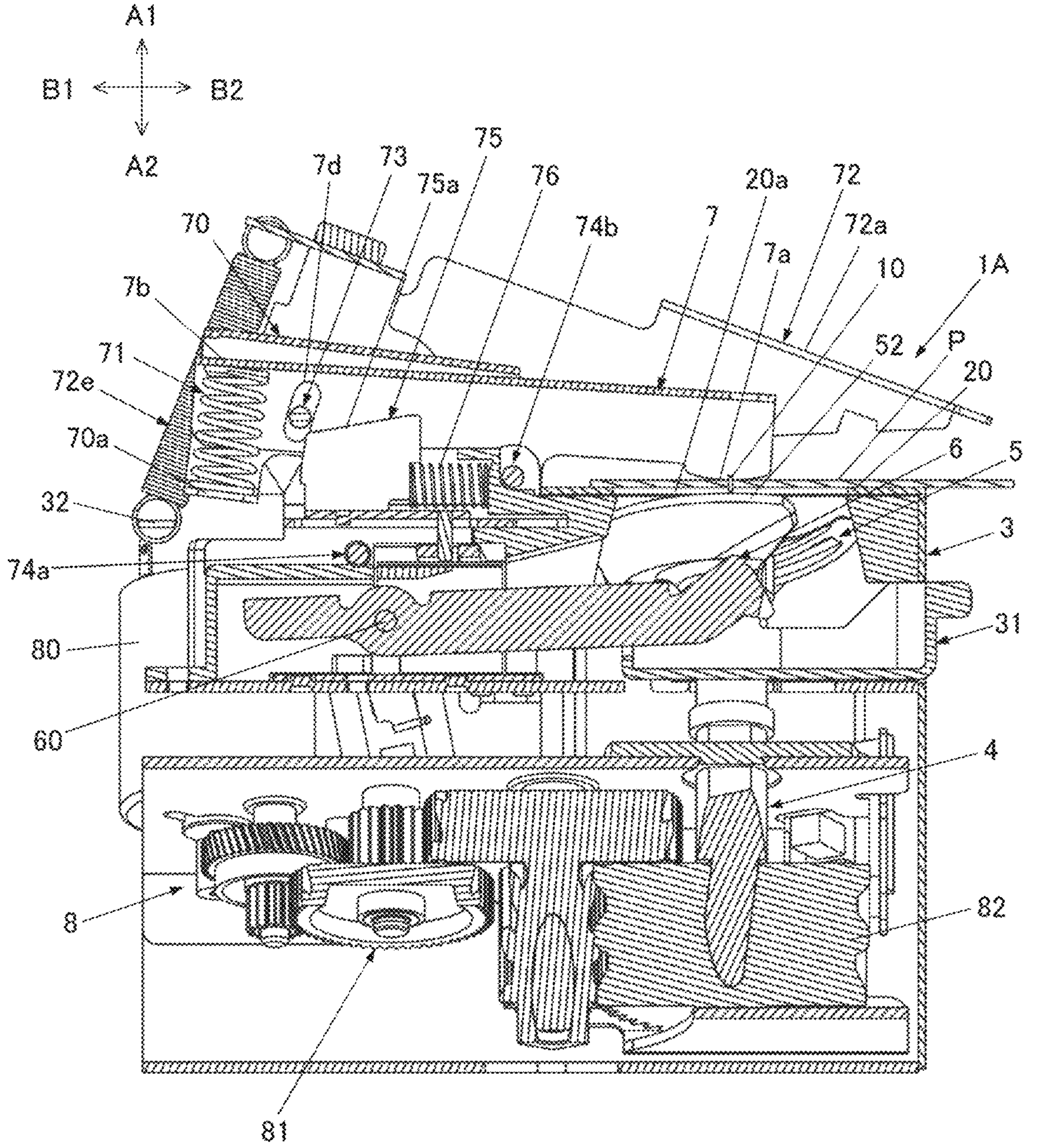
FIG. 6C is a side sectional view illustrating an example of the operation of the staple removing device according to the present embodiment.
Figure 6D:
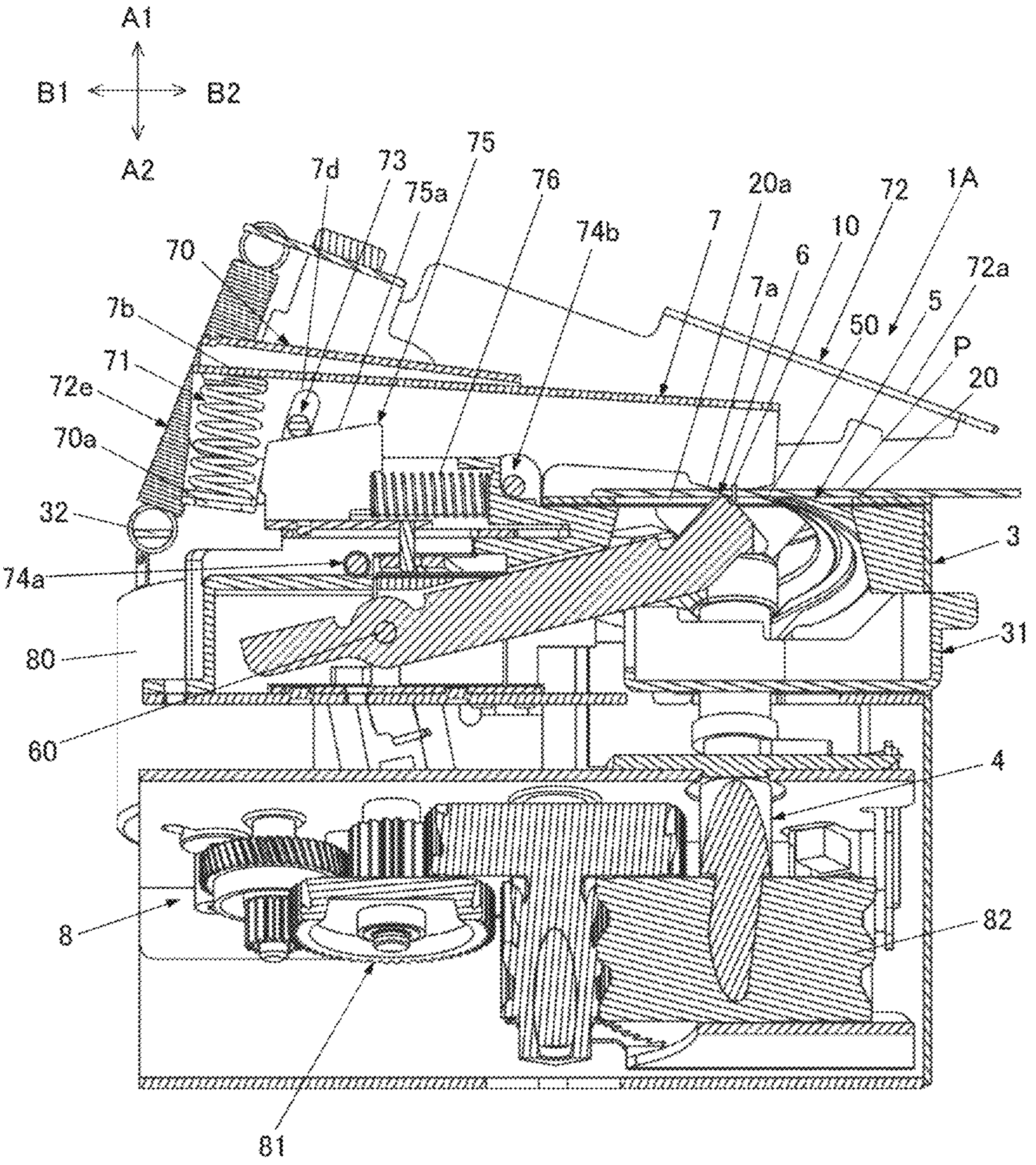
FIG. 6D is a side sectional view illustrating an example of the operation of the staple removing device according to the present embodiment.
Figure 7A:
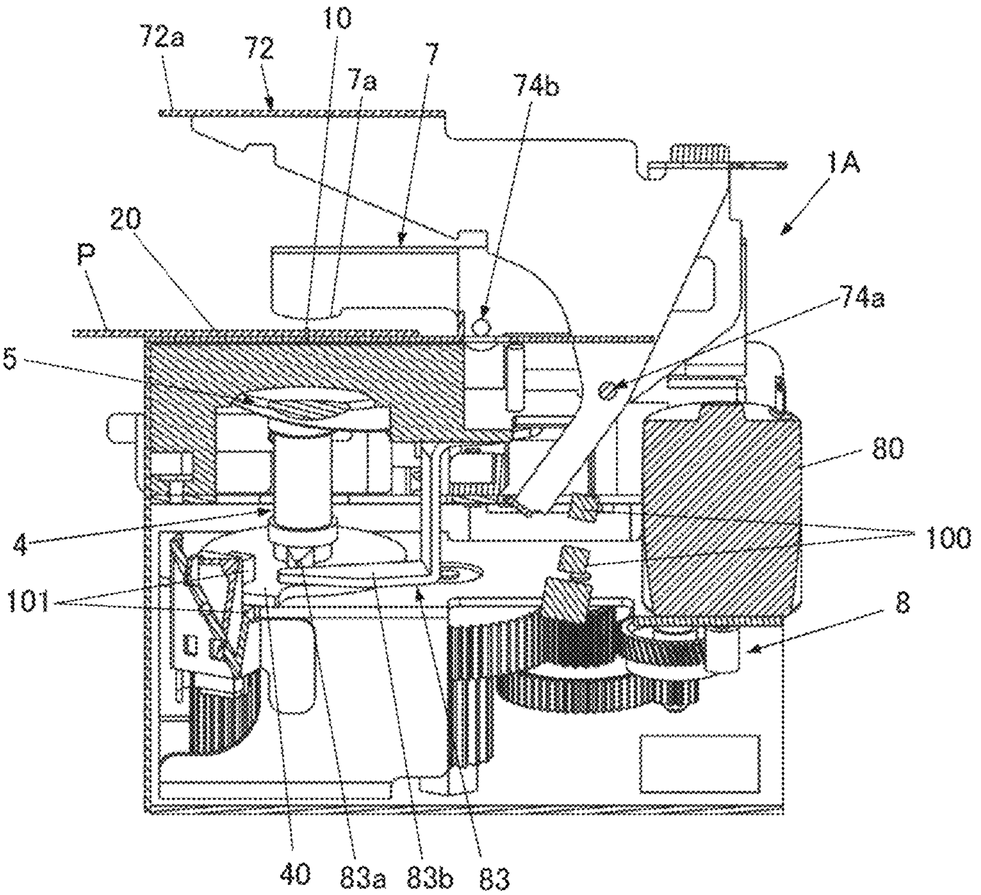
FIG. 7A is a side sectional view illustrating an example of the operation of the staple removing device according to the present embodiment.
Figure 7B:
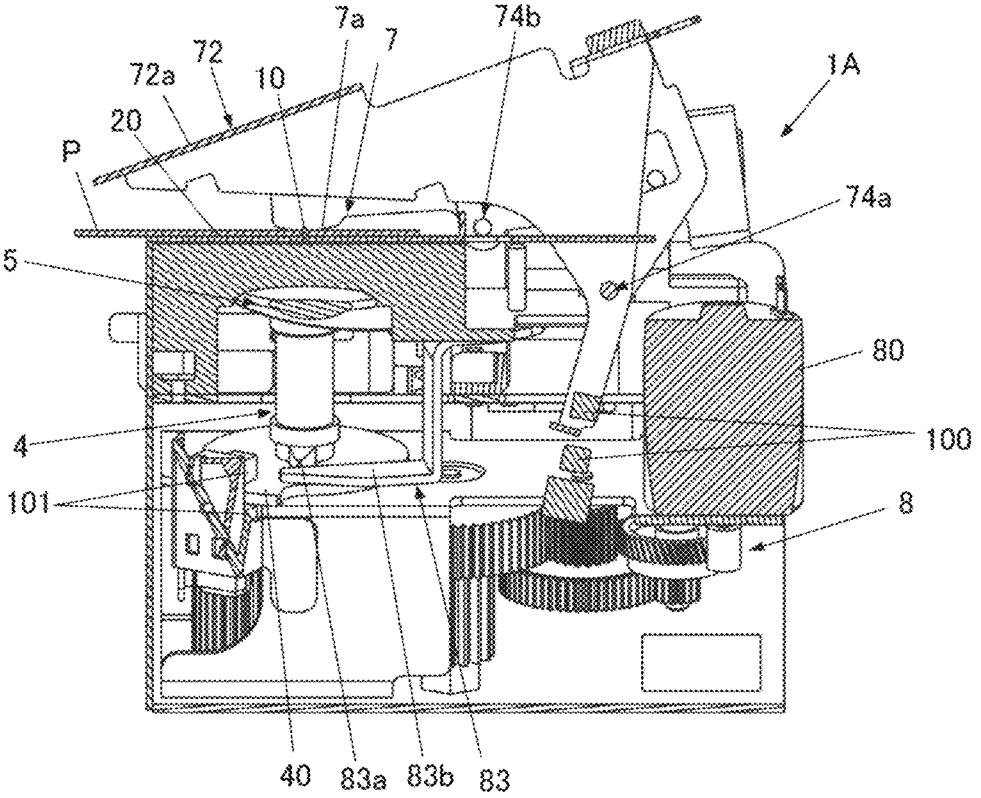
FIG. 7B is a side sectional view illustrating an example of the operation of the staple removing device according to the present embodiment.
Figure 8A:
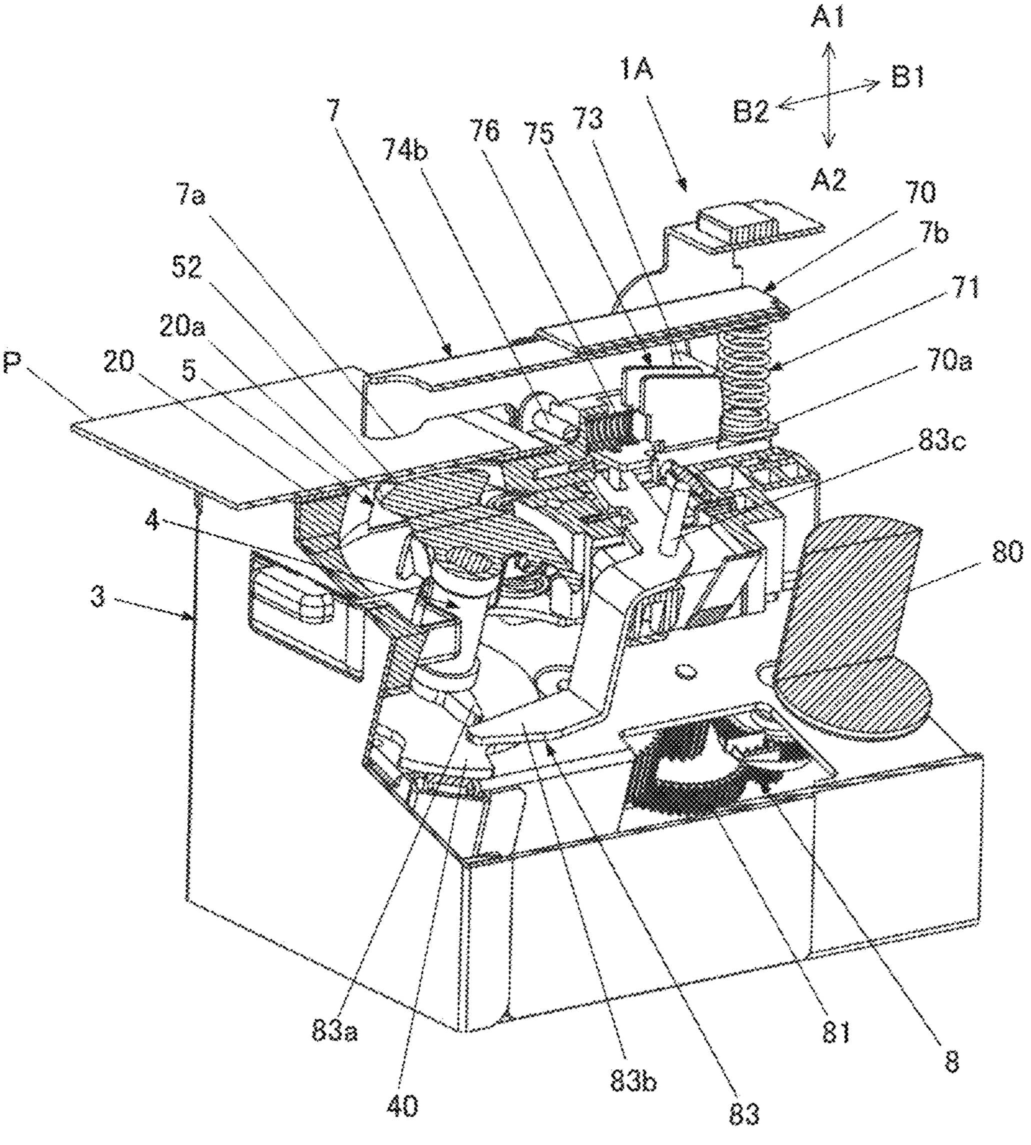
FIG. 8A is a partially broken perspective view illustrating an example of the operation of the staple removing device according to the present embodiment.
Figure 8B:
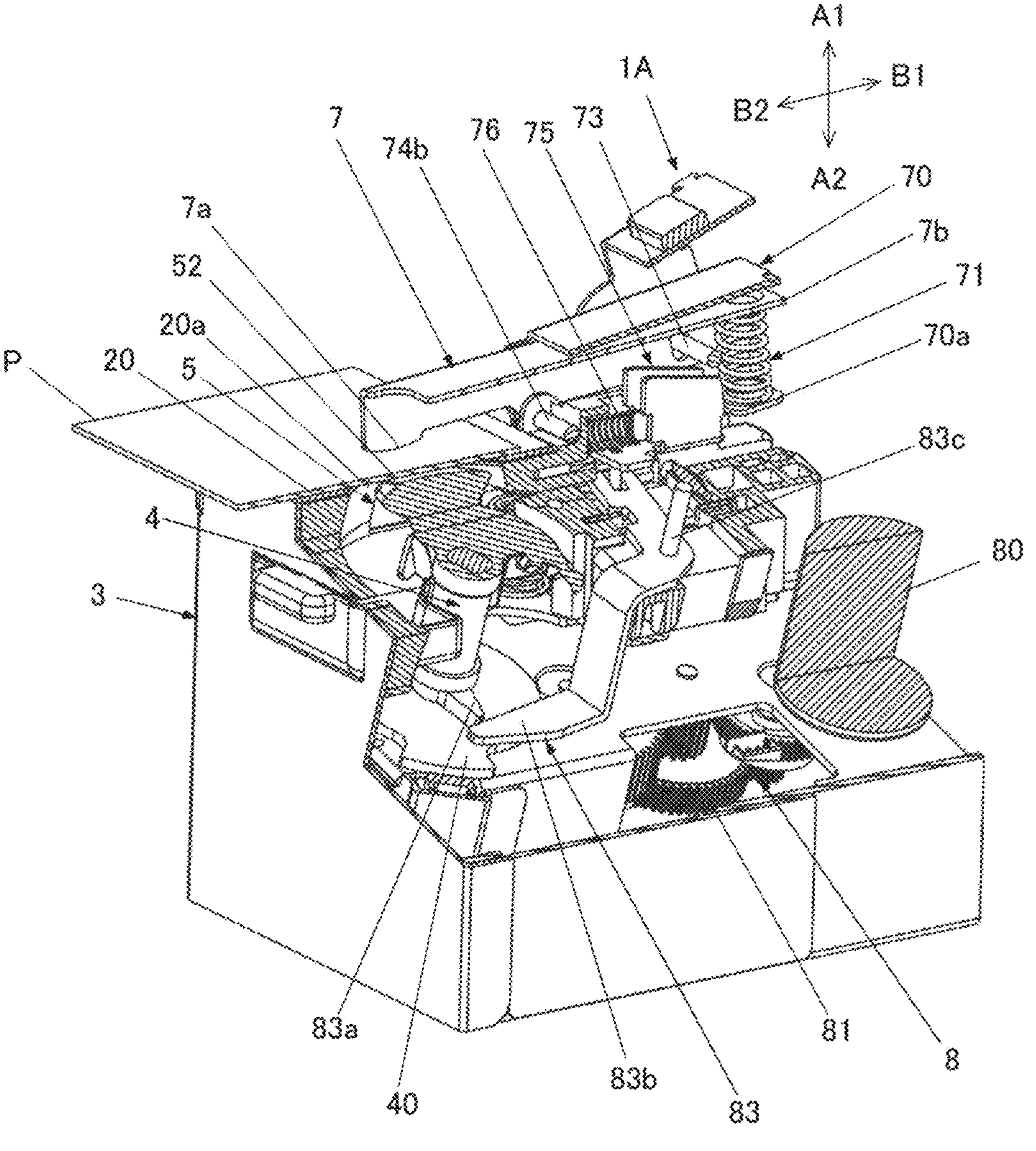
FIG. 8B is a partially broken perspective view illustrating an example of the operation of the staple removing device according to the present embodiment.
Figure 8C:
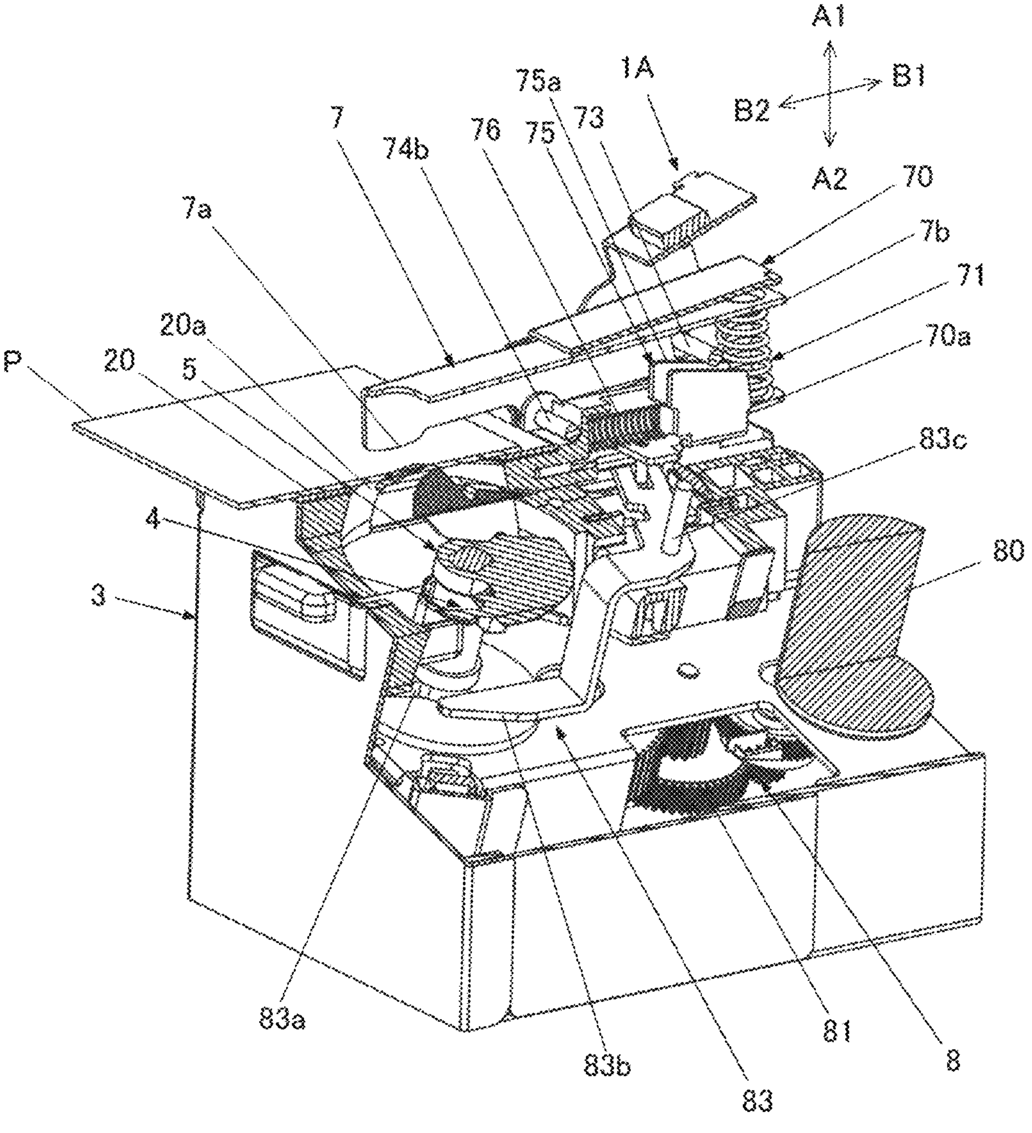
FIG. 8C is a partially broken perspective view illustrating an example of the operation of the staple removing device according to the present embodiment.

FIG. 4 is a perspective view illustrating an example of an operation of a staple removing device according to the present embodiment, FIGS. 5A and 5B are side views illustrating an example of the operation of the staple removing device according to the present embodiment, FIGS. 6A to 6D and 7A to 7B are side sectional views illustrating an example of the operation of the staple removing device according to the present embodiment, and FIGS. 8A to 8C are partially broken perspective views illustrating an example of the operation of the staple removing device according to the present embodiment. FIGS. 9A to 9E are plan views illustrating an example of the operation of the staple removing device according to the present embodiment, FIGS. 10A to 10F are rear cross-sectional views of the main portion illustrating an example of the operation of the staple removing device according to the present embodiment, and FIGS. 11A to 11F are side sectional views of the main portion illustrating an example of the operation of the staple removing device according to the present embodiment.

As illustrated in FIG. 4, a user of the staple removing device 1A places the paper bundle P bound by the staple 10 on the placement surface 20. When the paper bundle P is placed on the placement surface 20, the staple 10 is aligned with the predetermined position of the opening portion 20*a* by aligning the position of the staple 10 binding the paper bundle P with the image of the light formed on the paper bundle P by the light emitted from the light source 91.

When the paper bundle P is placed on the placement surface 20, the user of the staple removing device 1A presses the receiving portion 72*a* of the operation member 72 in a downward direction toward the placement surface 20 as indicated by an arrow D in FIG. 5A.

In the staple removing device 1A, when the receiving portion 72*a* is pressed in the downward direction, the operation member 72 rotates around the first rotating shaft 74*a* as a fulcrum, and thus the hole 72*b* moves in the upward direction. Accordingly, as illustrated in FIG. 5B, the connecting shaft 73 inserted into the hole 72*b* is pressed in the upward direction by the lower surface 72*c* and moves in the first direction indicated by the arrow A1. Further, in the staple removing device 1A, when the receiving portion 72*a* is pressed in the downward direction, the biasing member 72*e* formed of, for example, a coil spring is extended.

When the connecting shaft 73 inserted into the hole 70*b* moves in the first direction, which is the upward direction, the paper thickness adjusting member 70 rotates around the second rotating shaft 74*b* as a fulcrum, and as illustrated in FIG. 6B, the acting portion 70*a* moves in the first direction, which is the upward direction.

When the acting portion 70*a* of the paper thickness adjusting member 70 moves in the first direction, the biasing member 71 receives a force that is pressed by the acting portion 70*a* in the first direction, which is the upward direction. When the biasing member 71 receives the force that is pressed in the first direction, the biasing member 71 presses the acted portion 7*b* of the paper pressing member 7 in the first direction, which is the upward direction.

In a state where there is a gap between the paper bundle P placed on the placement surface 20 and the contact portion 7*a* of the paper pressing member 7, when the acted portion 7*b* is pressed by the biasing member 71 in the first direction, the paper pressing member 7 rotates around the second rotating shaft 74*b* as a fulcrum and moves in the direction in which the contact portion 7*a* moves toward the placement surface 20.

When the receiving portion 72*a* of the operation member 72 is further pressed downward in a state where the contact portion 7*a* comes into contact with the paper bundle P placed on the placement surface 20 and the contact portion 7*a* cannot move in a direction toward the placement surface 20, the paper thickness adjusting member 70 rotates around the second rotating shaft 74*b* as a fulcrum and the acting portion 70*a* further moves in the first direction, which is the upward direction. As illustrated in FIGS. 6C and 8B, in a state where the rotation of the paper pressing member 7 is regulated by the contact portion 7*a* that comes into contact with the paper bundle P, when the paper thickness adjusting member 70 rotates around the second rotating shaft 74*b* as a fulcrum and the acting portion 70*a* further moves in the first direction, the biasing member 71 formed of, for example, a coil spring is pressed and compressed by the acting portion 70*a*.

Accordingly, the biasing member 71 biases the paper pressing member 7 in the direction in which the contact portion 7*a* moves toward the placement surface 20.

When the connecting shaft 73 moves in the first direction, which is the upward direction, the connecting shaft 73 retreats from the movement path of the regulating member 75 moving in the third direction, and the regulating member 75 is movable in the third direction indicated by the arrow B1.

In the staple removing device 1A, as illustrated in FIG. 7B, when the receiving portion 72*a* of the operation member 72 is pressed to a predetermined position and the operation member 72 is rotated by a predetermined amount around the first rotating shaft 74*a* as a fulcrum in a direction in which the receiving portion 72*a* moves the placement surface 20, the operation detection unit 100 detects the operation member 72.

Figure 9A:
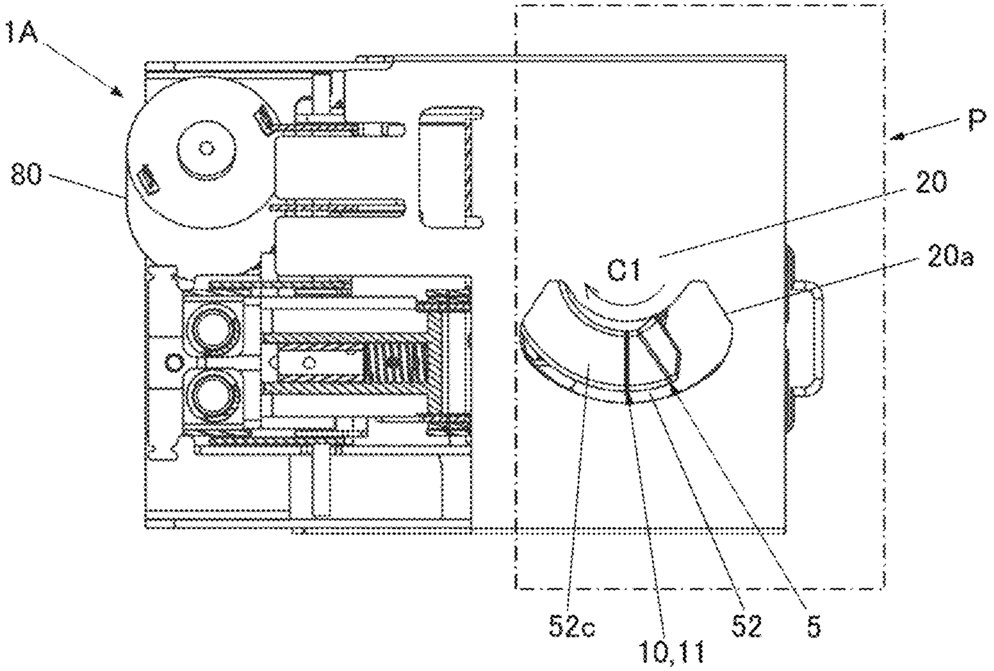
FIG. 9A is a plan view illustrating an example of the operation of the staple removing device according to the present embodiment.

When the operation detection unit 100 detects that the receiving portion 72*a* of the operation member 72 is pressed to a predetermined position, the control unit 102 rotates the motor 80 in a predetermined direction to rotate the rotating shaft 4 and the removal unit 5 in the direction indicated by the arrow C1 as illustrated in FIG. 9A.

When the rotating shaft 4 and the removal unit 5 rotate in the direction indicated by the arrow C1 from the standby position, the link 83*b* follows the cam 83*a*, and the transmission member 83 moves the regulating member 75 biased by the biasing member 76 in the third direction indicated by the arrow B1 as illustrated in FIGS. 6D and 8C.

Since the connecting shaft 73 retreats from the movement path of the regulating member 75, the regulating member 75 is biased by the biasing member 76 and moves in the third direction to the position where the regulating surface 75*a* is in contact with the connecting shaft 73. When the connecting shaft 73 comes into contact with the regulating surface 75*a*, the movement of the connecting shaft 73 in the second direction is regulated.

Accordingly, the paper thickness adjusting member 70 is regulated from rotating around the second rotating shaft 74*b* as a fulcrum in a direction in which the connecting shaft 73 moves in the second direction, which is the downward direction.

The biasing member 71 biases the paper pressing member 7 in the direction in which the contact portion 7*a* moves toward the placement surface 20, so that the paper bundle P is held in a state where the crown portion 11 of the staple 10 is located on the rotation trajectory of the removal unit 5.

Figure 9B:
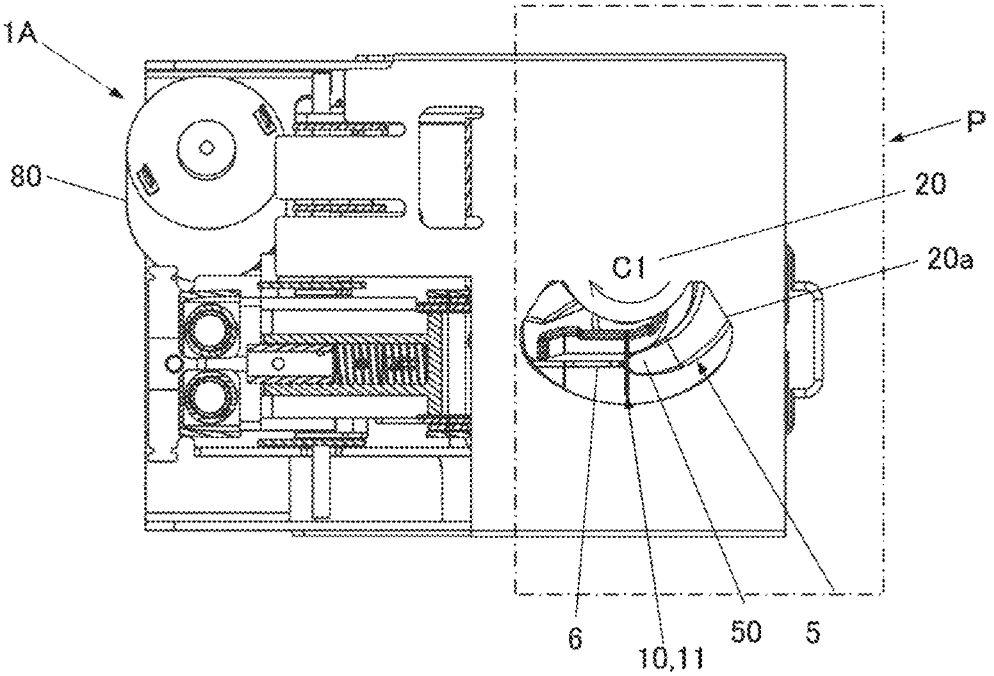
FIG. 9B is a plan view illustrating an example of the operation of the staple removing device according to the present embodiment.
Figure 9C:
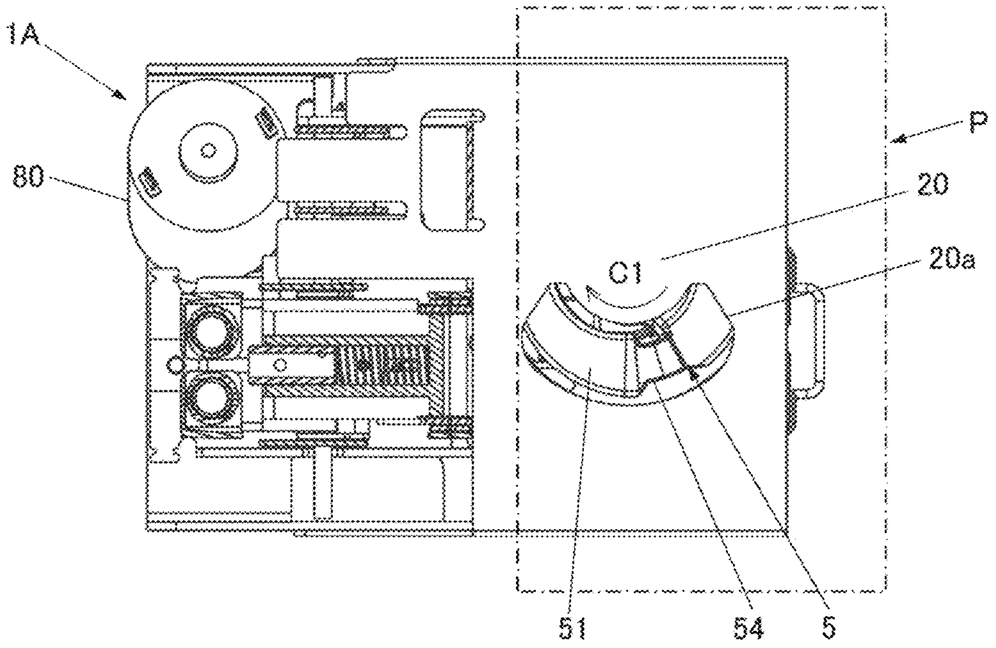
FIG. 9C is a plan view illustrating an example of the operation of the staple removing device according to the present embodiment.
Figure 10A:
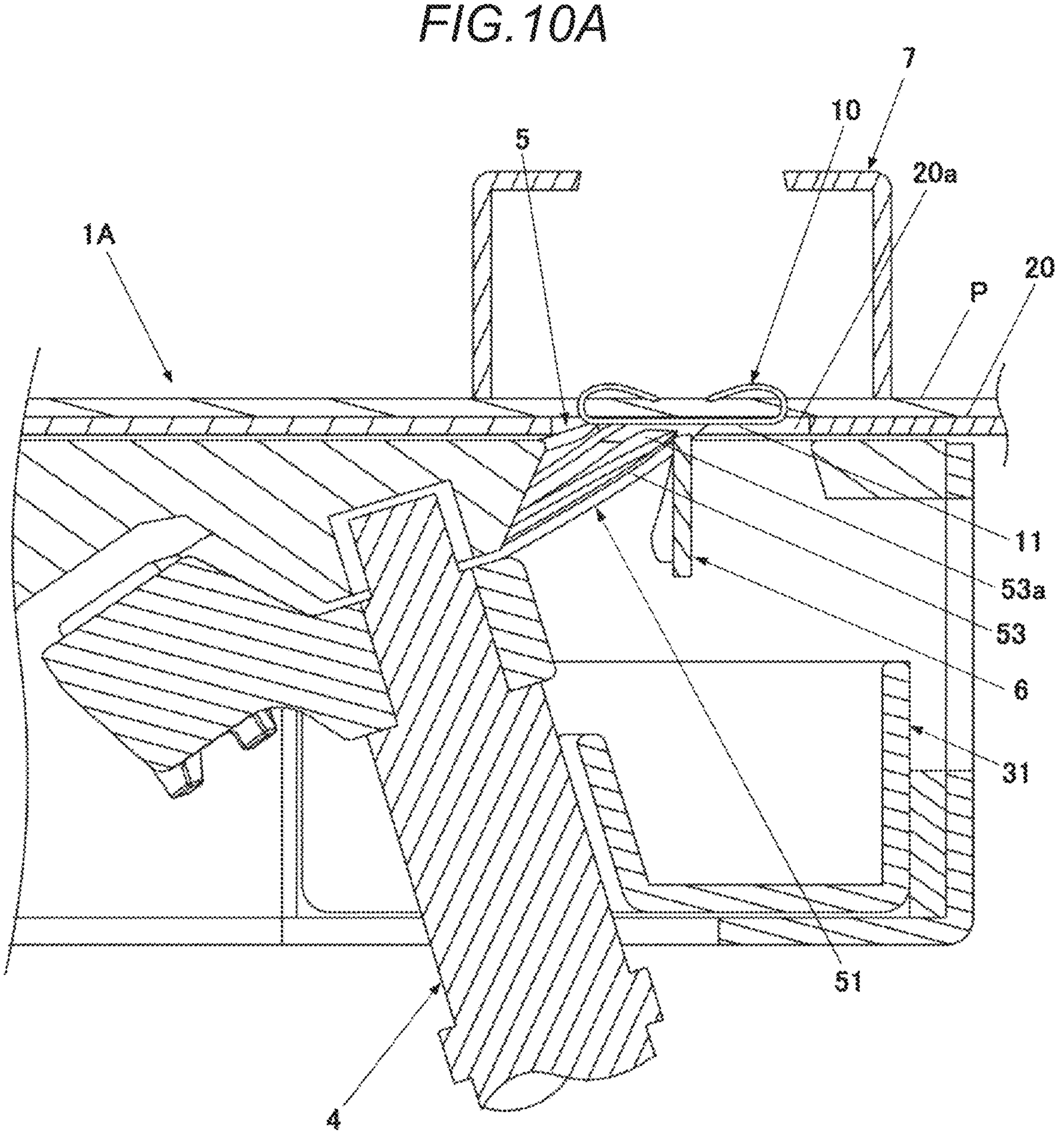
FIG. 10A is a rear cross-sectional view of a main portion illustrating an example of the operation of the staple removing device according to the present embodiment.
Figure 11A:
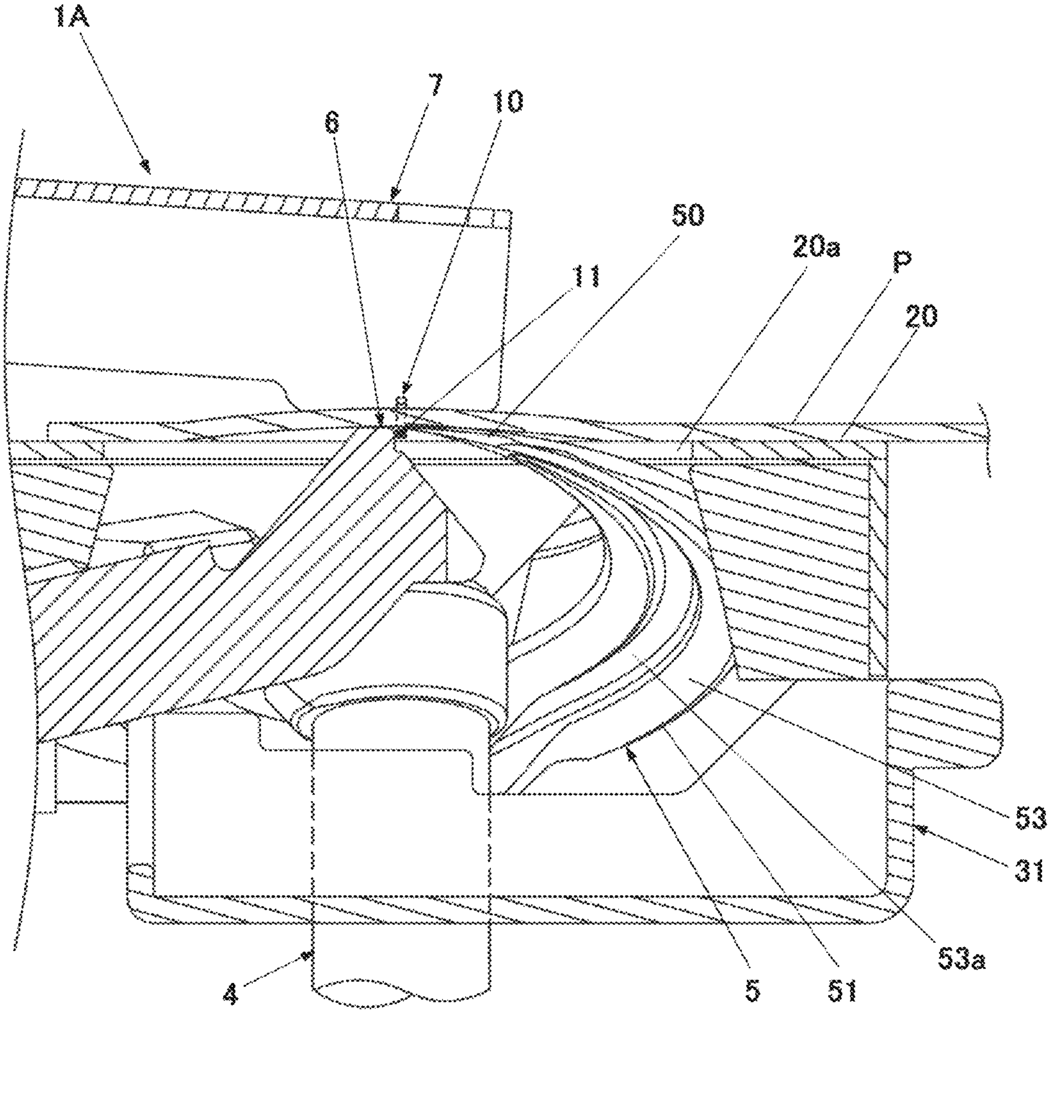
FIG. 11A is a side sectional view of a main portion illustrating an example of the operation of the staple removing device according to the present embodiment.

When the removal unit 5 rotates in the direction indicated by the arrow C1 from the standby position, the tip portion 50 is exposed to the opening portion 20*a* as illustrated in FIGS. 9B, 10A, and 11A. In addition, in the removal unit 5, at the position where the tip portion 50 is exposed to the opening portion 20*a*, the tip portion 50 protrudes above the placement surface 20 from the opening portion 20*a*. Further, at the position where the tip portion 50 is exposed to the opening portion 20*a*, the staple pressing member 6 is located on the rotation trajectory of the removal unit 5 to face the tip portion 50, and is exposed to the opening portion 20*a*.

When the rotating shaft 4 and the removal unit 5 further rotate in the direction indicated by the arrow C1 in a state where the tip portion 50 of the removal unit 5 protrudes above the placement surface 20 from the opening portion 20*a*, the tip portion 50 moves in a direction toward the crown portion 11 along the lower surface Pa of the paper bundle P placed on the placement surface 20, and comes into contact with the crown portion 11.

Figure 10B:
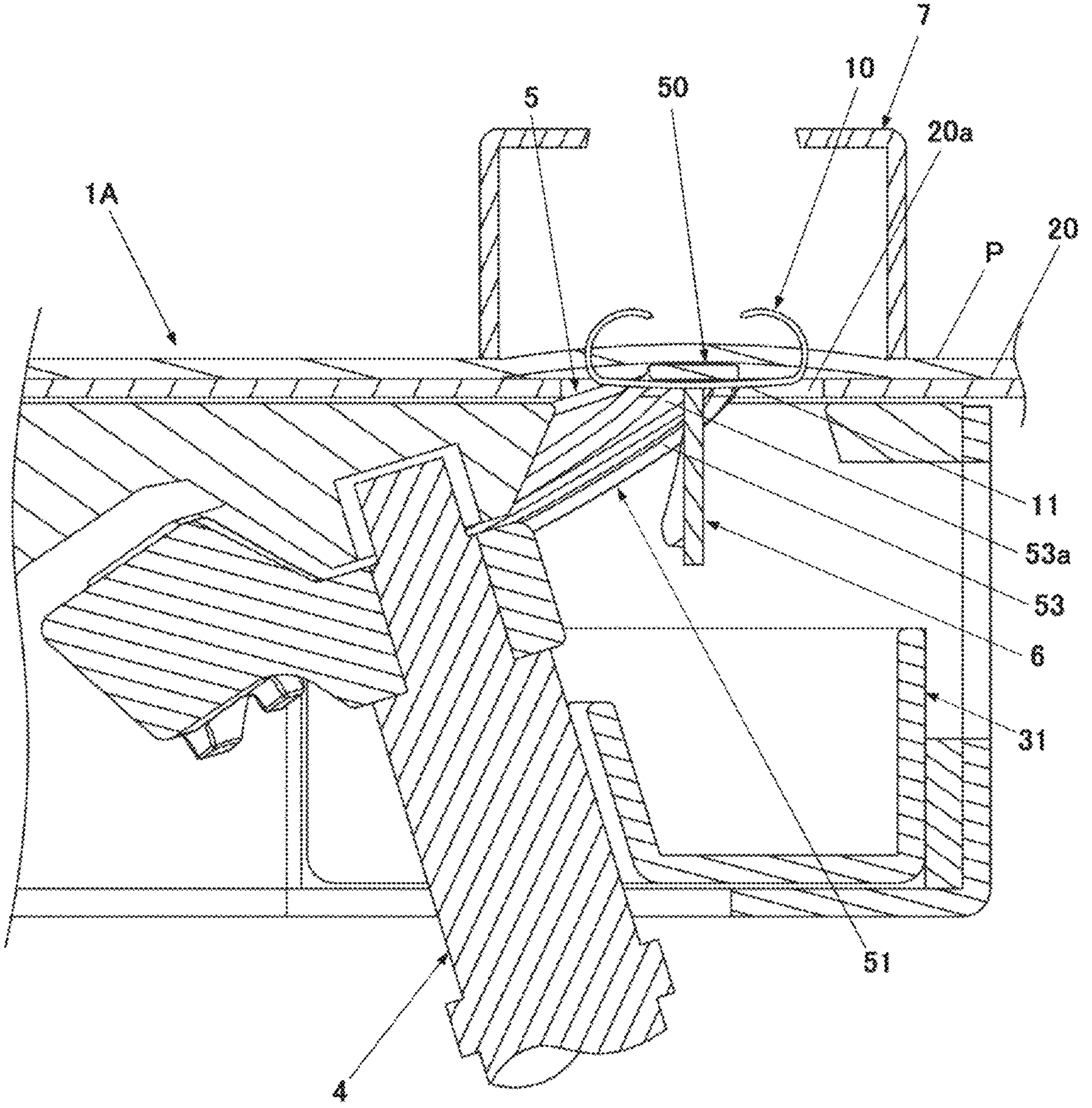
FIG. 10B is a rear cross-sectional view of a main portion illustrating an example of the operation of the staple removing device according to the present embodiment.
Figure 10C:
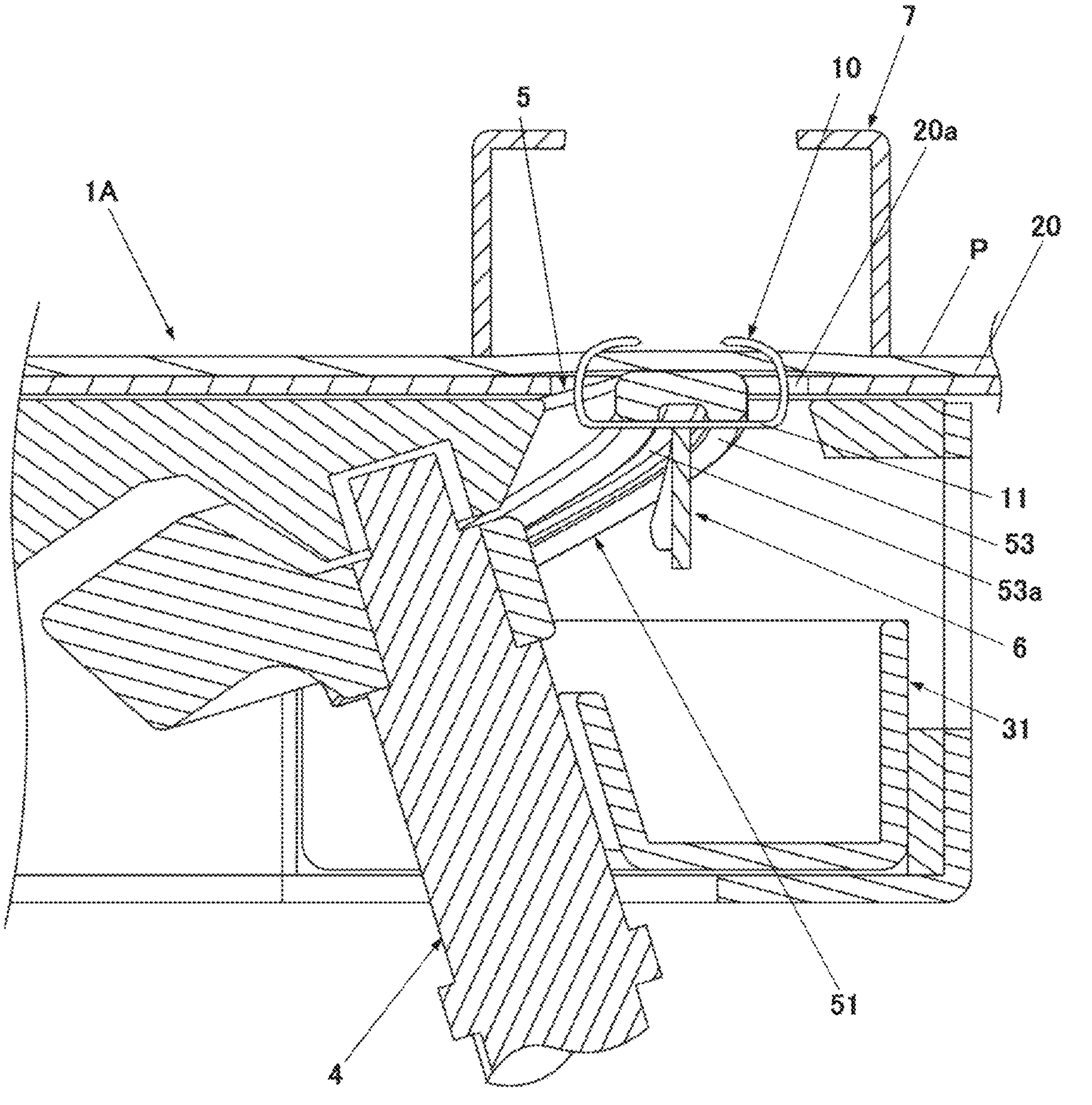
FIG. 10C is a rear cross-sectional view of a main portion illustrating an example of the operation of the staple removing device according to the present embodiment.
Figure 10D:
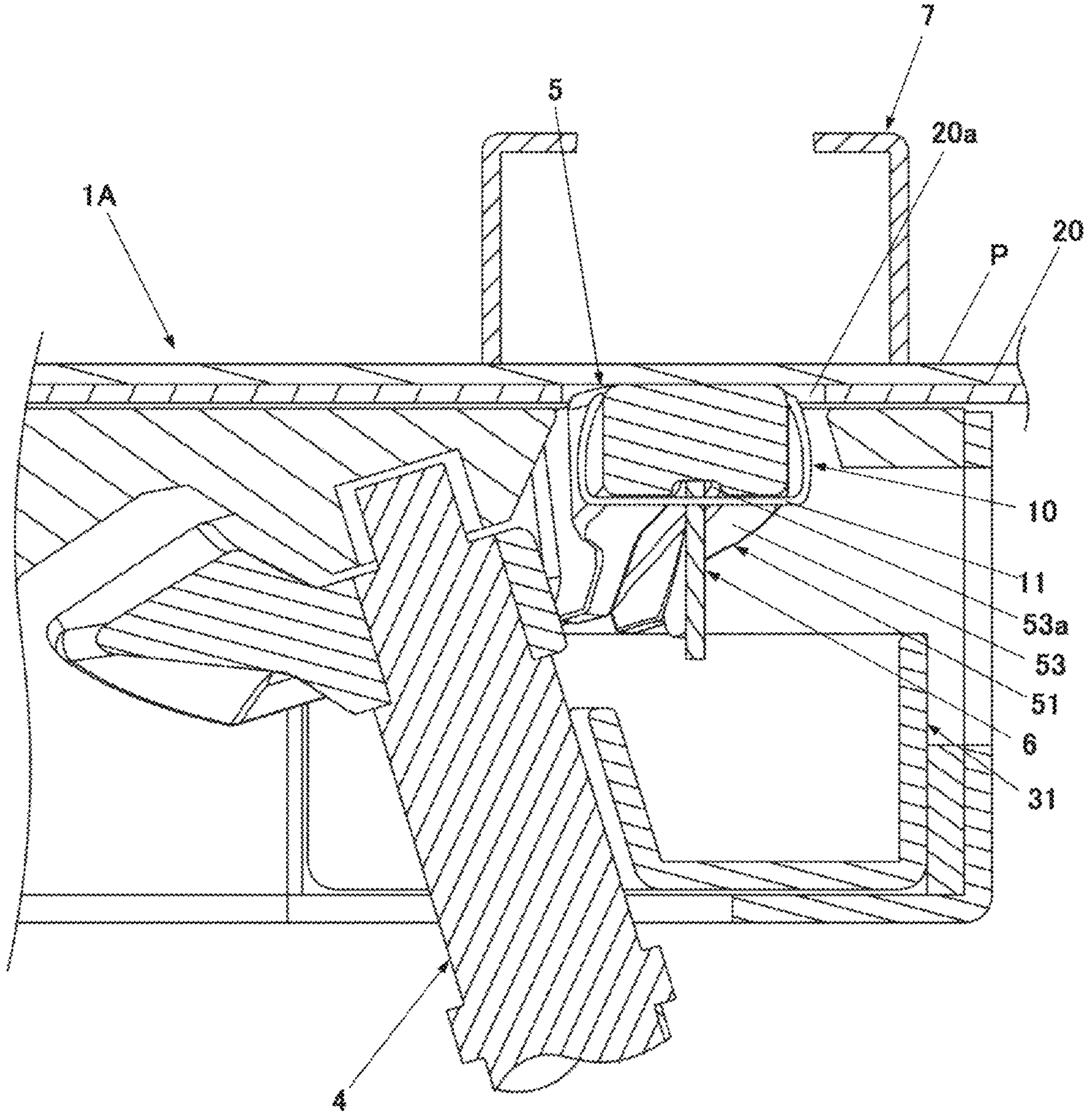
FIG. 10D is a rear cross-sectional view of a main portion illustrating an example of the operation of the staple removing device according to the present embodiment.
Figure 10E:
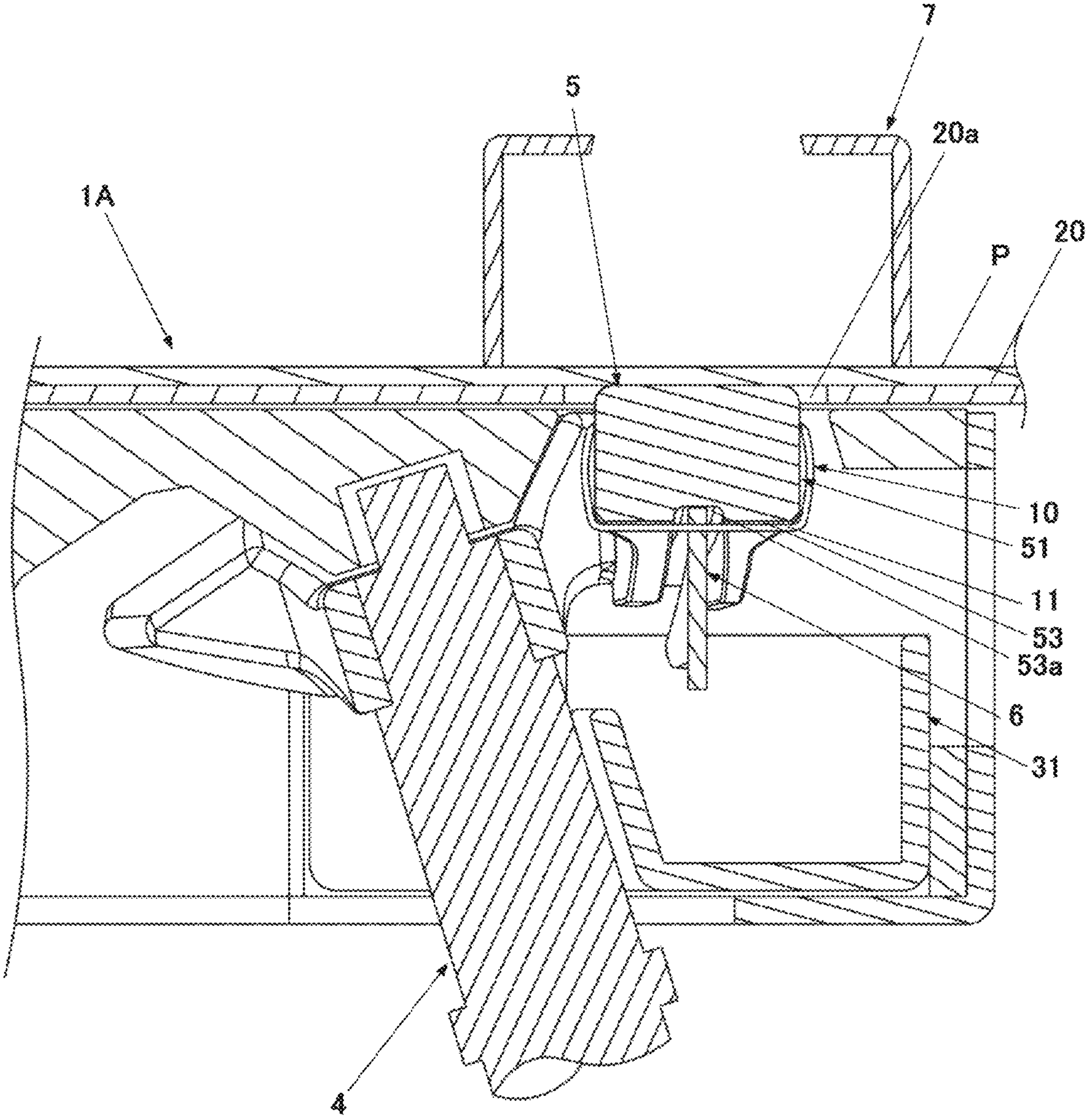
FIG. 10E is a rear cross-sectional view of a main portion illustrating an example of the operation of the staple removing device according to the present embodiment.
Figure 11B:
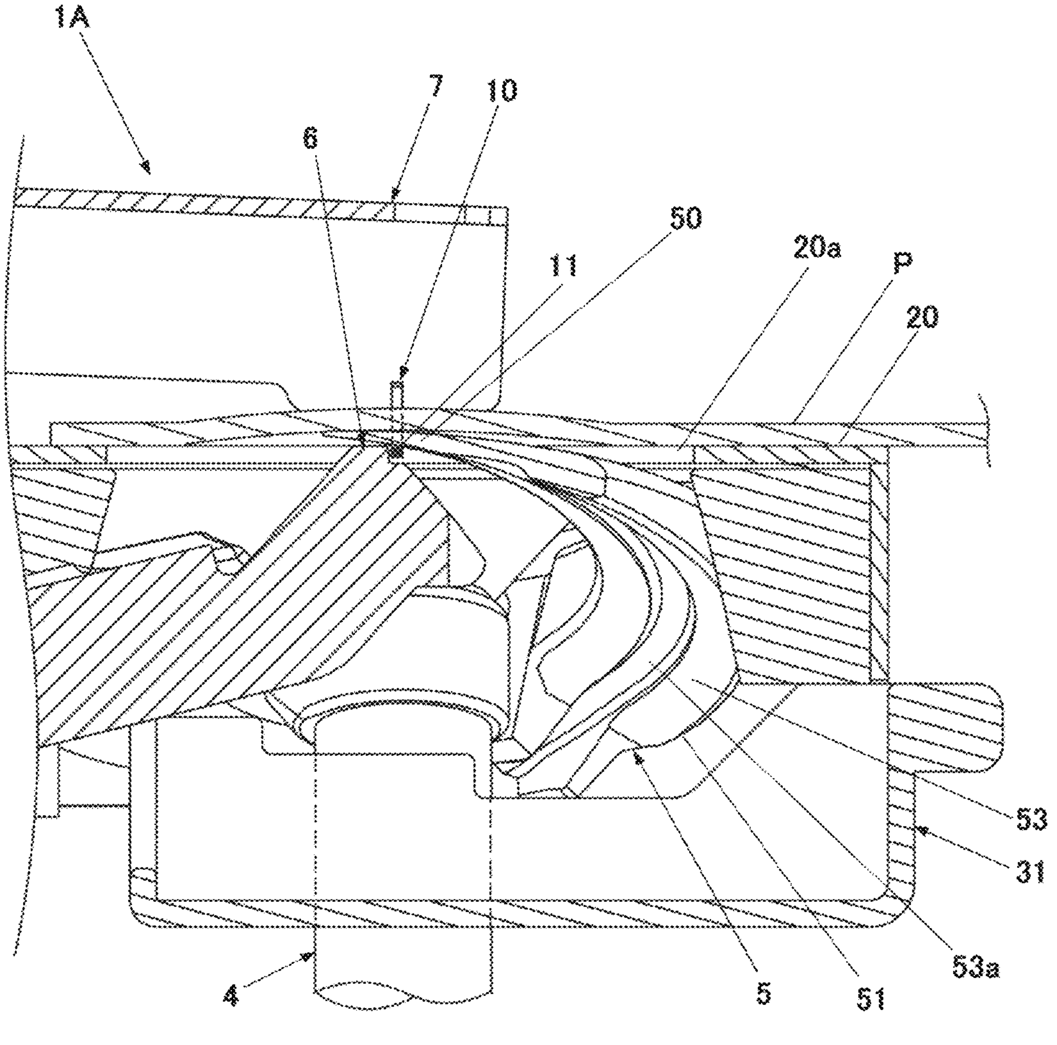
FIG. 11B is a side sectional view of a main portion illustrating an example of the operation of the staple removing device according to the present embodiment.
Figure 11C:
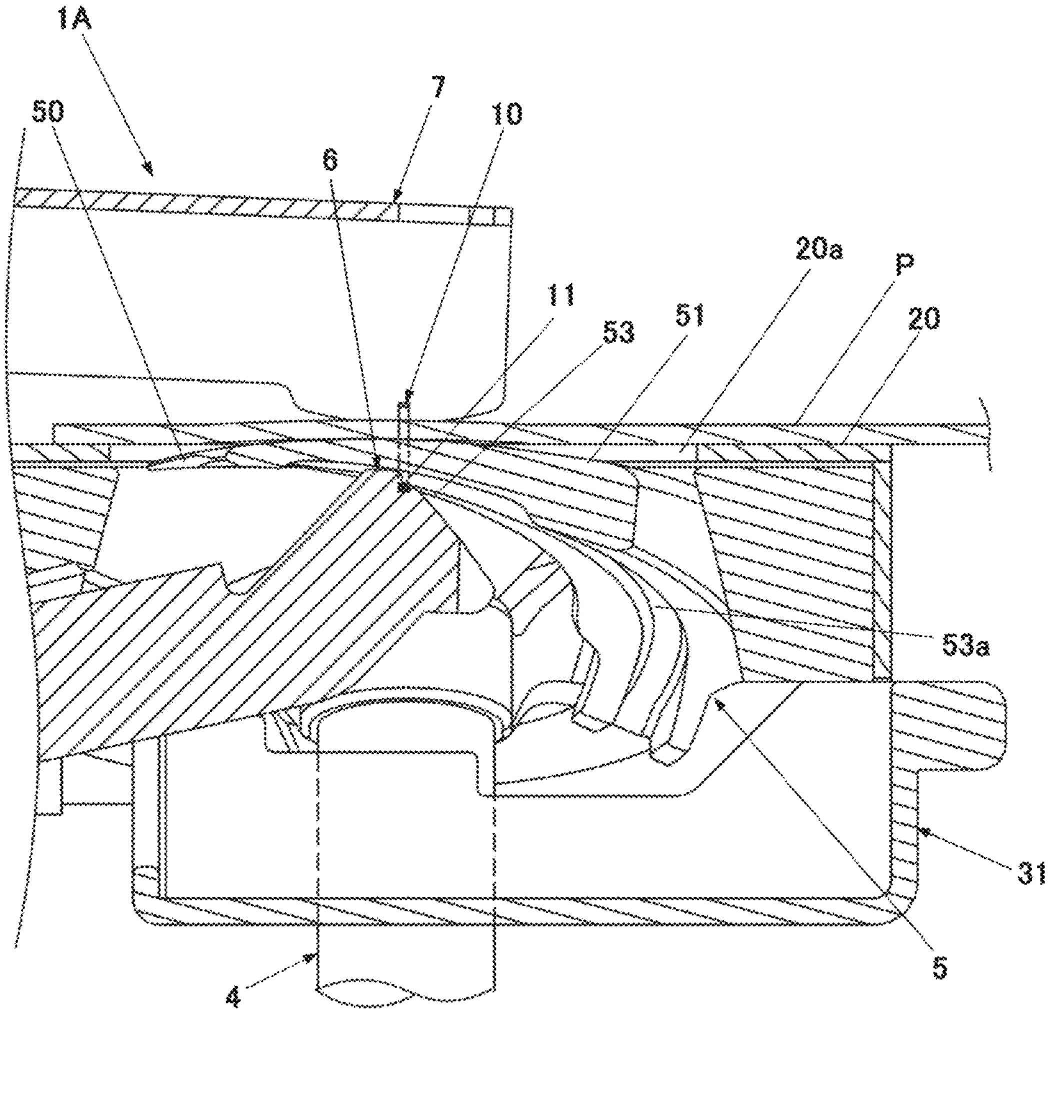
FIG. 11C is a side sectional view of a main portion illustrating an example of the operation of the staple removing device according to the present embodiment.
Figure 11D:
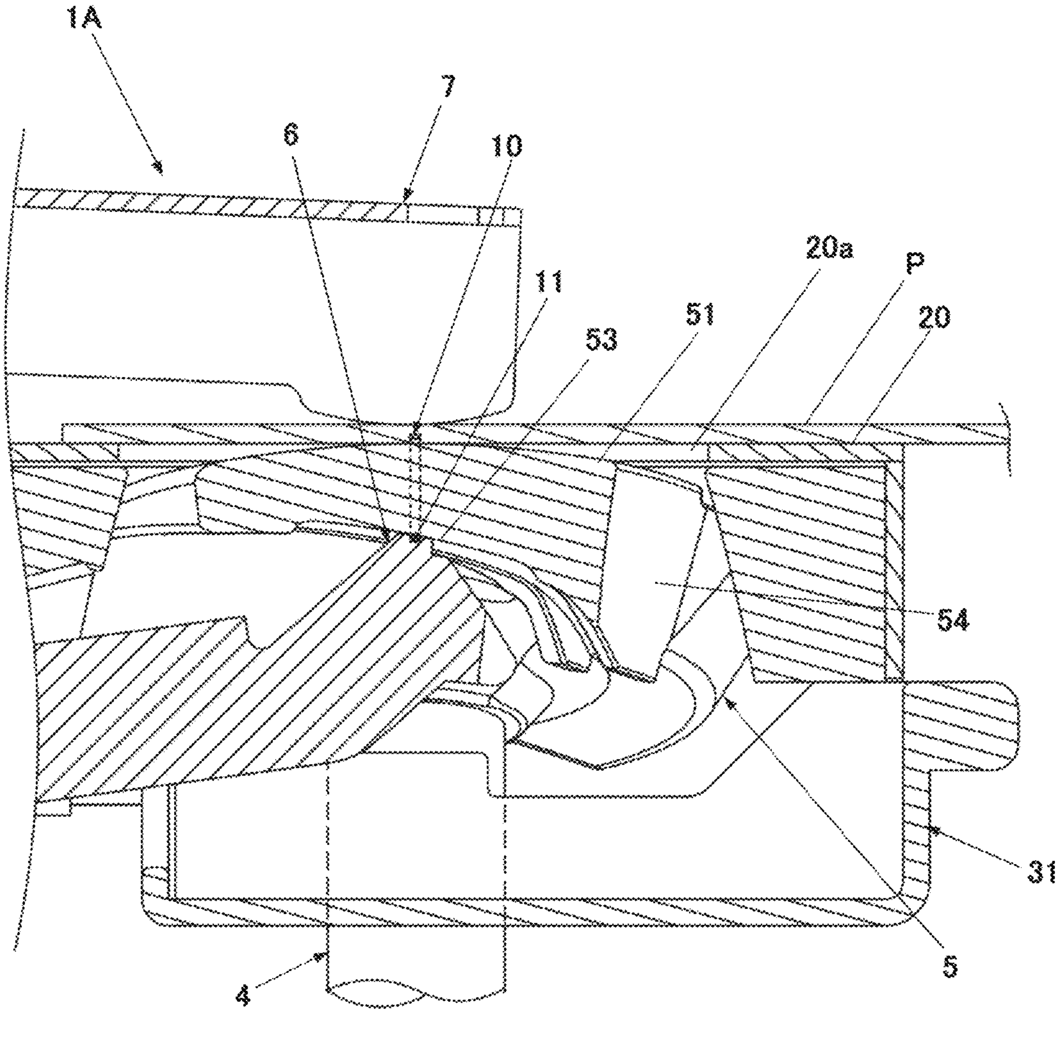
FIG. 11D is a side sectional view of a main portion illustrating an example of the operation of the staple removing device according to the present embodiment.
Figure 11E:
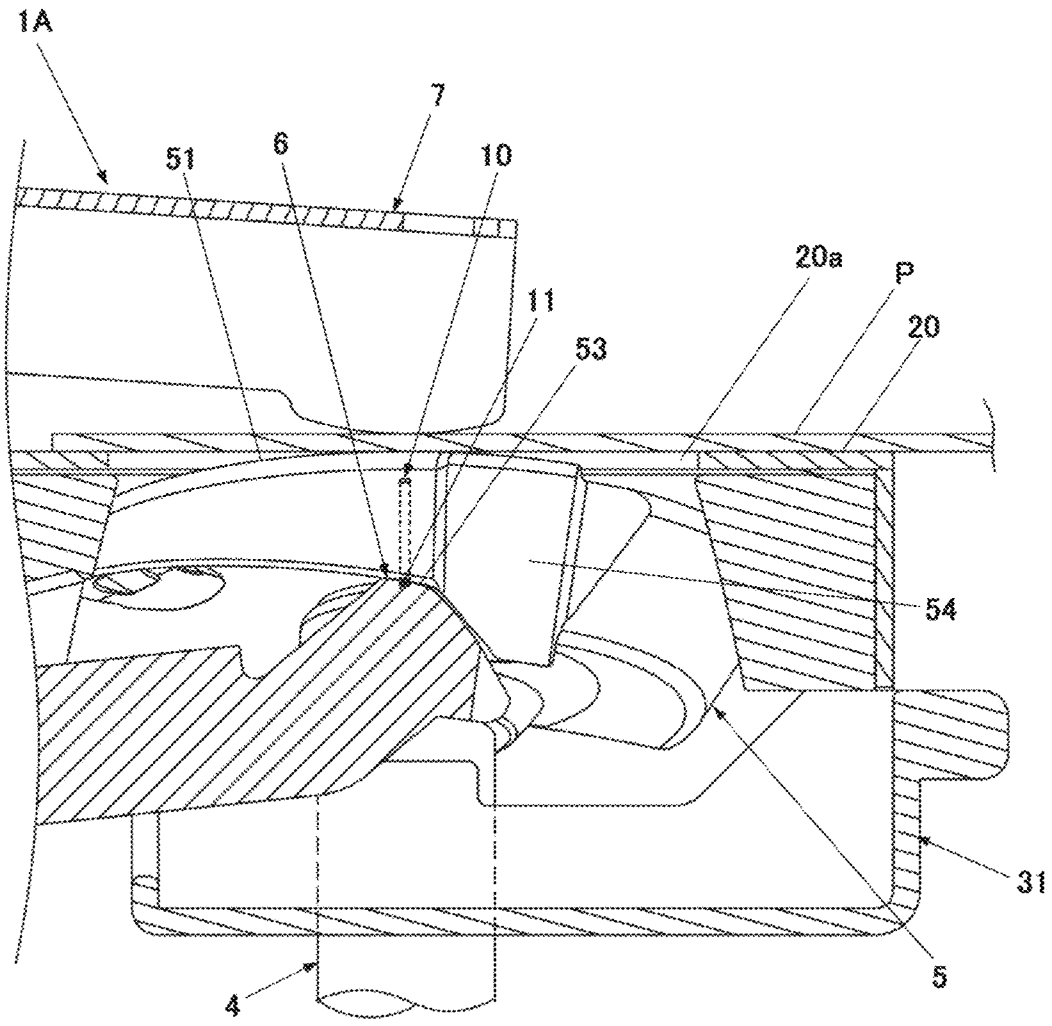
FIG. 11E is a side sectional view of a main portion illustrating an example of the operation of the staple removing device according to the present embodiment.

The staple pressing member 6 comes into contact with the crown portion 11 pressed by the tip portion 50 of the removal unit 5, and regulates the position of the crown portion 11 from moving by being pressed by the tip portion 50. Accordingly, when the rotating shaft 4 and the removal unit 5 are further rotated in the direction indicated by the arrow C1, as illustrated in FIGS. 10B and 11B, the tip portion 50 of the removal unit 5 is inserted between the lower surface Pa of the paper bundle P placed on the placement surface 20 and the crown portion 11 of the staple 10 binding the paper bundle P.

When the rotating shaft 4 and the removal unit 5 are further rotated in the direction indicated by the arrow C1 in a state where the tip portion 50 of the removal unit 5 is inserted between the lower surface Pa of the paper bundle P placed on the placement surface 20 and the crown portion 11 of the staple 10 binding the paper bundle P, a force in a direction in which the staple 10 is removed from the paper bundle P is applied to the crown portion 11 due to the inclination of the action surface 53 of the middle portion 51. Accordingly, as illustrated in FIGS. 10C, 11C, 10D, 11D, 10E, and 11E, the staple 10 is gradually removed from the paper bundle P while the leg portions of the staple 10 are raised. In the removal unit 5, the upper surface 50*c* and the lower surface 50*d* of the tip portion 50 are parallel to the placement surface 20 in the cross section in the extending direction of the crown portion 11 of the staple 10 during the removal at the position where the tip portion 50 is exposed to the opening portion 20*a* by rotation around the rotating shaft 4. Further, in the removal unit 5, at the position where the middle portion 51 is exposed to the opening portion 20*a*, the action surface 53 and the upper surface 51*c* of the middle portion 51 are parallel to the placement surface 20 in the cross section in the extending direction of the crown portion 11 of the staple 10 during the removal. Accordingly, the pair of leg portions of the staple 10 substantially uniformly separated from the paper bundle P.

Figure 9D:
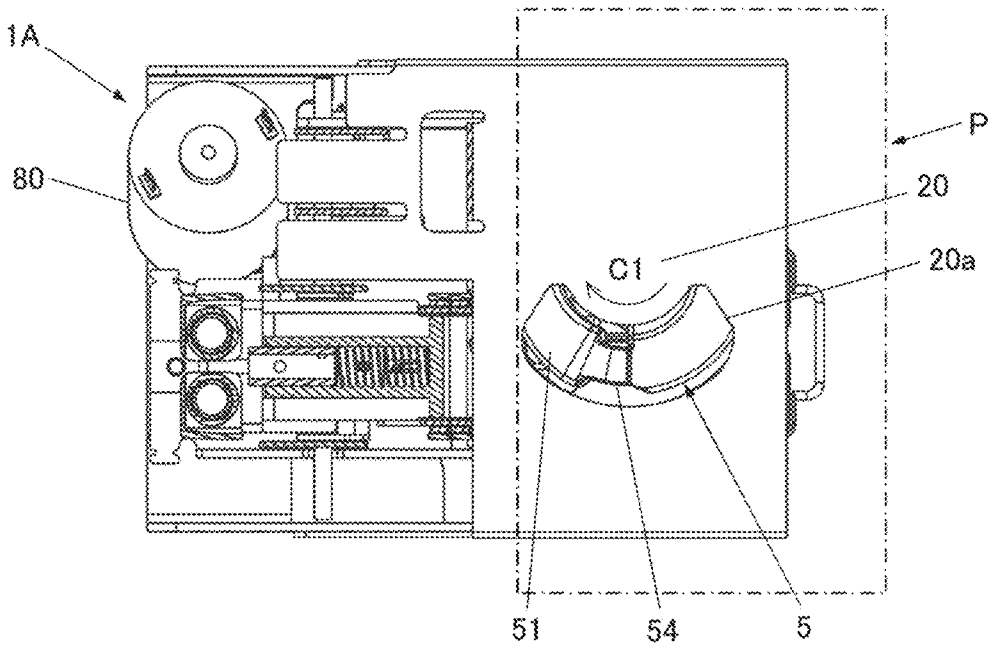
FIG. 9D is a plan view illustrating an example of the operation of the staple removing device according to the present embodiment.
Figure 9E:
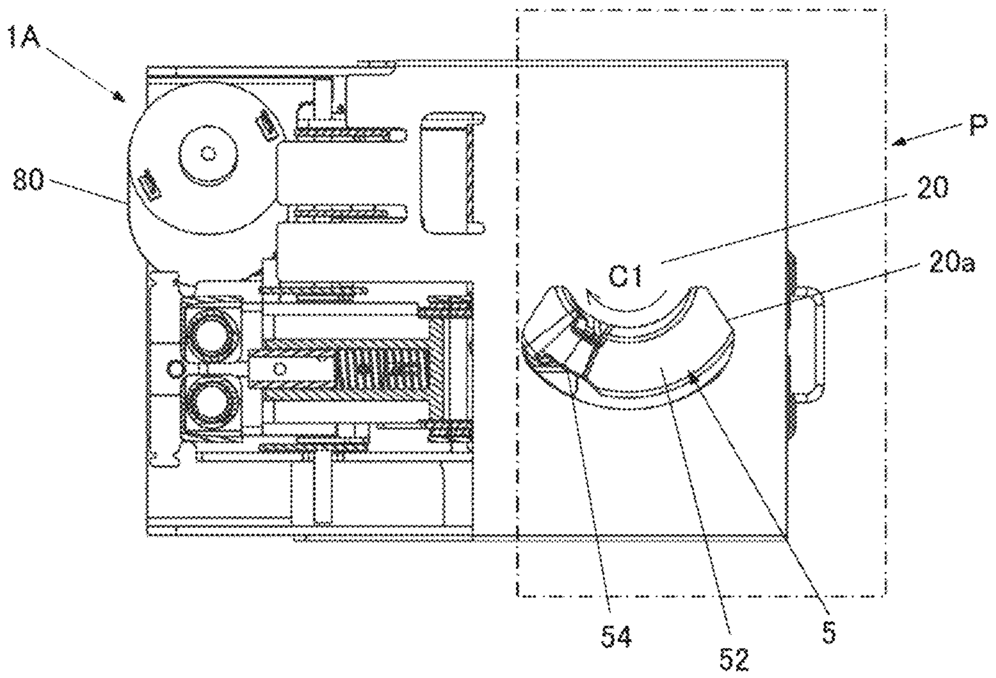
FIG. 9E is a plan view illustrating an example of the operation of the staple removing device according to the present embodiment.
Figure 10F:
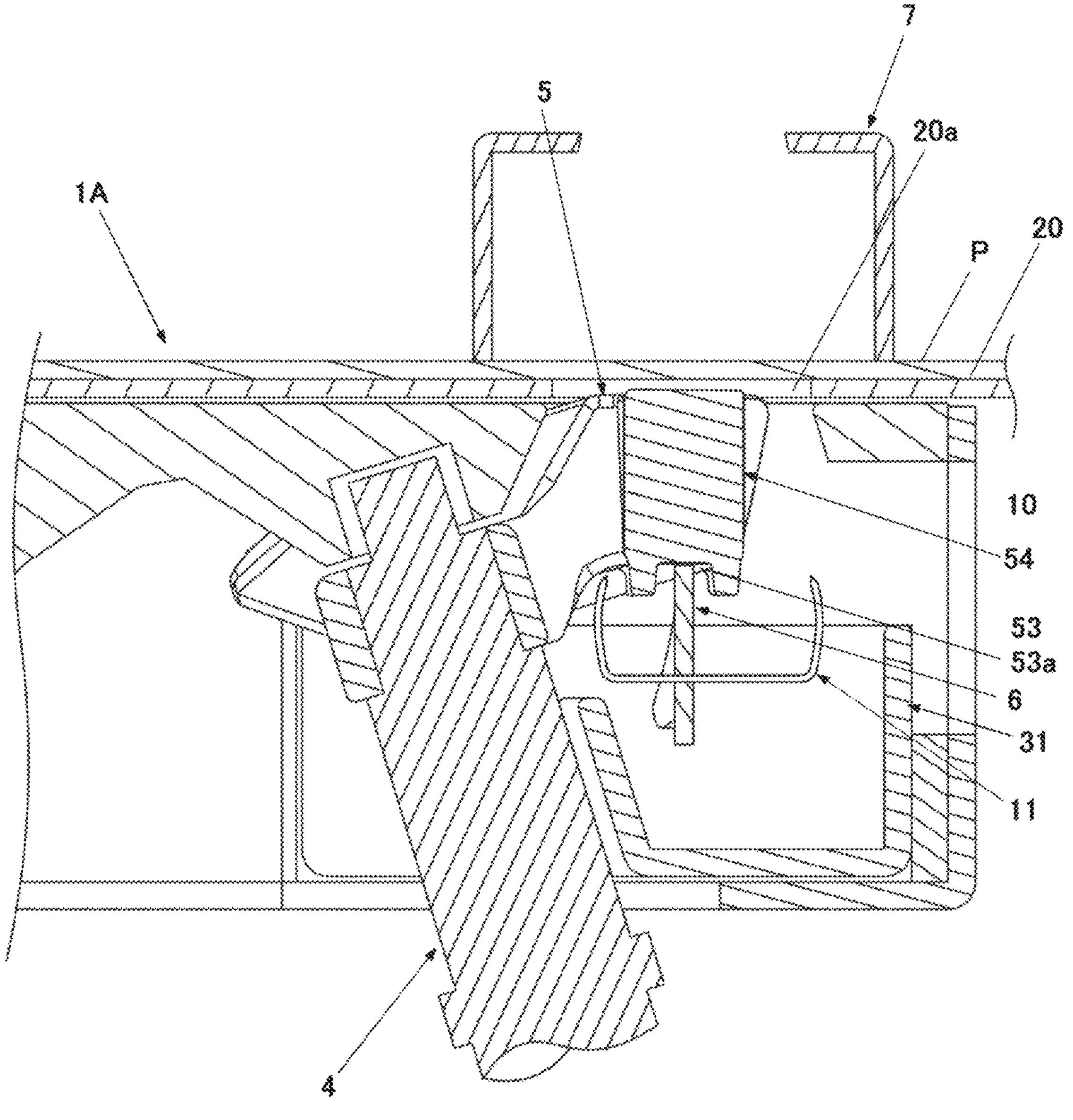
FIG. 10F is a rear cross-sectional view of a main portion illustrating an example of the operation of the staple removing device according to the present embodiment.
Figure 11F:
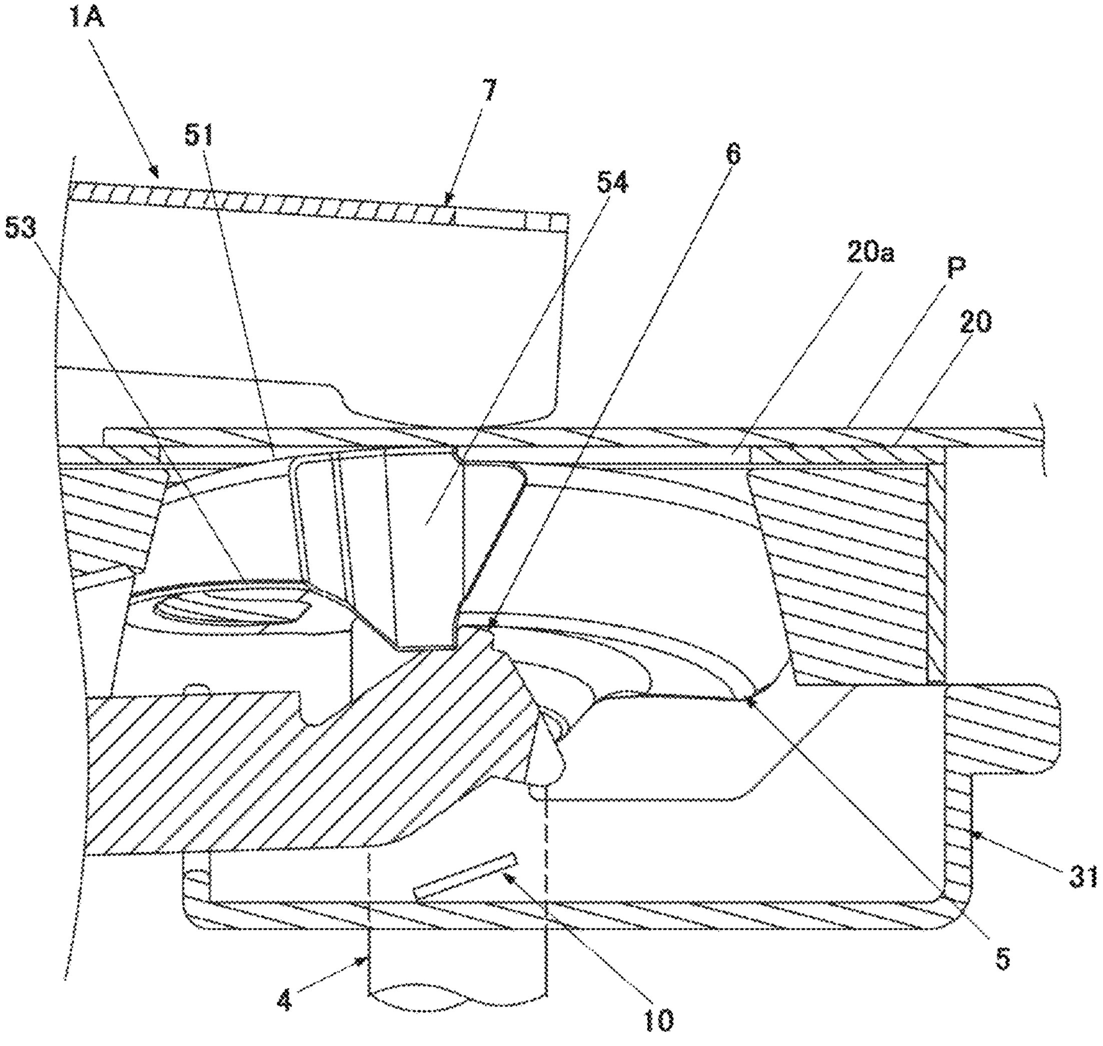
FIG. 11F is a side sectional view of a main portion illustrating an example of the operation of the staple removing device according to the present embodiment.

As illustrated in FIGS. 9D, 10F, and 11F, when the rotating shaft 4 and the removal unit 5 rotate in the direction indicated by the arrow C1 to a position where the staple 10 faces the narrow portion 54, the leg portions of the staple 10 are removed from the paper bundle P. When the pair of leg portions of the staple 10 faces the narrow portion 54, the staple 10 is prevented from being held on both sides of the removal unit 5 in a width direction, and the staple 10 is promoted to fall from the removal unit 5.

When the rotating shaft 4 and the removal unit 5 further rotate in the direction indicated by the arrow C1, the link 83*b* follows the cam 83*a*, and the transmission member 83 moves the regulating member 75 in the fourth direction indicated by the arrow B2. When the rotating shaft 4 and the removal unit 5 make one rotation in the direction indicated by the arrow C1 and the rotary position detection unit 101 detects the detected unit 40, the control unit 102 stops the rotation of the motor 80.

When the regulating member 75 moves in the fourth direction from the state where the connecting shaft 73 is in contact with the regulating surface 75*a*, the regulating member 75 retreats from a movement path of the connecting shaft 73 that moves in the second direction, the connecting shaft 73 is movable in the second direction, which is the downward direction, and the connecting shaft 73 moves in the second direction.

When the connecting shaft 73 moves in the second direction, the paper thickness adjusting member 70 and the paper pressing member 7 rotate around the second rotating shaft 74*b* as a fulcrum, and move in the direction in which the contact portion 7*a* moves away from the placement surface 20. Accordingly, the paper bundle P from which the staple 10 is removed can be removed from between the placement surface 20 and the contact portion 7*a*. When the operation member 72 is biased by the biasing member 72*e* to release a force for pressing the receiving portion 72*a*, the receiving portion 72*a* rotates around the first rotating shaft 74*a* as a fulcrum in the upward direction away from the placement surface 20.

In addition, in a case of an abnormality in which the load when removing the staple 10 from the paper bundle P is high and the staple 10 is not completely removed from the paper bundle P, the control unit 102 rotates the motor 80 in a predetermined direction to rotate the rotating shaft 4 and the removal unit 5 in a direction opposite to the direction indicated by the arrow C1. In this case, when the staple 10 is removed halfway, the removal unit 5 cannot return to the standby state. Therefore, the removal unit 5 includes the tilting inclined surface 55 on the base portion 52, and rotates the removal unit 5 in a direction opposite to the direction indicated by the arrow C1 to press down the staple 10 removed from the paper bundle P by the tilting inclined surface 55.

Further, the removal unit 5 includes the push-down inclined surface 56 on the base portion 52, and pushes down the staple pressing member 6 that moves upward along the push-down inclined surface 56 by the operation of rotating the removal unit 5 in the direction opposite to the direction indicated by the arrow C1.

In the present embodiment, by manually pressing the receiving portion 72*a* of the operation member 72 downward, the paper thickness adjusting member 70 operates the paper pressing member 7 in a direction toward the placement surface 20, and the paper bundle P placed on the placement surface 20 is pressed by the paper pressing member 7. When the paper thickness adjusting member 70 that operates the paper pressing member 7 in the direction toward the placement surface 20 is displaced with respect to the paper pressing member 7, the paper pressing member 7 is biased by the biasing member 71 in the direction toward the placement surface 20. The position of the paper thickness adjusting member 70 displaced with respect to the paper pressing member 7 is regulated by the regulating member 75.

Accordingly, the paper bundle P placed on the placement surface 20 can be pressed by the paper pressing member 7 by the biasing of the biasing member 71 without continuously pressing the receiving portion 72*a* of the operation member 72 manually and without continuously holding a position of the paper thickness adjusting member 70 by the force of the motor 80.

Even when the connecting shaft 73 retracts from the movement path of the regulating member 75, the regulating member 75 does not move in the third direction until the motor 80 is driven. Accordingly, when the force of pressing the receiving portion 72*a* is reduced while the receiving portion 72*a* of the operation member 72 is being manually pressed, the paper thickness adjusting member 70 and the paper pressing member 7 rotate when the operation member 72 returns to the standby position, and the contact portion 7*a* moves in a direction away from the placement surface 20, so that the paper bundle P can be removed.

In a staple remover described in Japanese Patent No. 3573505, a strip portion extends in a tangential direction of a circle along a trajectory of the strip portion when a remover body rotates around a rotating shaft as a fulcrum. The strip portion has a tapered shape in which a width increases from a tip toward a proximal end, and an outer peripheral side edge and an inner peripheral side edge are linear. Further, the strip portion is configured to be narrower than a crown portion of a staple.

In the staple remover described in Japanese Patent No. 3573505, when one end of the paper stopped by the staple is disposed between the rotating plate and the upper wall, the staple is disposed on the trajectory of the strip portion such that a direction of a crown portion is oriented along a radial direction intersecting a moving direction of the strip portion.

In such a configuration, when the remover body rotates around the rotating shaft, the strip portion enters between the staple and the paper from an outer peripheral side in a radial direction along an extending direction of the crown portion, and moves to an inner peripheral side of the crown portion as the remover body rotates. For this reason, a force of removing the staple from the paper bundle is not uniformly applied along the extending direction of the crown portion, and a removal failure in which the staple cannot be removed may occur.

On the other hand, in the present embodiment, in the removal unit 5, the outer peripheral side edge 51*a* of the middle portion 51 is formed by a convex arc connected to the outer peripheral side edge 50*a* of the tip portion 50, and the inner peripheral side edge 51*b* is formed by a concave arc connected to the inner peripheral side edge 50*b* of the tip portion 50. In the middle portion 51, the distance from the center line O1 of the removal unit 5 to the outer peripheral side edge 51*a* is equal to the distance from the center line O1 to the inner peripheral side edge 51*b*.

The center line O1 passes through a center in the extending direction the crown portion 11 of the staple 10. Therefore, the middle portion 51 does not move in the extending direction of the crown portion 11 in accordance with the rotation of the removal unit 5.

Accordingly, the force of removing the staple 10 from the paper bundle is uniformly applied along the extending direction of the crown portion 11, and the staple 10 can be reliably removed.

Further, in the staple remover described in Japanese Patent No. 3573505, an upper wall on which a paper is disposed is provided with a raised portion, and a tip of the paper is directed upward by the raised portion, so that the tip of the strip portion easily enters between the staple and the paper.

However, in a case where the paper is curved as in Japanese Patent No. 3573505, depending on the paper quality of the paper, for example, in a case of hard paper, there may be a problem that the tip of the paper is not directed upward and the paper is bent. In this way, when a gap is provided between the paper and the staple using the raised portion, depending on the paper quality, and the staple cannot be stably removed.

On the other hand, in the present embodiment, the tip portion 50 of the removal unit 5 protrudes upward along the axial direction of the rotating shaft 4 with respect to the upper surface 52*c* of the base portion 52. Accordingly, it is not necessary to provide a gap between the paper bundle P and the staple 10 by directing the tip of the paper bundle P upward by raising a part of the placement surface 20, and the staple 10 can be stably removed without depending on the paper quality.

Further, in the present embodiment, since the rotating shaft 4 is inclined with respect to the direction orthogonal to the placement surface 20, the rotation trajectory of the removal unit 5 is inclined with respect to the placement surface 20. Accordingly, in the removal unit 5, the tip portion 50, the middle portion 51, and the base portion 52 are exposed on the placement surface 20 from the opening portion 20*a* in this order by rotation around the rotating shaft 4.

Accordingly, the opening portion 20*a* can be realized by an arc along the rotation trajectory of the removal unit 5, and a portion where the removal unit 5 is exposed on the placement surface 20 can be reduced.

A configuration may be adopted in which the rotating shaft 4 extends in the direction orthogonal to the placement surface 20, and the rotating shaft 4 is moved in a vertical direction, so that the tip portion 50 of the removal unit 5 protrudes upward from the placement surface 20.

On the other hand, in the present embodiment, since the rotating shaft 4 is inclined with respect to the direction orthogonal to the placement surface 20, in a state where the tip portion 50 is exposed to the opening portion 20*a*, the tip portion 50 can be protruded upward from the placement surface 20 without moving the rotating shaft 4 upward.

A configuration may be adopted in which the rotating shaft 4 extends in the direction orthogonal to the placement surface 20, and the rotating shaft 4 is moved in a vertical direction, so that the tip portion 50 of the removal unit 5 protrudes upward from the placement surface 20.

<Another Configuration Example of Removal Unit According to Present Embodiment>

Figure 12A:
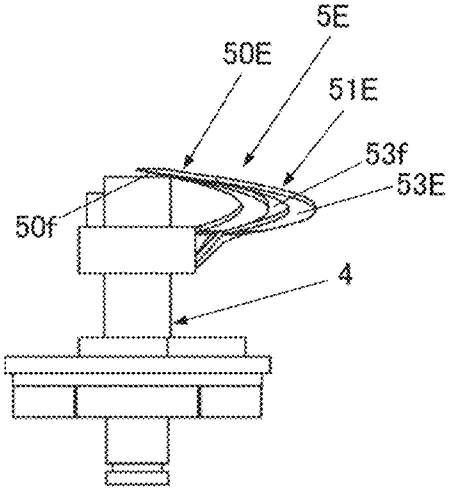
FIG. 12A is a side view illustrating another example of the removal unit when viewed from two directions.
Figure 12B:
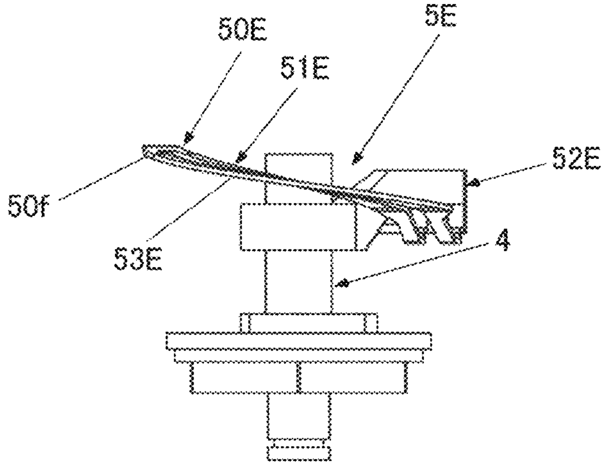
FIG. 12B is a side view illustrating another example of the removal unit when viewed from two directions.
Figure 12C:
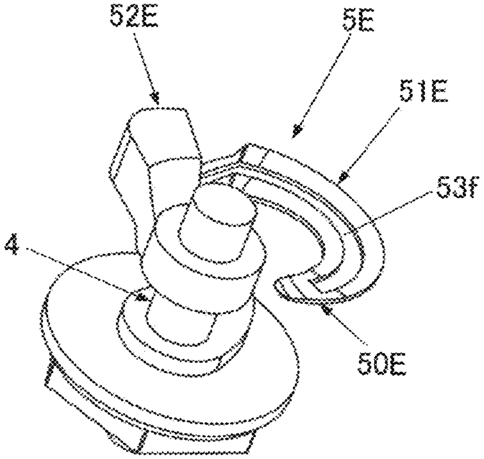
FIG. 12C is a perspective view illustrating another example of the removal unit.
Figure 12D:
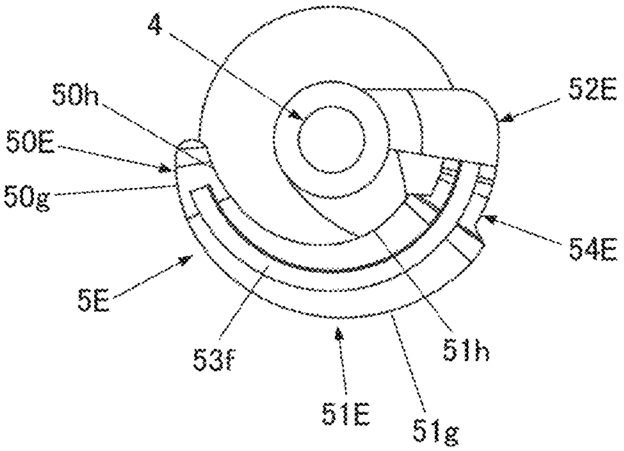
FIG. 12D is a top view illustrating another example of the removal unit.

FIGS. 12A and 12B are side views illustrating another example of a removal unit when viewed from two directions, FIG. 12C is a perspective view illustrating another example of the removal unit, and FIG. 12D is a top view illustrating another example of the removal unit.

A removal unit 5E includes a tip portion 50E, a middle portion 51E connected to the tip portion 50E, and a base portion 52E connected to the middle portion 51E.

In the removal unit 5E, the tip portion 50E and the middle portion 51E are formed of a plate-like member having a predetermined rigidity. A spiral shape is formed such that the tip portion 50E and the middle portion 51E move upward along the axial direction of the rotating shaft 4 from the base portion 52E toward the tip portion 50E.

Accordingly, the removal unit 5E has a shape in which a length between a lower surface 50*f* of the tip portion 50E and the placement surface 20 illustrated in FIG. 1A and the like and a length between the action surface 53E formed by a lower surface of the middle portion 51E and the placement surface 20 are inclined in a direction in which a length increases from the tip portion 50E toward the base portion 52E.

In the tip portion 50E, an outer peripheral side edge 50*g* along a circumferential direction of the rotation trajectory of the removal unit 5E rotating around the rotating shaft 4 as a fulcrum is formed by a convex arc, and an inner peripheral side edge 50*h* is formed by a concave arc.

In the middle portion 51E, an outer peripheral side edge 51*g* along the circumferential direction of the rotation trajectory of the removal unit 5E is formed by a convex arc connected to the outer peripheral side edge 50*g* of the tip portion 50E, and an inner peripheral side edge 51*h* is formed by a concave arc connected to the inner peripheral side edge 50*h* of the tip portion 50E. In the removal unit 5E, the base portion 52E is supported by the rotating shaft 4.

The removal unit 5E includes a narrow portion 54E between the middle portion 51E and the base portion 52E. The narrow portion 54E is configured such that the width along the radial direction of the rotation trajectory of the removal unit 5E is equal to or less than the length along the extending direction of the crown portion 11 of the staple 10.

The removal unit 5E includes a guide unit 53*f* that guides the staple pressing member 6 illustrated in FIG. 1A and the like. In the guide unit 53*f*, a hole into which the staple pressing member 6 enters extends along the rotation trajectory of the removal unit 5E.

Figure 13A:
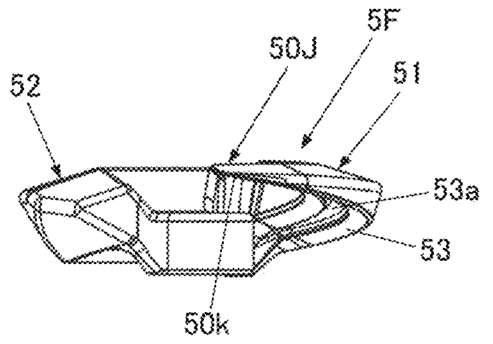
FIG. 13A is a side views illustrating still another example of the removal unit when viewed from two directions.
Figure 13B:
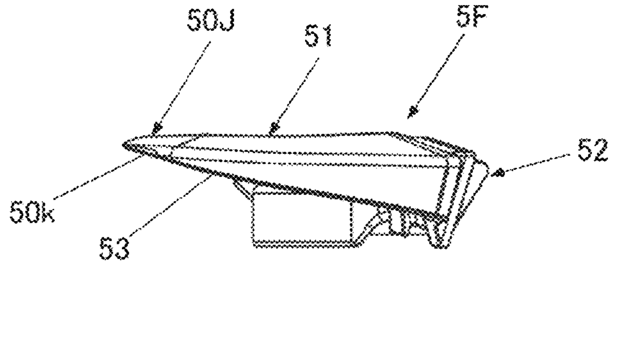
FIG. 13B is a side view illustrating still another example of the removal unit when viewed from two directions.
Figure 13C:
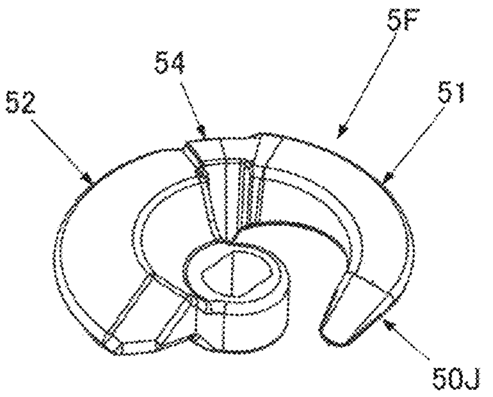
FIG. 13C is a perspective view illustrating still another example of the removal unit.
Figure 13D:
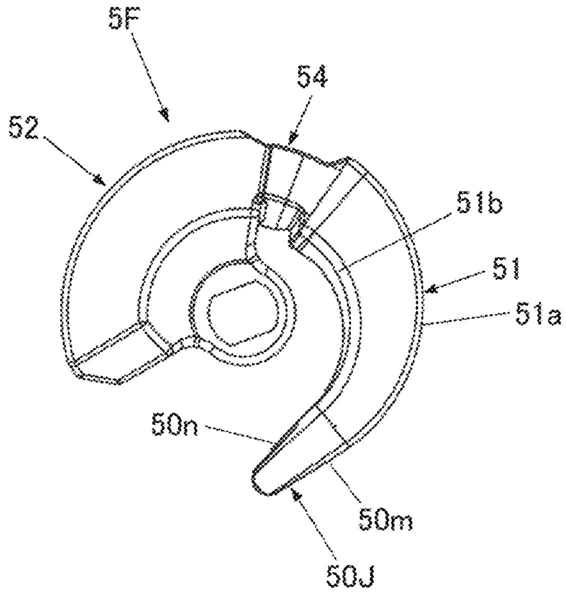
FIG. 13D is a top view illustrating still another example of the removal unit.

FIGS. 13A and 13B are side views illustrating still another example of the removal unit when viewed from two directions, FIG. 13C is a perspective view illustrating still another example of the removal unit, and FIG. 13D is a top view illustrating still another example of the removal unit.

The removal unit 5F includes a tip portion 50J, the middle portion 51 connected to the tip portion 50J, and a base portion 52 connected to the middle portion 51.

The tip portion 50J is formed in a tapered shape in which a thickness along the axial direction of the rotating shaft 4 illustrated in FIG. 3A and the like increases from a tip toward the middle portion 51.

The middle portion 51 is formed in a tapered shape in which the thickness along the axial direction increases from the tip portion 50J toward the base portion 52. Accordingly, the middle portion 51 has a shape in which the action surface 53 is inclined in a direction in which the length between the action surface 53 formed by the lower surface of the middle portion 51 and the placement surface 20 illustrated in FIG. 1A and the like increases from the tip portion 50J toward the base portion 52.

The tip portion 50J has a tapered shape in which a width increases from the tip toward the middle portion 51, and an inner peripheral side edge 50*m* and an outer peripheral side edge 50*n* are linear.

In the middle portion 51, the outer peripheral side edge 51*a* along a circumferential direction of the rotation trajectory of the removal unit 5F is formed by a convex arc connected to the outer peripheral side edge 50*m* of the tip portion 50J, and the inner peripheral side edge 51*b* is formed by a concave arc connected to the inner peripheral side edge 50*n* of the tip portion 50J.

The removal unit 5F includes the narrow portion 54 between the middle portion 51 and the base portion 52. The narrow portion 54 is configured such that the width along the radial direction of the rotation trajectory of the removal unit 5F is equal to or less than the length along the extending direction of the crown portion 11 of the staple 10.

In the removal unit 5F, even when the outer peripheral side edge 50*m* and the inner peripheral side edge 50*n* of the tip portion 50J are linear, since the outer peripheral side edge 51*a* of the middle portion 51 is formed by a convex arc and the inner peripheral side edge 51*b* is formed by a concave arc, a force of removing the staple 10 from the paper bundle by the middle portion 51 is uniformly applied along the extending direction of the crown portion 11, and the staple 10 can be reliably removed.

<Another Configuration Example of Staple Removing Device According to Present Embodiment>

Figure 14:
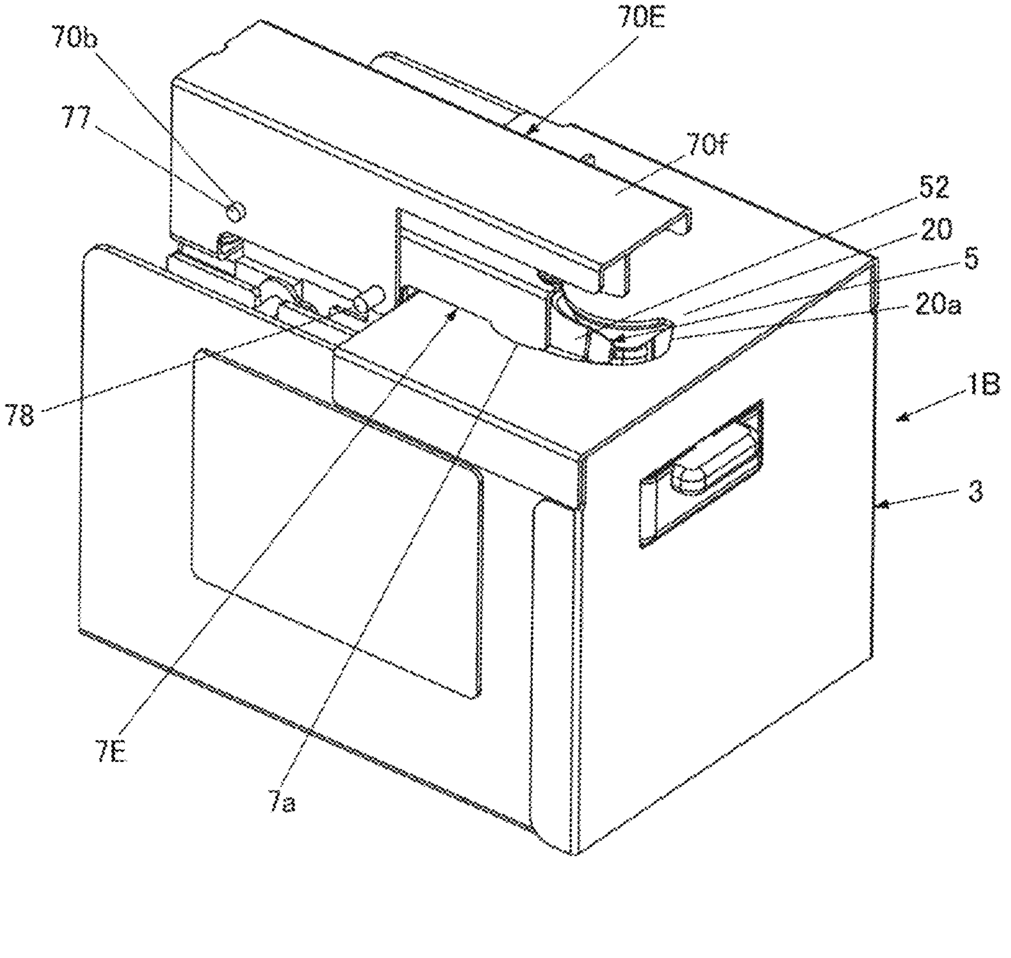
FIG. 14 is a perspective view illustrating another example of the staple removing device according to the present embodiment.

FIG. 14 is a perspective view illustrating another example of the staple removing device according to the present embodiment, and FIGS. 15A to 15D are side sectional views illustrating another example of the staple removing device according to the present embodiment.

A staple removing device 1B includes a paper pressing member 7E that presses the paper bundle P placed on the placement surface 20, a paper thickness adjusting member 70E that presses the paper pressing member 7E in a direction of pressing the paper bundle P placed on the placement surface 20, a biasing member 71 that biases the paper pressing member 7E, and a regulating shaft 77 that regulates a position of the paper thickness adjusting member 70E.

The paper thickness adjusting member 70E is supported by a rotating shaft 78 and rotates around the rotating shaft 78 as a fulcrum by receiving a force of an operator. The paper thickness adjusting member 70E is formed with a receiving portion 70*f* that receives the force of the operator on one side of the rotating shaft 78.

The paper pressing member 7E is supported by the rotating shaft 78 and rotates around the rotating shaft 78 as a fulcrum. The contact portion 7*a* is formed on one side of the paper pressing member 7E with respect to the rotating shaft 78. Further, the acted portion 7*b* that receives the force of the biasing member 71 is formed on the other side of the paper pressing member 7E with respect to the rotating shaft 78. The paper pressing member 7E moves in a direction in which the contact portion 7*a* moves toward or away from the placement surface 20 by rotating around the rotating shaft 78.

The acting portion 70*a* that applies a force to the biasing member 71 is formed on the other side of the paper thickness adjusting member 70E with respect to the rotating shaft 78.

The biasing member 71 is formed of, for example, a coil spring, and is inserted between the acting portion 70*a* and the acted portion 7*b* in a compressed state.

The paper thickness adjusting member 70E has the hole 70*b* into which the regulating shaft 77 is inserted. The paper pressing member 7E has a hole 7*d* into which the regulating shaft 77 is inserted.

The hole 70*b* is formed by providing a round hole having a diameter equivalent to a diameter of the regulating shaft 78 on the other side of the paper thickness adjusting member 70E between the acting portion 70*a* and the rotating shaft 78. The hole 7*d* is an elongated hole extending along a trajectory of rotation of the paper pressing member 7E around the rotating shaft 78 as a fulcrum.

Figure 15A:
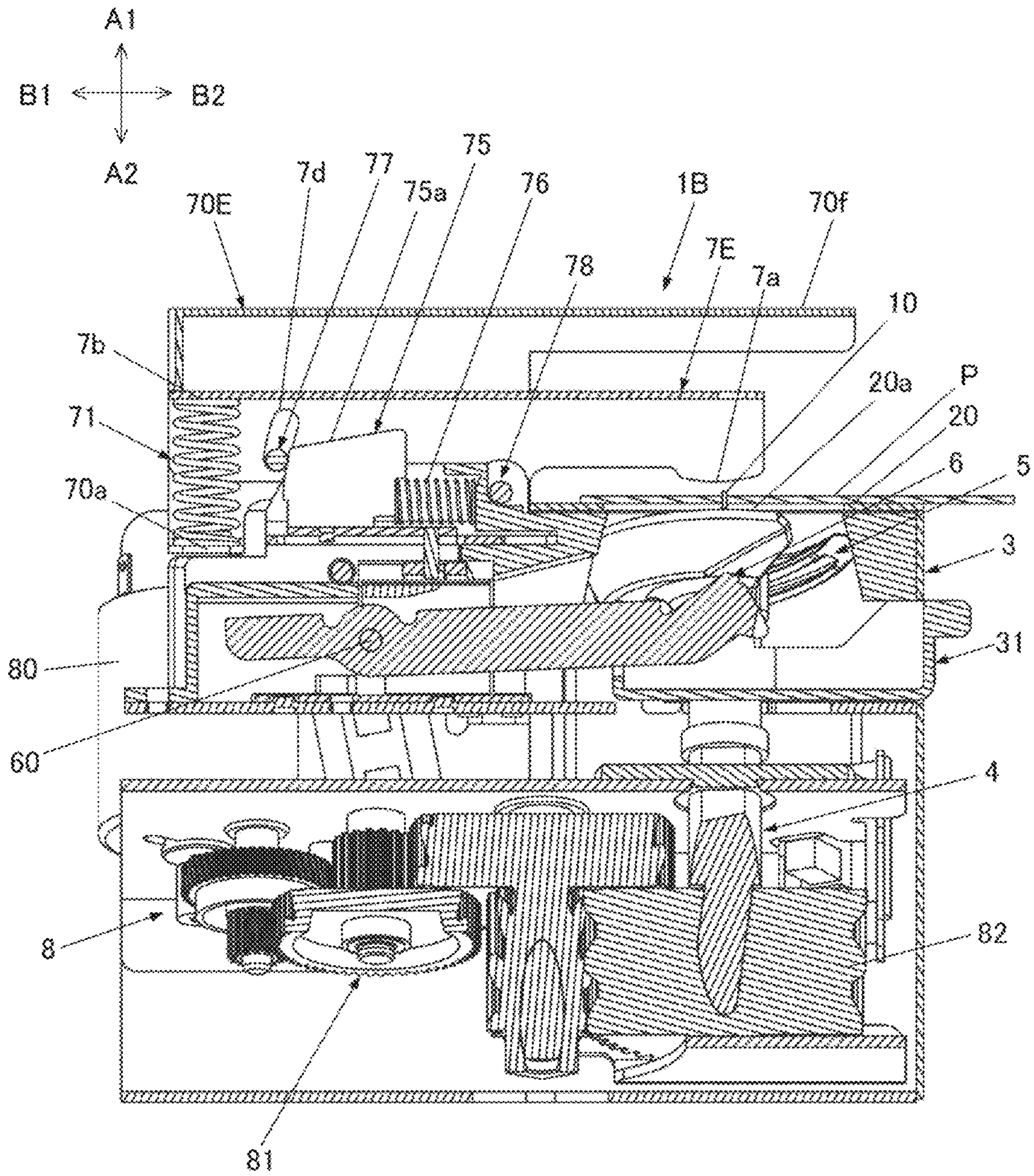
FIG. 15A is a side sectional view illustrating another example of the staple removing device according to the present embodiment.
Figure 15B:
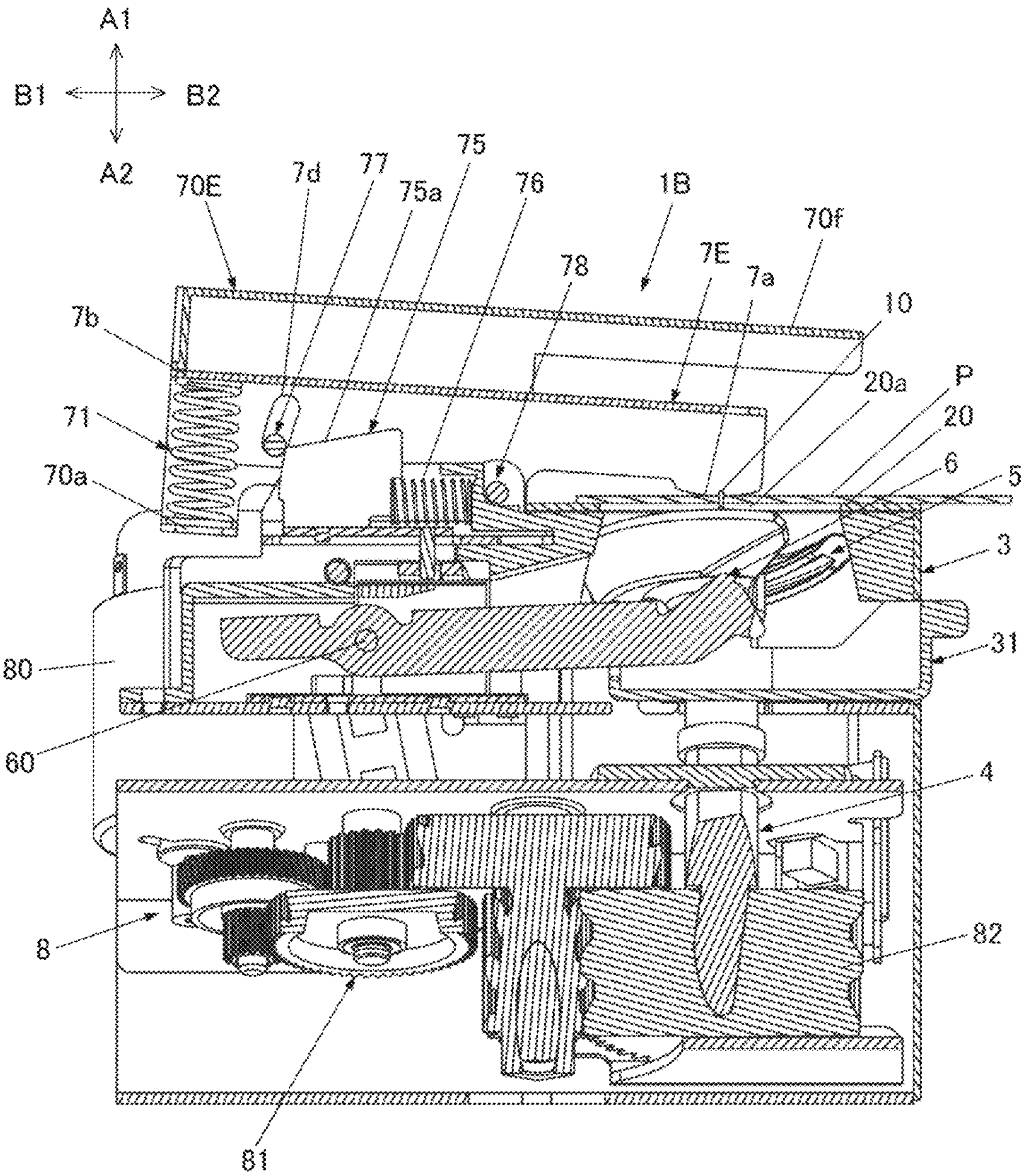
FIG. 15B is a side sectional view illustrating another example of the staple removing device according to the present embodiment.

When the receiving portion 70*f* receives a downward pressing force, the paper thickness adjusting member 70E rotates around the rotating shaft 78 as a fulcrum, and the acting portion 70*a* moves in the first direction indicated by the arrow A1, which is the upward direction, as illustrated in FIG. 15B.

When the acting portion 70*a* of the paper thickness adjusting member 70E moves in the first direction, the biasing member 71 receives a force that is pressed by the acting portion 70*a* in the first direction, which is the upward direction. When the biasing member 71 receives the force that is pressed in the first direction, the biasing member 71 presses the acted portion 7*b* of the paper pressing member 7E in the first direction, which is the upward direction.

In a state where there is a gap between the paper bundle P placed on the placement surface 20 and the contact portion 7*a* of the paper pressing member 7E, when the acted portion 7*b* is pressed in the first direction by the biasing member 71, the paper pressing member 7E rotates around the rotating shaft 78 as a fulcrum and moves in a direction in which the contact portion 7*a* moves toward the placement surface 20.

Figure 15C:
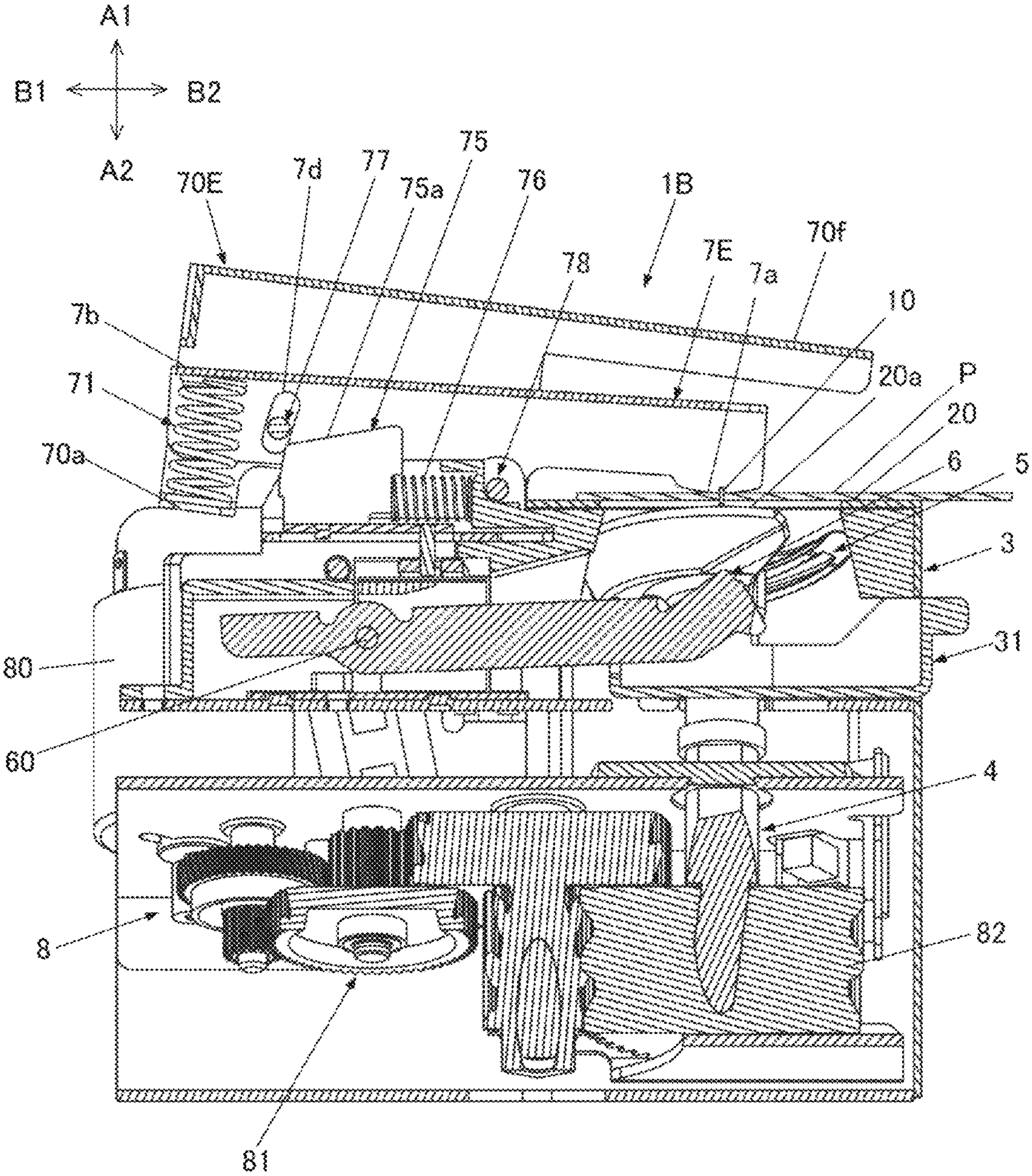
FIG. 15C is a side sectional view illustrating another example of the staple removing device according to the present embodiment.

When the receiving portion 70*f* of the paper thickness adjusting member 70E is further pressed downward in a state where the contact portion 7*a* comes into contact with the paper bundle P placed on the placement surface 20 and the contact portion 7*a* cannot move in the direction toward the placement surface 20, as illustrated in FIG. 15C, the paper thickness adjusting member 70E rotates around the rotating shaft 78 as a fulcrum and the acting portion 70*a* further moves in the first direction, which is the upward direction. The biasing member 71 is compressed by being pressed by the acting portion 70*a*.

Accordingly, the paper thickness adjusting member 70E operates the paper pressing member 7E, and is displaced with respect to the paper pressing member 7E according to a distance between the contact portion 7*a* of the paper pressing member 7E and the placement surface 20. When the paper thickness adjusting member 70E is displaced with respect to the paper pressing member 7E, the biasing member 71 biases the paper pressing member 7E in the direction in which the contact portion 7*a* moves toward the placement surface 20.

The staple removing device 1B includes the regulating member 75 that regulates the position of the paper thickness adjusting member 70E displaced with respect to the paper pressing member 7E, and the biasing member 76 that biases the regulating member 75.

The regulating shaft 77 moves in a first direction indicated by the arrow A1, which is an upward direction of the staple removing device 1B, and a second direction indicated by the arrow A2 opposite to the first direction, which is a downward direction of the staple removing device 1B, by the rotation of the paper thickness adjusting member 70E around the rotating shaft 78 as a fulcrum.

The regulating member 75 is supported to be movable in the third direction indicated by the arrow B1 and the fourth direction indicated by the arrow B2 opposite to the third direction, which are directions in which a gap for inserting the paper bundle P is located in the staple removing device 1B and intersecting the first direction and the second direction. The biasing member 76 is formed of a coil spring or the like, and biases the regulating member 75 in the third direction. The regulating member 75 includes the regulating surface 75*a* with which the regulating shaft 77 comes into contact. The regulating surface 75*a* is inclined toward the first direction along the third direction.

When the paper thickness adjusting member 70E moves the paper pressing member 7E in the direction in which the contact portion 7*a* moves toward the placement surface 20, the regulating shaft 77 moves in the hole 7*d* in the first direction which is an upward direction, the regulating shaft 77 retreats from a movement path of the regulating member 75 moving in the third direction, and the regulating member 75 is movable in the third direction.

When the regulating member 75 is movable in the third direction, the regulating member 75 is biased by the biasing member 76 and moves in the third direction to a position where the regulating surface 75*a* is in contact with the regulating shaft 77. An operation of the regulating member 75 may be linked to the motor 80, and when the receiving portion 70*f* of the paper thickness adjusting member 70E is pressed to a predetermined position, the motor 80 is rotated in a predetermined direction to rotate the rotating shaft 4 and the removal unit 5.

Figure 15D:
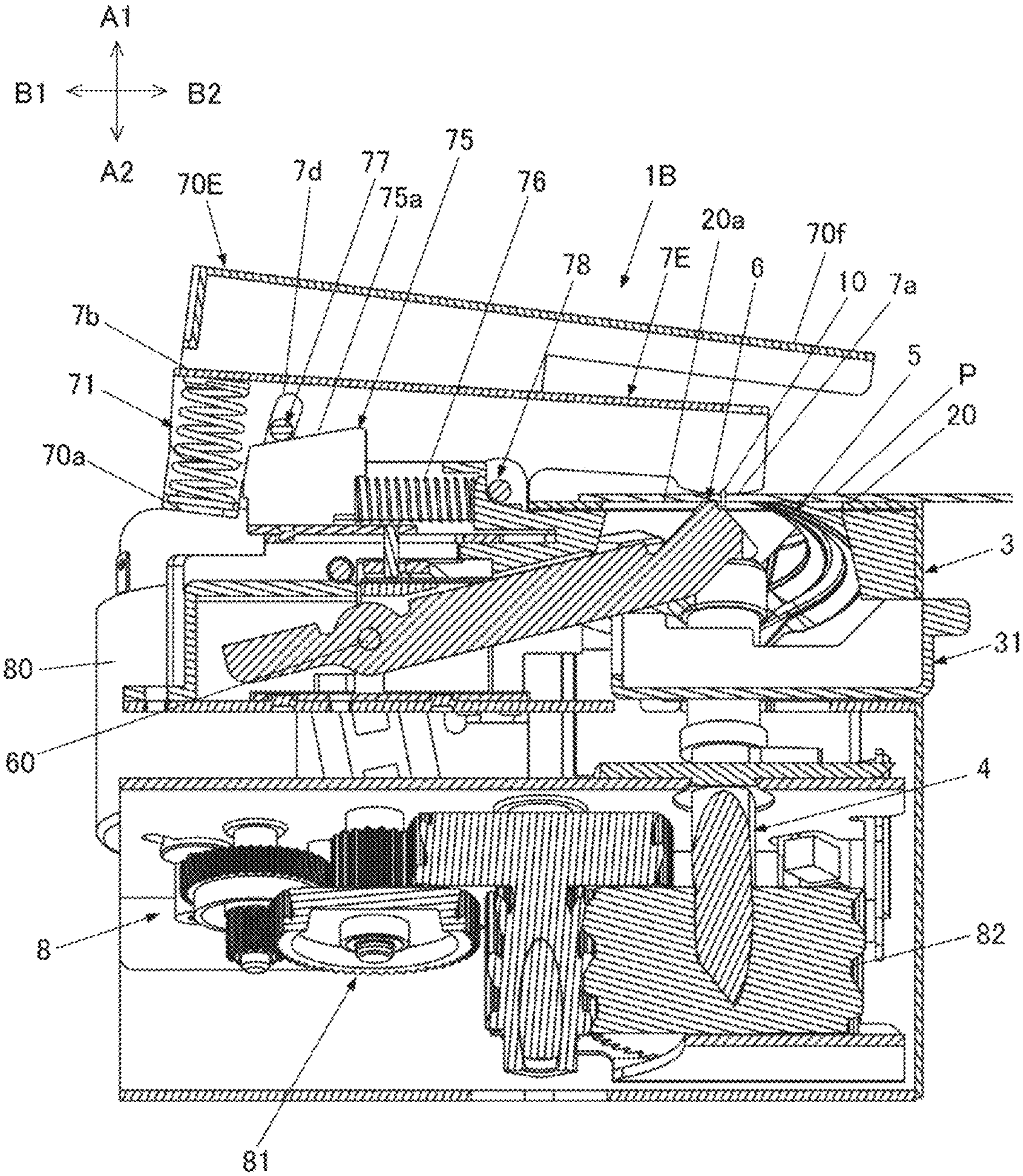
FIG. 15D is a side sectional view illustrating another example of the staple removing device according to the present embodiment.

When the removal unit 5 rotates from the standby position, the link 83*b* follows the cam 83*a* as illustrated in FIG. 8C, and the transmission member 83 moves the regulating member 75 biased by the biasing member 76 in the third direction indicated by the arrow B1 as illustrated in FIG. 15D. When the regulating shaft 77 comes into contact with the regulating surface 75*a*, the movement of the regulating shaft 77 in the second direction is regulated.

Accordingly, the paper thickness adjusting member 70E is regulated from rotating around the rotating shaft 78 as a fulcrum in a direction in which the regulating shaft 77 moves in the second direction, which is the downward direction.

When the regulating member 75 moves in the fourth direction from the state where the regulating shaft 77 is in contact with the regulating surface 75*a*, the regulating member 75 retreats from the movement path of the regulating shaft 77 that moves in the second direction, and the regulating shaft 77 is movable in the second direction.

When the regulating shaft 77 is movable in the second direction, the paper thickness adjusting member 70E rotates around the rotating shaft 78 as a fulcrum in a direction in which the receiving portion 70*f* moves in the upward direction. Further, the paper pressing member 7E rotates around the rotating shaft 78 as a fulcrum in the direction in which the contact portion 7*a* moves away from the placement surface 20.

As described above, even in a configuration in which a mechanism for amplifying a force with which the contact portion 7*a* of the paper pressing member 7E presses the paper bundle P with respect to a force with which the receiving portion 70*f* of the paper thickness adjusting member 70E is pressed is not provided, the paper bundle P placed on the placement surface 20 can be pressed by the paper pressing member 7E by the biasing of the biasing member 71 without continuously applying the force by the manual operation of moving the paper pressing member 7E in the direction toward the placement surface 20 or the force by the motor 80 to the paper thickness adjusting member 70E.

<Application Example of Staple Removing Device According to Present Embodiment>

Figure 16:
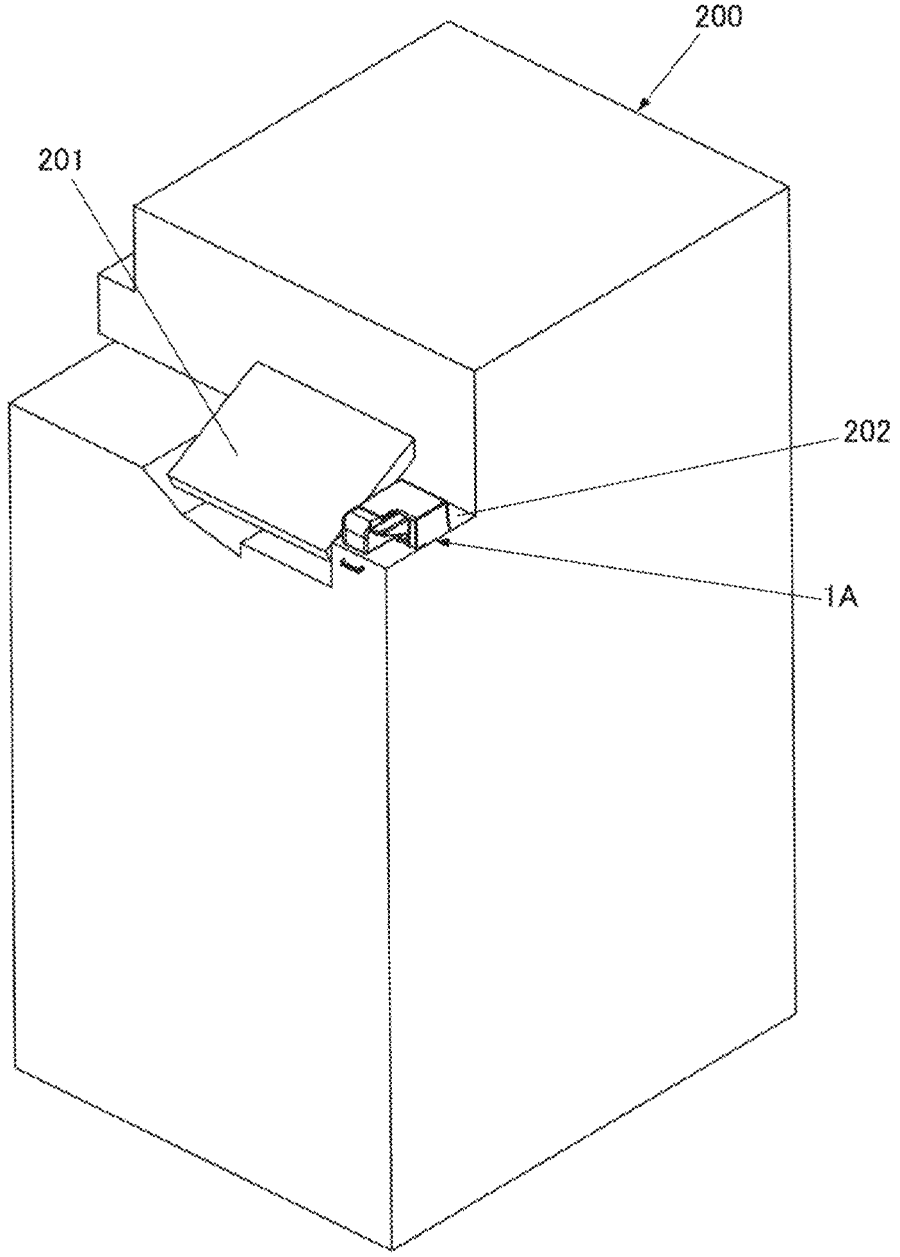
FIG. 16 is a perspective view illustrating an application example of the staple removing device according to the present embodiment.

FIG. 16 is a perspective view illustrating an application example of the staple removing device according to the present embodiment. In the staple removing device 1A, since the removal unit 5 (5E and 5F) rotates around the rotating shaft 4 as a fulcrum, so that a space required for the movement of the removal unit 5 can be narrowed as compared with a configuration in which the removal unit reciprocates linearly as in Japanese Patent No. 7207220.

Accordingly, as illustrated in FIG. 14, the staple removing device 1A can be integrally or separately installed on, for example, an operation console 202 adjacent to an operation panel 201 of an image forming apparatus 200.

According to an embodiment of the present invention, the staple removing device may have the following structures [1] to [8].

[1] A staple removing device including:

a placement portion having a placement surface on which a paper bundle can be placed;

a removal unit inserted between a lower surface of the paper bundle placed on the placement surface and a crown portion of a staple binding the paper bundle and configured to remove the staple from the paper bundle;

a paper pressing member configured to press the paper bundle placed on the placement surface;

a paper thickness adjusting member configured to operate the paper pressing member in a direction toward the placement surface and being displaceable in a direction opposite to the placement surface with respect to the paper pressing member after the paper pressing member comes into contact with the paper bundle;

a biasing member disposed between the paper pressing member and the paper thickness adjusting member and configured to bias the paper pressing member in a direction toward the placement surface when the paper thickness adjusting member is displaced with respect to the paper pressing member; and a regulating member configured to regulate a position of the paper thickness adjusting member displaced with respect to the paper pressing member.

[2] The staple removing device according to [1], further including:

an operation member supported by a first rotating shaft and configured to rotate around the first rotating shaft as a fulcrum by receiving a force of an operator; and a connecting shaft configured to transmit a movement caused by the rotation of the operation member to the paper thickness adjusting member, in which the paper pressing member and the paper thickness adjusting member are supported by a second rotating shaft, and a distance from the second rotating shaft to the connecting shaft is longer than a distance from the first rotating shaft to the connecting shaft.

[3] The staple removing device according to [2], in which the regulating member regulates the position of the paper thickness adjusting member via the connecting shaft.

[4] The staple removing device according to [3], in which the connecting shaft is moved in a first direction and a second direction opposite to the first direction by rotation of the paper thickness adjusting member with the second rotating shaft as a fulcrum, the regulating member is supported to be movable in a third direction intersecting the first direction and the second direction and a fourth direction opposite to the third direction, when the connecting shaft moves in the first direction, the paper thickness adjusting member moves the paper pressing member in a direction in which the paper pressing member moves toward the placement surface, and the regulating member is movable in the third direction, and when the regulating member moves in the third direction, the regulating member comes into contact with the connecting shaft, and movement of the connecting shaft in the second direction is regulated, and when the regulating member moves in the fourth direction, the connecting shaft is movable in the second direction, and when the connecting shaft moves in the second direction, the paper thickness adjusting member moves the paper pressing member in a direction in which the paper pressing member moves away from the placement surface.

[5] The staple removing device according to [4], in which the regulating member has a regulating surface with which the connecting shaft comes into contact, and the regulating surface is inclined in the first direction along the third direction.

[6] The staple removing device according to [4], further including a drive unit configured to drive the removal unit, wherein the drive unit includes a transmission member configured to move the regulating member in the fourth direction.

[7] The staple removing device according to [5], further including a second biasing member configured to bias the regulating member in the third direction.

[8] The staple removing device according to [7], in which the transmission member regulates the regulating member from moving in the third direction by the second biasing member until the drive unit is operated.

What is claimed is:

1. A staple removing device comprising:

a placement portion having a placement surface on which a paper bundle bound by a staple including a crown portion and a leg portion is to be placed;

a rotating shaft extending from below the placement surface toward the placement surface; and a removal unit attached to the rotating shaft and rotating along a surface intersecting an axial direction of the rotating shaft, wherein the removal unit includes a tip portion to be inserted between a lower surface of the paper bundle placed on the placement surface and the crown portion, a middle portion connected to the tip portion and having an action surface to be in contact with the crown portion, and a base portion connected to the middle portion and supported by the rotating shaft, an upper surface of the base portion is located on the same plane as the placement surface or below the placement surface, the tip portion is located above the upper surface of the base portion, and an outer peripheral side edge of the middle portion extending along a rotation trajectory of the removal unit in a circumferential direction of the axial direction is formed by a convex arc shape when seen from the axial direction, and an inner peripheral side edge of the middle portion extending along the rotation trajectory of the removal unit is formed by a concave arc shape when seen from the axial direction.

2. A staple removing device comprising:

a placement portion having a placement surface on which a paper bundle bound by a staple including a crown portion and a leg portion is to be placed;

a rotating shaft extending from below the placement surface toward the placement surface; and a removal unit attached to the rotating shaft and rotating along a surface intersecting with an axial direction of the rotating shaft, wherein the axial direction is inclined with respect to a direction orthogonal to the placement surface, and the removal unit includes a base portion attached to the rotating shaft such that an upper surface of the base portion is located on the same plane as the placement surface or below the placement surface in the inclined axial direction, a middle portion connected to the base portion, and a tip portion connected to the middle portion, located above the upper surface of the base portion in the axial direction, and configured to be inserted between a lower surface of the paper bundle placed on the placement surface and the crown portion.

3. The staple removing device according to claim 1, wherein the rotating shaft is inclined with respect to a direction orthogonal to the placement surface.

4. The staple removing device according to claim 2, wherein the middle portion has an action surface configured to be in contact with the crown portion, and the action surface is inclined in a direction such that a length between the action surface and the lower surface of the paper bundle increases from the tip portion toward the base portion.

5. The staple removing device according to claim 3, wherein a distance from a center line of the removal unit passing through a center along a radial direction of the rotation trajectory to the outer peripheral side edge is equal to a distance from the center line to the inner peripheral side edge.

6. The staple removing device according to claim 5, wherein the tip portion protrudes upward from the placement surface by a rotation operation of the removal unit.

7. The staple removing device according to claim 6, wherein the tip portion, the action surface, and the upper surface of the base portion are inclined in the radial direction with respect to the axial direction of the rotating shaft, and are parallel to the placement surface.

8. The staple removing device according to claim 7, wherein in the removal unit, the tip portion, the middle portion, and the base portion are exposed to the placement surface in order by a rotation operation of the rotating shaft.

9. The staple removing device according to claim 8, further comprising:

a light source that emits light to the base portion exposed to the placement surface.

10. The staple removing device according to claim 1, further comprising:

a staple pressing member located on a rotation trajectory along which the removal unit rotates around the rotating shaft and configured to be in contact with the crown portion.

11. The staple removing device according to claim 10, wherein the staple pressing member is supported to be displaceable in a direction toward or away from the placement surface, and the action surface includes a guide unit configured to guide the staple pressing member.

12. The staple removing device according to claim 1, wherein the removal unit includes a narrow portion between the middle portion and the base portion, the narrow portion having a width along a radial direction of the rotation trajectory along which the removal unit rotates around the rotating shaft equal to or less than an interval between the pair of leg portions of the staple.

13. The staple removing device according to claim 1, wherein the removal unit includes a narrow portion between the middle portion and the base portion, the narrow portion having a width along a radial direction of the rotation trajectory along which the removal unit rotates around the rotating shaft equal to or less than a length of the crown portion in an extending direction of the crown portion.

14. The staple removing device according to claim 2, wherein the removal unit includes a narrow portion between the middle portion and the base portion, the narrow portion having a width along a radial direction of the rotation trajectory along which the removal unit rotates around the rotating shaft equal to or less than an interval between the pair of leg portions of the staple.

15. The staple removing device according to claim 2, wherein the removal unit includes a narrow portion between the middle portion and the base portion, the narrow portion having a width along a radial direction of the rotation trajectory along which the removal unit rotates around the rotating shaft equal to or less than a length of the crown portion in an extending direction of the crown portion.

* * * * *